(12) United States Patent
Rahman et al.

(10) Patent No.: US 11,533,713 B2
(45) Date of Patent: Dec. 20, 2022

(54) MULTI-BEAM OPERATIONS FOR MULTIPLE COMPONENT CARRIERS

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/336,268

(22) Filed: Jun. 1, 2021

(65) Prior Publication Data
US 2021/0385807 A1 Dec. 9, 2021

Related U.S. Application Data

(60) Provisional application No. 63/184,573, filed on May 5, 2021, provisional application No. 63/091,138, filed on Oct. 13, 2020, provisional application No. 63/035,378, filed on Jun. 5, 2020.

(51) Int. Cl.
*H04W 72/04* (2009.01)
*H04B 7/08* (2006.01)

(52) U.S. Cl.
CPC ...... *H04W 72/0406* (2013.01); *H04B 7/0802* (2013.01); *H04W 72/044* (2013.01)

(58) Field of Classification Search
CPC ............ H04W 72/0406; H04W 72/044; H04B 7/0802; H04B 7/088; H04B 7/0695
See application file for complete search history.

(56) References Cited

U.S. PATENT DOCUMENTS

| | | | |
|---|---|---|---|
| 2019/0222289 A1* | 7/2019 | John Wilson | H04L 5/0053 |
| 2020/0204247 A1* | 6/2020 | Zhou | H04B 7/0628 |
| 2021/0135802 A1* | 5/2021 | Zhou | H04B 7/0617 |
| 2022/0225370 A1* | 7/2022 | Park | H04W 72/1289 |

FOREIGN PATENT DOCUMENTS

WO 2020098656 A1 5/2020

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.

(Continued)

*Primary Examiner* — Hashim S Bhatti

(57) ABSTRACT

A method for operating a UE comprises receiving configuration information including a list of CCs and a set of TCI states; receiving, based on the configuration information, a TCI state update via a medium, wherein: the TCI state update is common for a first subset of CCs, the first subset of CCs includes n≤N CCs, and N=a number of CCs in the list of CCs; and for each CC(i) in the first subset of CCs, determining a beam based on the TCI state update, and applying the beam for a reception of a downlink control channel or a downlink data channel associated with the CC(i), wherein i is an index and takes a value from {1, 2, ..., n}, wherein the beam is determined based on a spatial quasi-co-location property used to receive or transmit a source RS indicated via the TCI state update.

20 Claims, 31 Drawing Sheets

(56) References Cited

OTHER PUBLICATIONS

"LTE; Evolved Universal Terrestrial Radio Access (E-UTRA); Multiplexing and channel coding (Release 16)", ETSI TS 136 212 V16.5.0, Apr. 2021, 259 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.
"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.5.0, Release 16)", ETSI TS 138 211 V16.5.0, Apr. 2021, 138 pages.
"5G; NR; Multiplexing and channel coding (3GPP TS 38.212 version 16.5.0 Release 16)", ETSI TS 138 212 V16.5.0, Apr. 2021, 155 pages.
"3rd Generation Partnership Project; Technical Specification Group Radio Access Network; NR; Physical layer procedures for control (3GPP TS 38.213 version 16.4.0 Release 16)", 3GPP TS 38.213 V16.4.0, Dec. 2020, 181 pages.
"5G; NR; Physical layer procedures for data (3GPP TS 38.214 version 16.4.0 Release 16)", ETSI TS 138 214 V16.4.0, Dec. 2020, 169 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
International Search Report and Written Opinion of the International Searching Authority in connection with International Application No. PCT/KR2021/007083 dated Sep. 27, 2021, 6 pages.
Qualcomm Incorporated, "Design of MIMO DL MAC CE", 3GPP TSG-RAN WG2 Meeting #109 electronic, R2-2001034, Feb. 24-Mar. 6, 2020, 10 pages.
LG Electronics, "Summary of email thread [101-e-NR-eMIMO-MB1-02]", 3GPP TSG RAN WG1 #101, R1-2004791, e-Meeting, May 25-Jun. 5, 2020, 11 pages.
Oppo, "FL summary for Multi-TRP/Panel Transmission", 3GPP TSG RAN WG1 #100bis, R1-2002406, e-Meeting, Apr. 20-30, 2020, 34 pages.
Qualcomm Incorporated, "Correction on new DL MIMO MAC CE", 3GPP TSG-RAN WG2 Meeting #109bis-e R2-2003252, Electronic, Apr. 20-Apr. 30, 2020, 9 pages.

\* cited by examiner

MULTI-BEAM OPERATIONS FOR MULTIPLE COMPONENT CARRIERS

CROSS-REFERENCE TO RELATED APPLICATIONS AND CLAIM OF PRIORITY

The present application claims priority to U.S. Provisional Patent Application No. 63/035,378, filed on Jun. 5, 2020, U.S. Provisional Patent Application No. 63/091,138, filed on Oct. 13, 2020, and U.S. Provisional Patent Application No. 63/184,573, filed on May 5, 2021. The content of the above-identified patent documents is incorporated herein by reference.

TECHNICAL FIELD

The present disclosure relates generally to wireless communication systems and more specifically to multi-beam operations for multiple component carriers (CCs).

BACKGROUND

Understanding and correctly estimating the channel between a user equipment (UE) and a gNode B (gNB) is important for efficient and effective wireless communication. In order to correctly estimate the downlink (DL) channel conditions, the gNB may transmit a reference signal, e.g., CSI-RS, to the UE for DL channel measurement, and the UE may report (e.g., feedback) information about channel measurement, e.g., CSI, to the gNB. Likewise, for uplink (UL), the UE may transmit reference signal, e.g., SRS, to the gNB for UL channel measurement. With the DL and UL channel measurements, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam indication mechanism is needed in order to align the spatial beams at both gNB and UE.

SUMMARY

Embodiments of the present disclosure provide methods and apparatuses to enable multi-beam operations for multiple CCs.

In one embodiment, a UE in a wireless communication system is provided. The UE includes a transceiver configured to receive configuration information including a list of CCs and a set of transmission configuration indicator (TCI) states, and receive, based on the configuration information, a TCI state update via a medium, wherein: the TCI state update is common for a first subset of CCs, the first subset of CCs includes n≤N CCs, and N=a number of CCs in the list of CCs. The UE further includes a processor operably coupled to the transceiver. The processor is configured to: for each CC(i) in the first subset of CCs, determine a beam based on the TCI state update, and apply the beam for a reception of a downlink (DL) control channel or a DL data channel associated with the CC(i), wherein i is an index and takes a value from $\{1, 2, \ldots, n\}$, wherein the beam is determined based on a spatial quasi-co-location (QCL) property used to receive or transmit a source reference signal (RS) indicated via the TCI state update.

In another embodiment, a BS in a wireless communication system is provided. The BS includes a processor configured to generate configuration information including a list of component carriers (CCs) and a set of transmission configuration indicator (TCI) states, and generate, based on the configuration information, a TCI state update via a medium, wherein: the TCI state update is common for a first subset of CCs, the first subset of CCs includes n≤N CCs, and N=a number of CCs in the list of CCs. The BS further includes a transceiver operably coupled to the processor. The transceiver is configured to: transmit the configuration information, transmit the TCI state update via the medium, for each CC(i) in the first subset of CCs, transmit, via the medium, the TCI state update indicating a beam, and transmit a downlink (DL) control channel or a DL data channel associated with the CC(i) for reception via a beam, wherein i is an index and takes a value from $\{1, 2, \ldots, n\}$, wherein the beam is based on a spatial quasi-co-location (QCL) property used to receive or transmit a source reference signal (RS) indicated via the TCI state update.

In yet another embodiment, a method for operating a UE is provided. The method comprises: receiving configuration information including a list of component carriers (CCs) and a set of transmission configuration indicator (TCI) states; receiving, based on the configuration information, a TCI state update via a medium, wherein: the TCI state update is common for a first subset of CCs, the first subset of CCs includes n≤N CCs, and N=a number of CCs in the list of CCs; and for each CC(i) in the first subset of CCs, determining a beam based on the TCI state update, and applying the beam for a reception of a downlink (DL) control channel or a DL data channel associated with the CC(i), wherein i is an index and takes a value from $\{1, 2, \ldots, n\}$, wherein the beam is determined based on a spatial quasi-co-location (QCL) property used to receive or transmit a source reference signal (RS) indicated via the TCI state update.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
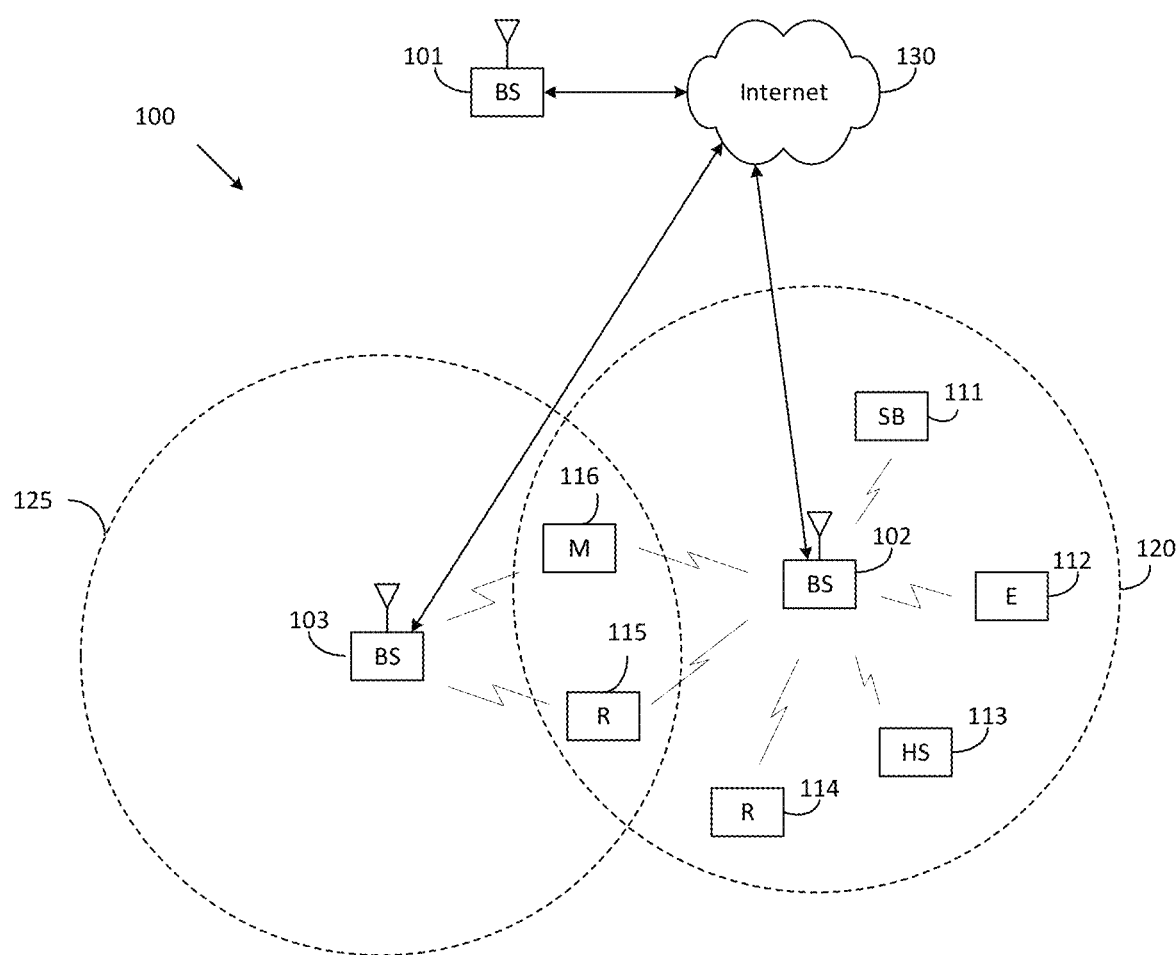
FIG. 1 illustrates an example wireless network according to embodiments of the present disclosure.

FIG. 1 through FIG. 33, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.5.0, "E-UTRA, Physical channels and modulation" (herein "REF 1"); 3GPP TS 36.212 v16.5.0, "E-UTRA, Multiplexing and Channel coding" (herein "REF 2"); 3GPP TS 36.213 v16.5.0, "E-UTRA, Physical Layer Procedures" (herein "REF 3"); 3GPP TS 36.321 v16.4.0, "E-UTRA, Medium Access Control (MAC) protocol specification" (herein "REF 4"); 3GPP TS 36.331 v16.4.0, "E-UTRA, Radio Resource Control (RRC) protocol specification" (herein "REF 5"); 3GPP TS 38.211 v16.5.0, "NR, Physical channels and modulation" (herein "REF 6"); 3GPP TS 38.212 v16.5.0, "NR, Multiplexing and Channel coding" (herein "REF 7"); 3GPP TS 38.213 v16.4.0, "NR, Physical Layer Procedures for Control" (herein "REF 8"); 3GPP TS 38.214 v16.4.0, "NR, Physical Layer Procedures for Data" (herein "REF 9"); 3GPP TS 38.215 v16.4.0, "NR, Physical Layer Measurements" (herein "REF 10"); 3GPP TS 38.321 v16.4.0, "NR, Medium Access Control (MAC) protocol specification" (herein "REF 11"); and 3GPP TS 38.331 v16.4.1, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
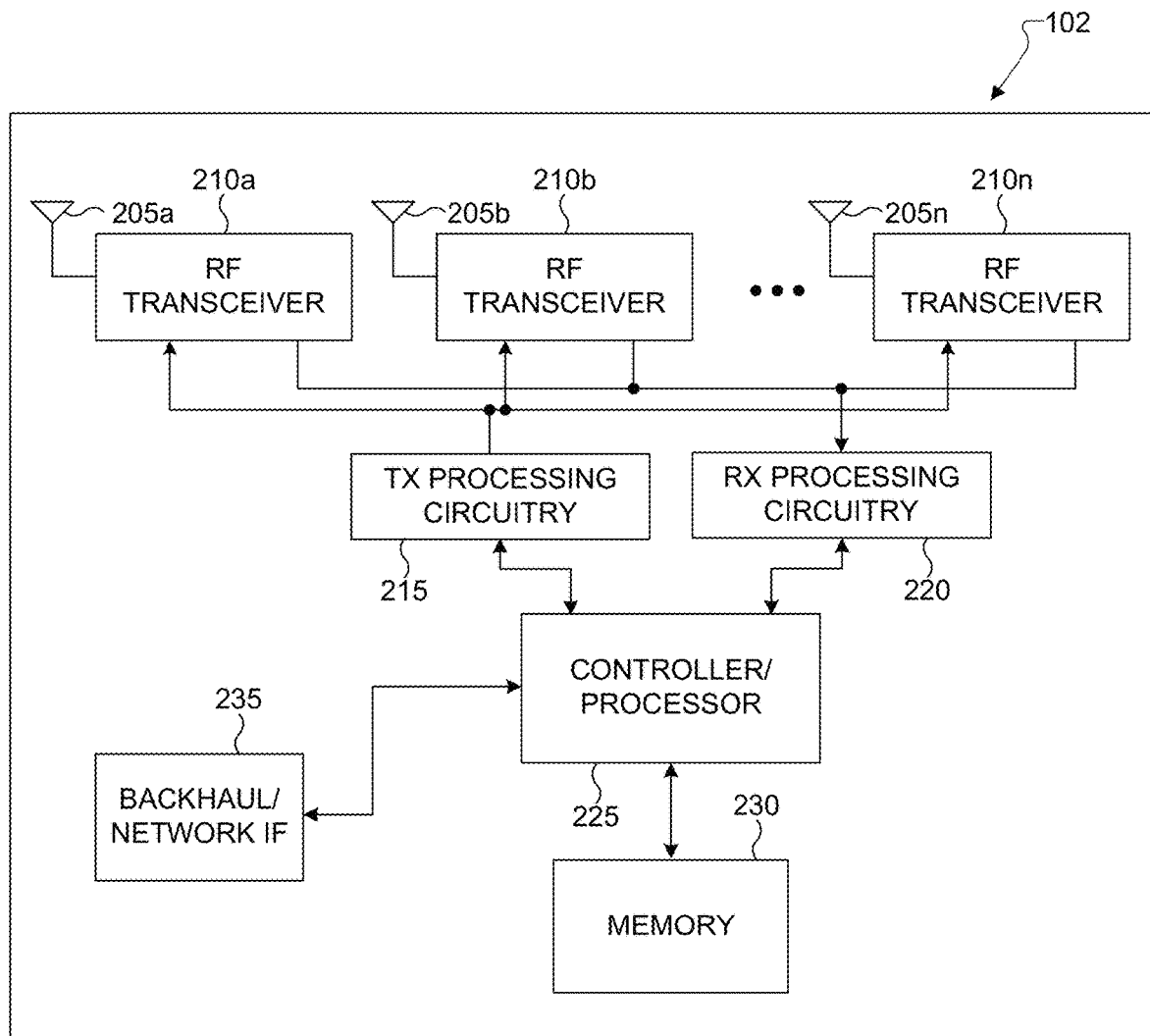
FIG. 2 illustrates an example gNB according to embodiments of the present disclosure.
Figure 3:
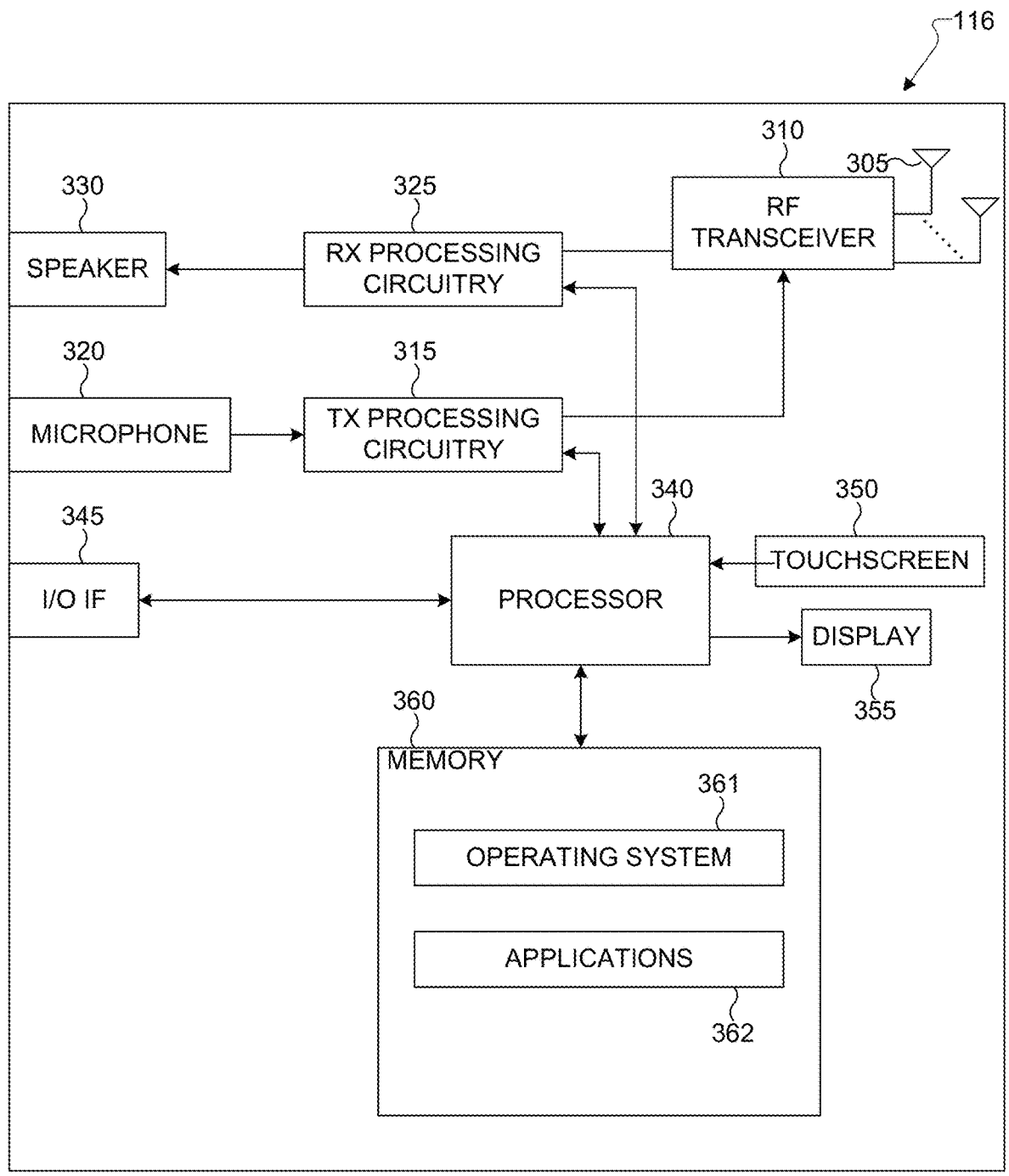
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information including a list of component carriers (CCs) and a set of transmission configuration indicator (TCI) states; receiving, based on the configuration information, a TCI state update via a medium, wherein: the TCI state update is common for a first subset of CCs, the first subset of CCs includes n≤N CCs, and N=a number of CCs in the list of CCs; and for each CC(i) in the first subset of CCs, determining a beam based on the TCI state update, and applying the beam for a reception of a downlink (DL) control channel or a DL data channel associated with the CC(i), wherein i is an index and takes a value from {1, 2, . . . , n}, wherein the beam is determined based on a spatial quasi-co-location (QCL) property used to receive or transmit a source reference signal (RS) indicated via the TCI state update. One or more of the gNBs 101-103 includes circuitry, programing, or a combination thereof, for generating configuration information including a list of component carriers (CCs) and a set of transmission configuration indicator (TCI) states, generating, based on the configuration information, a TCI state update via a medium, wherein: the TCI state update is common for a first subset of CCs, the first subset of CCs includes n≤N CCs, and N=a number of CCs in the list of CCs, transmitting the configuration information, transmitting the TCI state update via the medium, for each CC(i) in the first subset of CCs, transmitting, via the medium, the TCI state update indicating a beam, and transmitting a downlink (DL) control channel or a DL data channel associated with the CC(i) for reception via a beam, wherein i is an index and takes a value from {1, 2, . . . , n}, wherein the beam is based on a spatial quasi-co-location (QCL) property used to receive or transmit a source reference signal (RS) indicated via the TCI state update.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information including a list of component carriers (CCs) and a set of transmission configuration indicator (TCI) states; receiving, based on the configuration information, a TCI state update via a medium, wherein: the TCI state update is common for a first subset of CCs, the first subset of CCs includes n≤N CCs, and N=a number of CCs in the list of CCs; and for each CC(i) in the first subset of CCs, determining a beam based on the TCI state update, and applying the beam for a reception of a downlink (DL) control channel or a DL data channel associated with the CC(i), wherein i is an index and takes a value from $\{1, 2, \ldots, n\}$, wherein the beam is determined based on a spatial quasi-co-location (QCL) property used to receive or transmit a source reference signal (RS) indicated via the TCI state update. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
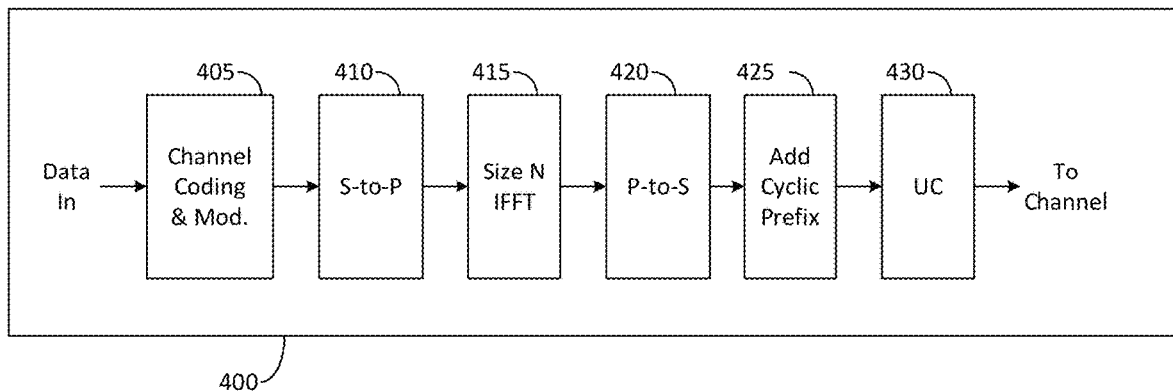
FIG. 4A illustrates a high-level diagram of an orthogonal frequency division multiple access transmit path according to embodiments of the present disclosure.
Figure 4B:
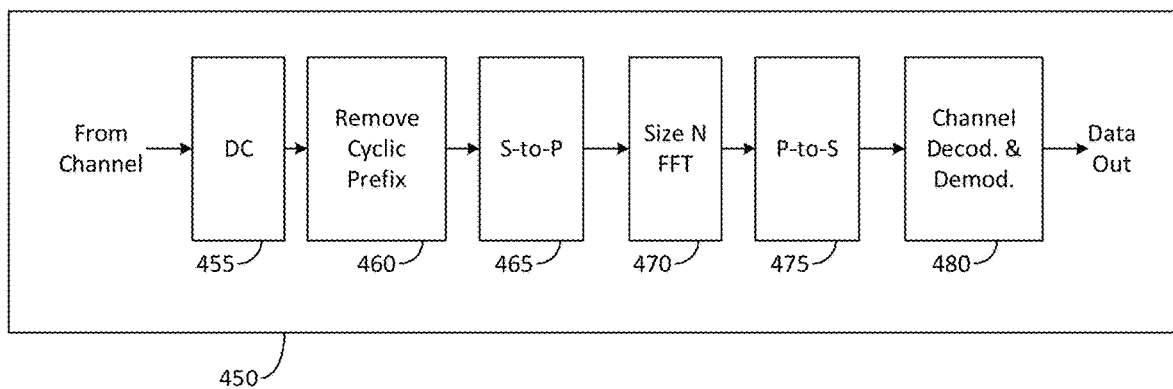
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ subcarriers, or resource elements (REs), such as 12 REs. A unit of one RB over one subframe is referred to as a PRB. A UE can be allocated $n_s=(n_{s0}+y \cdot N_{EPDCCH})$ mod D RBs for a total of $Z=O_F+\lfloor(n_{s0}+y \cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
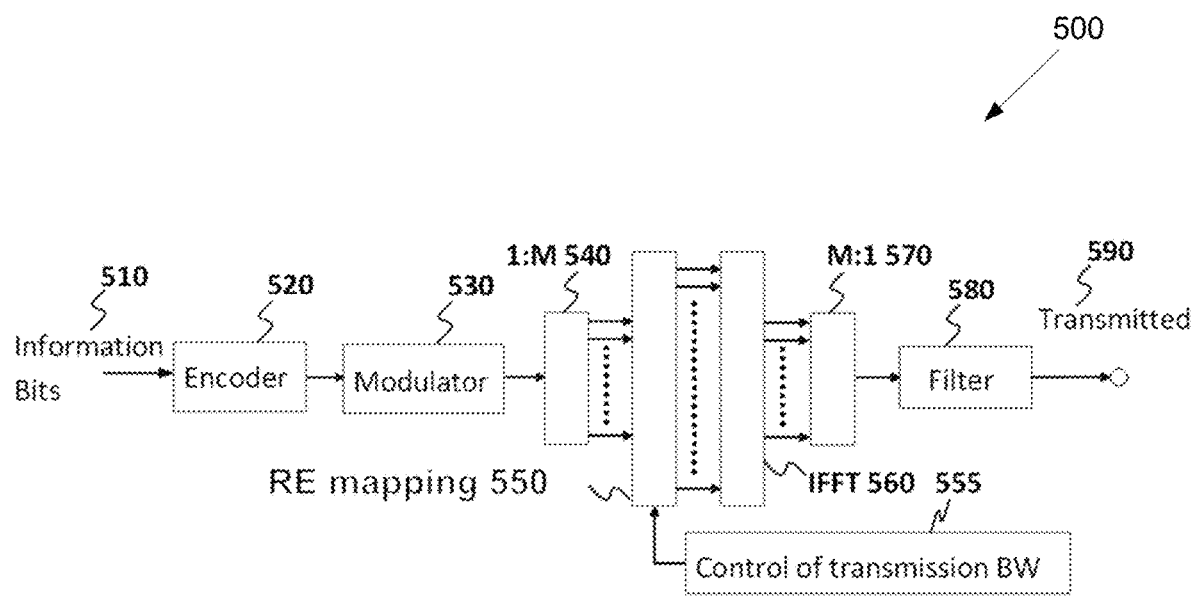
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
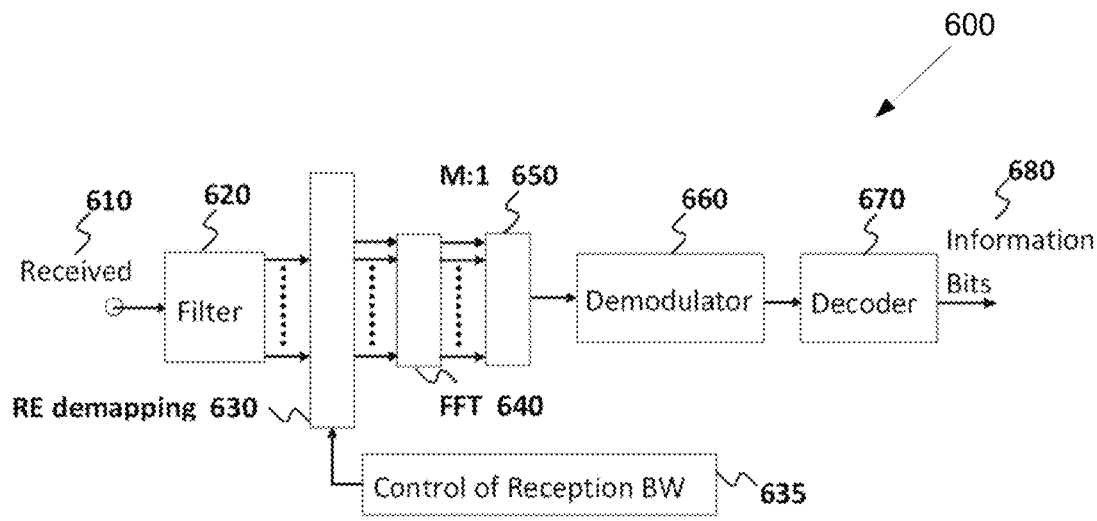
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
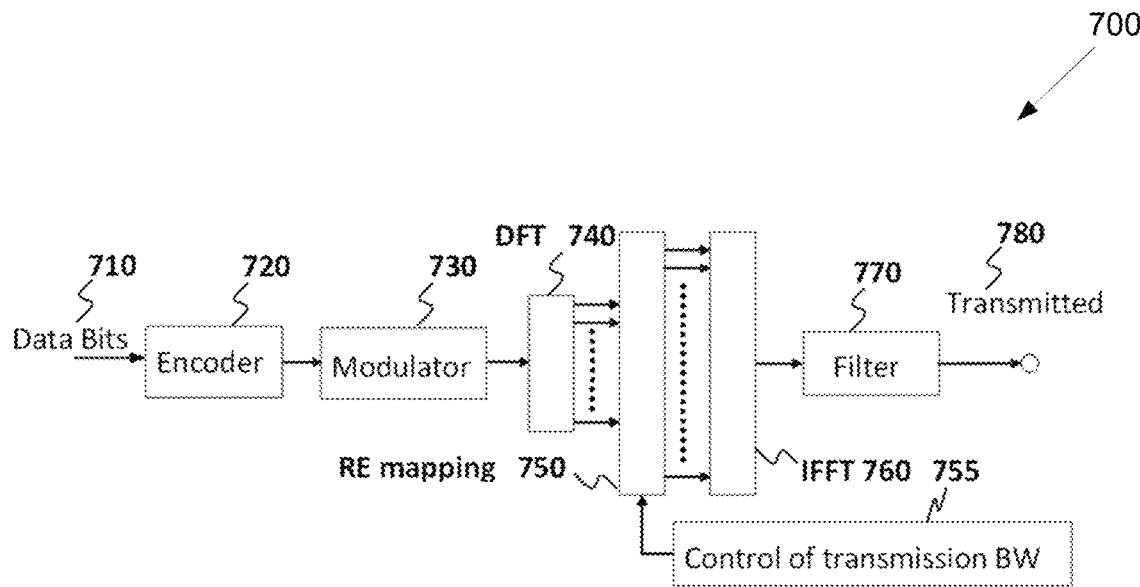
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
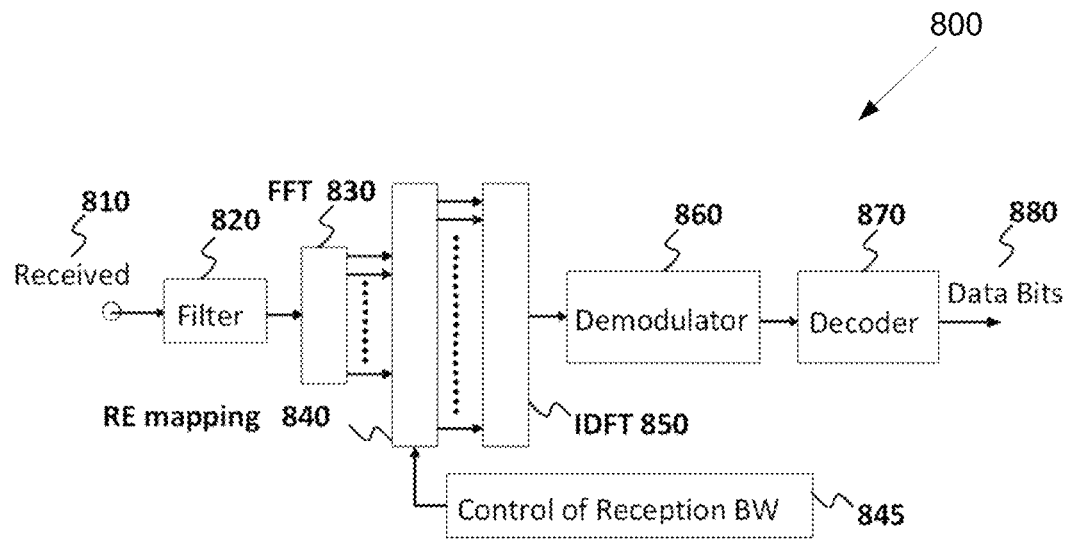
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
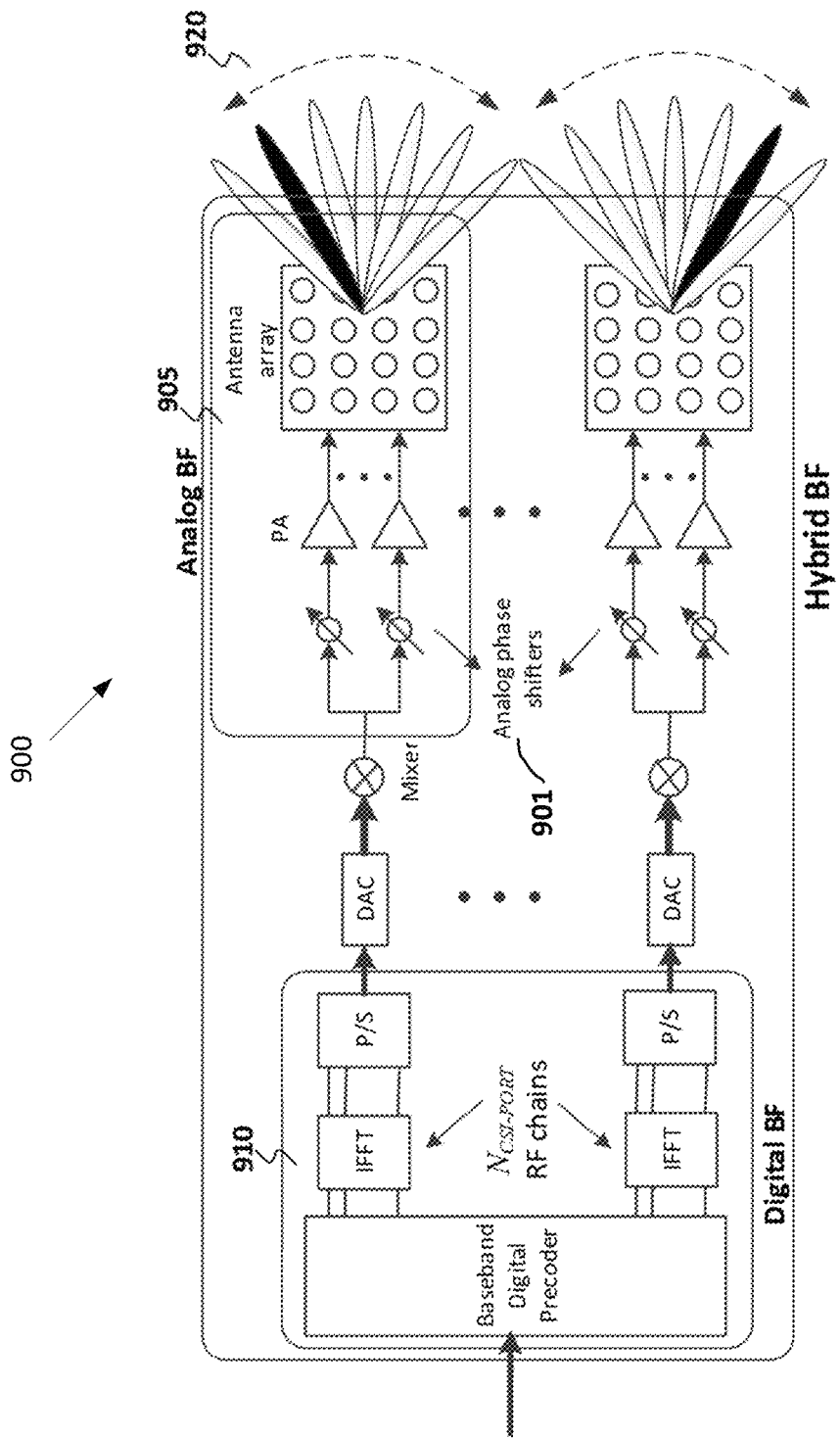
FIG. 9 illustrates an example multiplexing of two slices according to embodiments of the present disclosure.

FIG. 9 illustrates an example of beams 900 according to embodiments of the present disclosure. The embodiment of the beams 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the beams 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100m distance), larger number of and sharper analog beams (hence larger number of radiators in the array) will be needed to compensate for the additional path loss.

In 3GPP LTE and NR (new radio access or interface), network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 9) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 9), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In the 3GPP NR specification, the handover procedure to handle inter-cell mobility, similar to LTE, and relies heavily on RRC (and even higher layer) reconfigurations to update cell-specific parameters. Such reconfigurations usually are slow and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2.

One such solution/mechanism is based on a unified TCI state (beam indication) framework wherein a common beam (or TCI state) is used for (associated with) the transmission/reception of both data (PDSCH/PUSCH) and control (PDCCH/PUCCH), and also for DL and UL (for example, when beam correspondence holds between DL and UL). In this common beam (or TCI state) based multi-beam operation, the common beam (TCI state) indication/update has to happen prior to (separately from) the transmission/reception of the control information (e.g., DL/UL-related DCI in PDCCH) scheduling a DL assignment for DL data (PDSCH) or an UL grant for UL data (PUSCH). Note that a common beam based multi-beam operation is supported in the 3GPP NR specification beam management, wherein a common beam for DL data (PDSCH) and control (PDCCH) is indicated via a MAC CE based signaling (when the higher layer parameter tci-PresentInDCI in PDSCH-Config is not 'enabled'). Such MAC-CE based common beam activation, however, is too sluggish due to the reasons explained above.

Since the TCI state for the data beam is updated in a time slot (or subframe) prior to the slot (or subframe) carrying the DCI scheduling the DL assignment or the UL grant, there might be some performance loss when compared with the case when the TCI state update for the data beam is performed together with the DL assignment or the UL grant. This issue can be worse for high mobility UEs which require frequent/accurate update of data beam for seamless data transmission/reception. A solution to address this issue can be based on dynamic beam indication via DCI where the DCI can be a dedicated DCI and/or a DCI scheduling DL assignment or UL grant.

In this disclosure, the dynamic beam indication for multiple component carriers (CCs) or bandwidth parts (BWP) within a CC is proposed.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assignment represented by a TCI state, the UE applies the known characteristics of the reference RS to the assigned DL transmission. In an alternative, the reference RS included in a TCI state is referred to as a source RS (e.g., to distinguish an RS included in a TCI state from an RS configured for beam measurement/reporting). The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
|---|---|
| FR1 | 450 MHz-600 MHz |
| FR2 | 24250 MHz-25600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
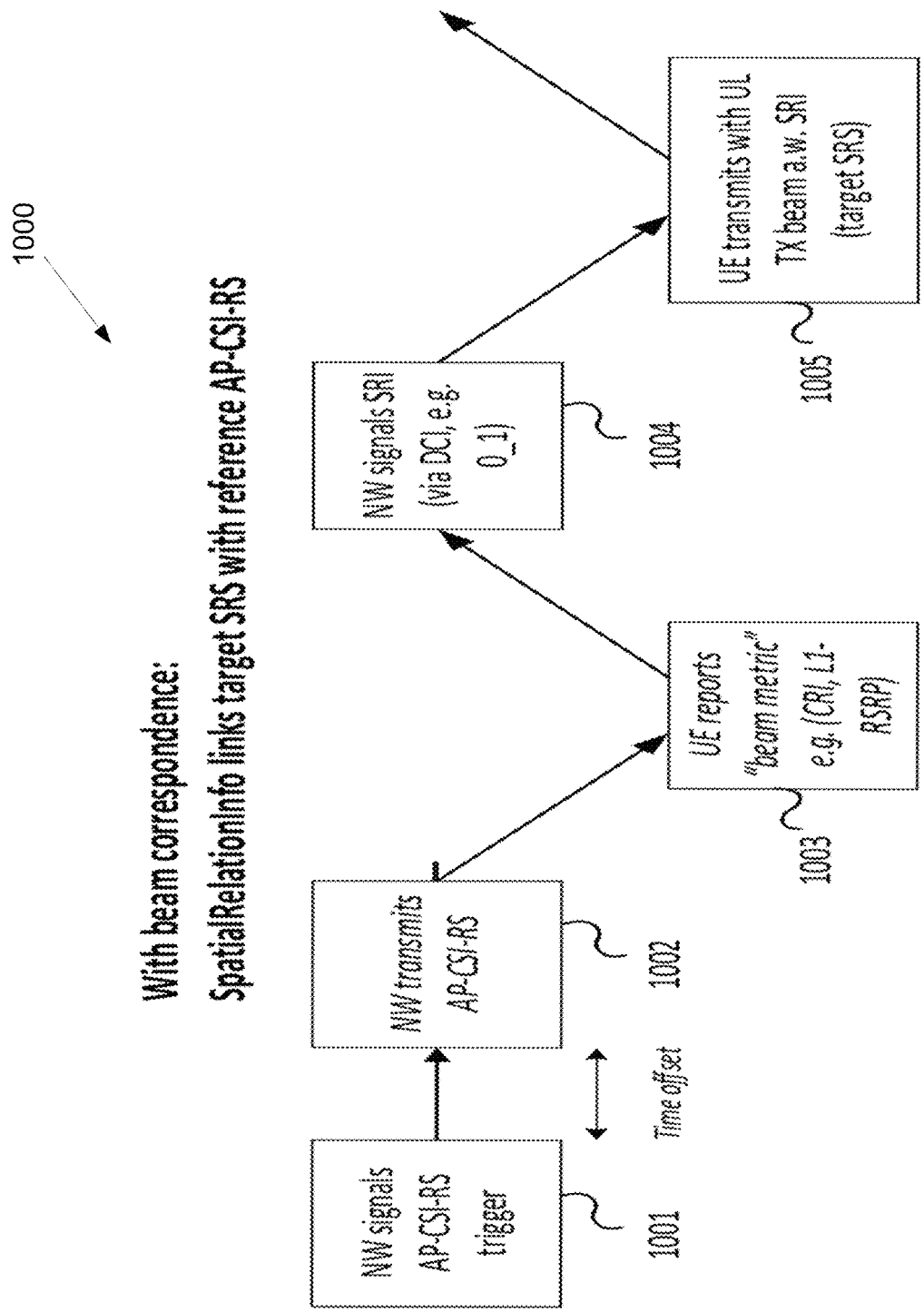
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
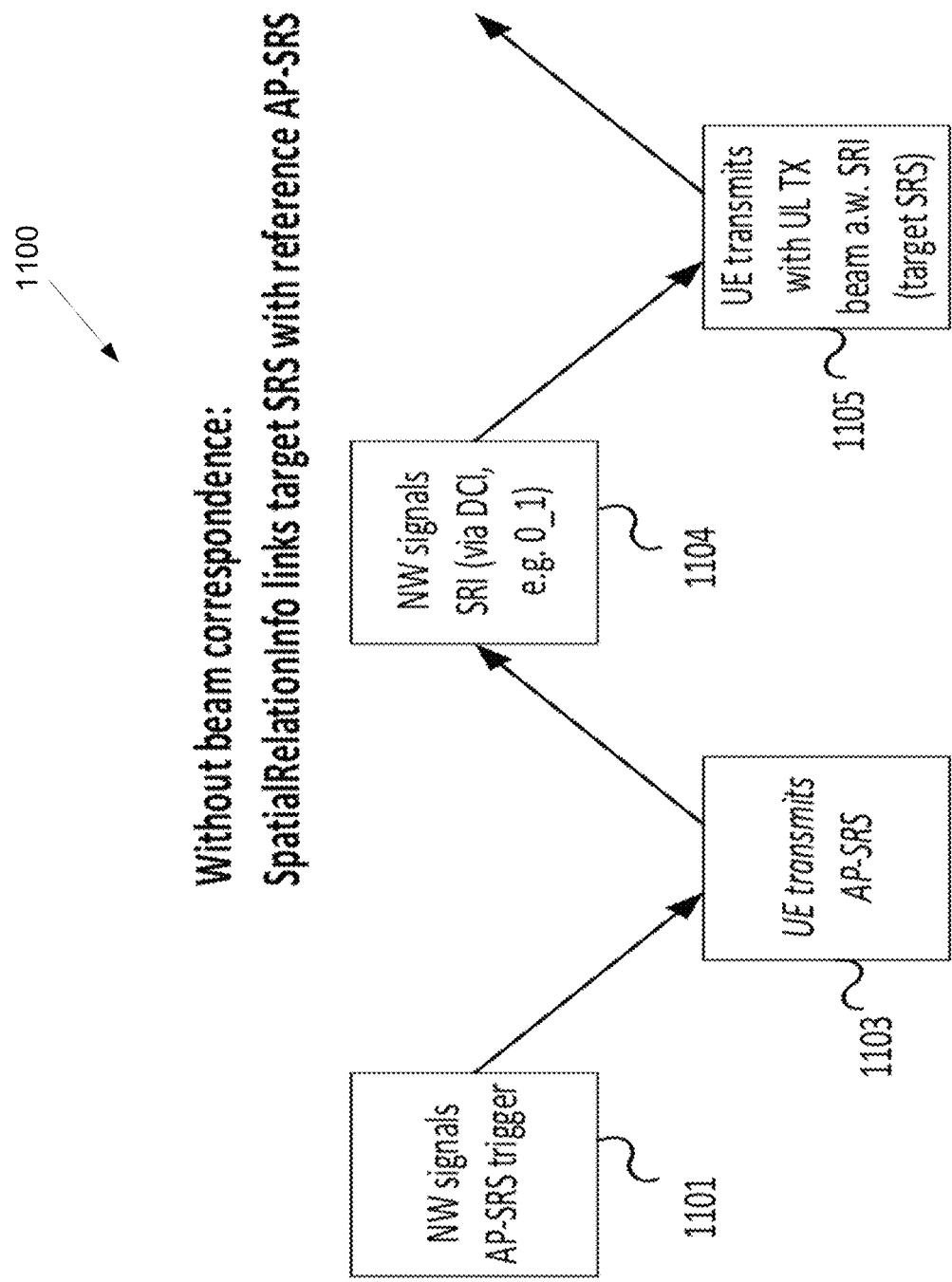
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
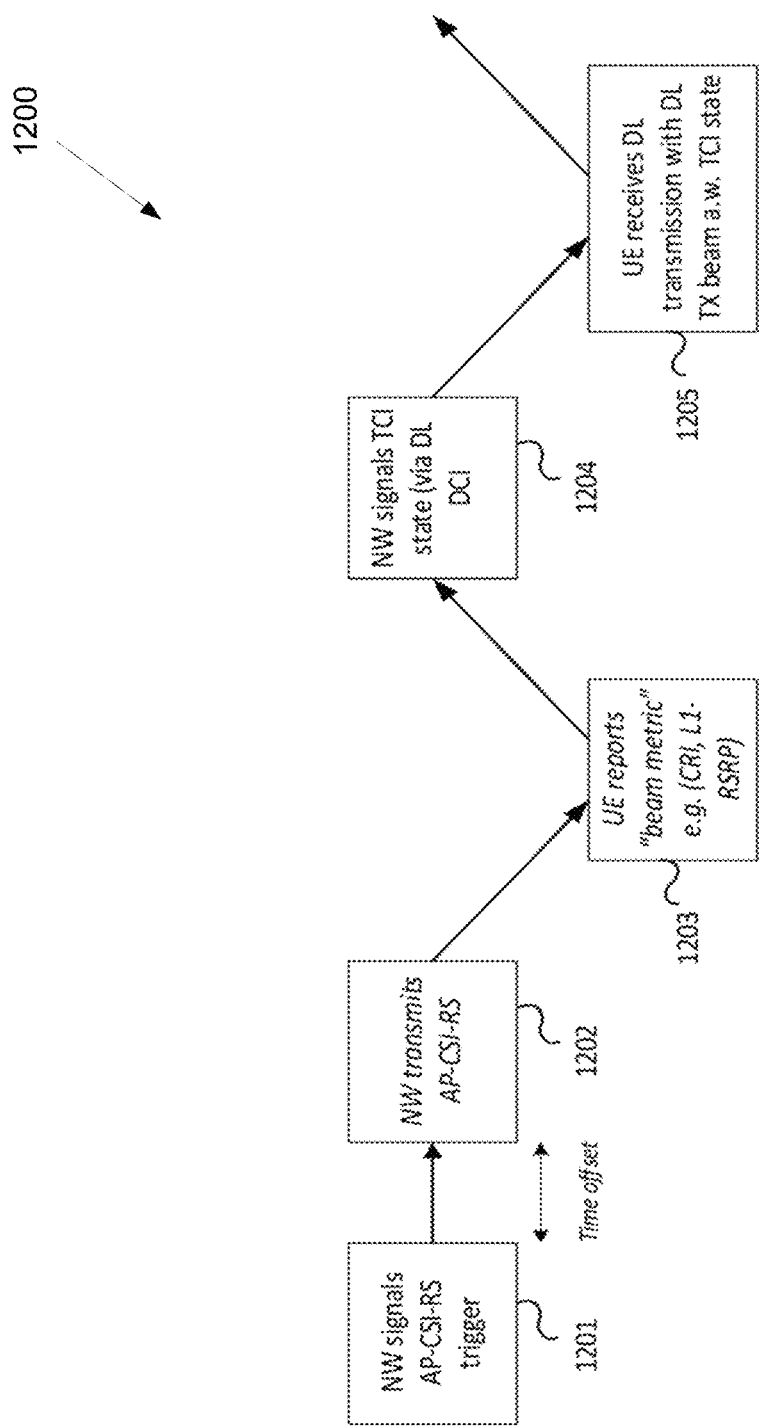
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

To facilitate fast beam management, one requirement is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In U.S. patent application Ser. No. 16/949,246 filed on Oct. 21, 2020, the disclosure of which is incorporated by reference herein, a "slim mode" with streamlined designs of such foundational components is proposed for fast beam management. The slim-mode design, due to its compact nature, can facilitate faster update/reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

In this disclosure, signaling mechanisms for enabling the above-mentioned fast (dynamic) multi-beam operations are considered. In particular, a common beam (TCI state) indication via a separate DCI is considered in which in the indicated beam is common for both data and control (as explained above).

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space.

In a beam-formed wireless system, the transmission and reception of wireless signal can be via multiple TX and multiple RX beams.

In this disclosure, a dynamic, L1-control or DCI based, common beam indication mechanisms are considered. For illustration, the following notation/terminology is used in this disclosure. Other terminology can also be used to represent the same functions and operations:

- a DCI indicating a common beam for data (PDSCH/PUSCH) and control (PDCCH/PUCCH) for both DL and UL is referred to as TCI-DCI (e.g., used when beam correspondence holds between DL and UL),
- a DCI indicating a common beam for data (PDSCH) and control (PDCCH) for DL is referred to as DL-TCI-DCI,
- a DCI indicating a common beam for data (PUSCH) and control (PUCCH) for UL is referred to as UL-TCI-DCI,
- a DCI scheduling a DL assignment is referred to as DL-DCI, and
- a DCI scheduling a UL grant is referred to as UL-DCI.

Figure 13:
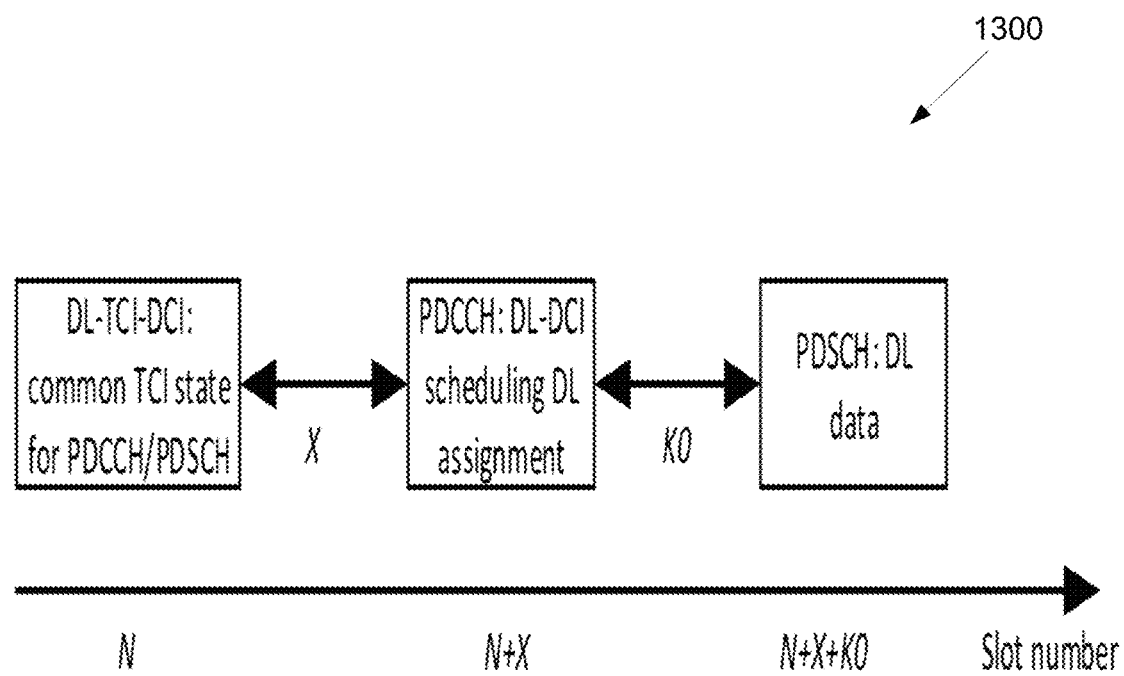
FIG. 13 illustrates an example of a dedicated DCI indicating the common beam for the reception of DL control and data according to embodiments of the present disclosure.

In U.S. patent application Ser. No. 17/214,738 filed on Mar. 26, 2021, the disclosure of which is incorporated by reference herein, a common beam indication for DL data (PDSCH) and DL control (PDCCH) via DL-TCI-DCI is proposed. An example of a dedicated DCI indicating the common beam for the reception of DL control and data 1300 is illustrated in FIG. 13. The embodiment of the dedicated DCI indicating the common beam for the reception of DL control and data 1300 illustrated in FIG. 13 is for illustration only. FIG. 13 does not limit the scope of this disclosure to any particular implementation of the example of a dedicated DCI indicating the common beam for the reception of DL control and data 1300.

As shown in FIG. 13, a UE is configured to receive a dedicated DCI (DL-TCI-DCI) indicating the common beam (TCI state) for the reception of DL control (PDCCH) and data (PDSCH). The UE receives (e.g., a DL-TCI-DCI format) and decodes DL-TCI-DCI in slot (or subframe) N, and uses the indicated beam (TCI state) to receive DL control (PDCCH) starting in the same (slot N) or later slot(s). For illustration, let X be the gap (in number of slots/subframes) between the slot carrying the DL-TCI-DCI and the slot carrying the DL control, then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot N+X+$K_0$. Here, the value of X can be fixed. Alternatively, the value of X can be selected from a set of values. Optionally, the value of X is not configured or set in a particular manner due to the aperiodic nature of the DCI signaling (DL-TCI-DCI and/or DL-DCI). That is, the time unit location (e.g., slot, subframe) used to signal the DL-TCI-DCI can be different from that used to signal the DL-DCI.

Figure 14:
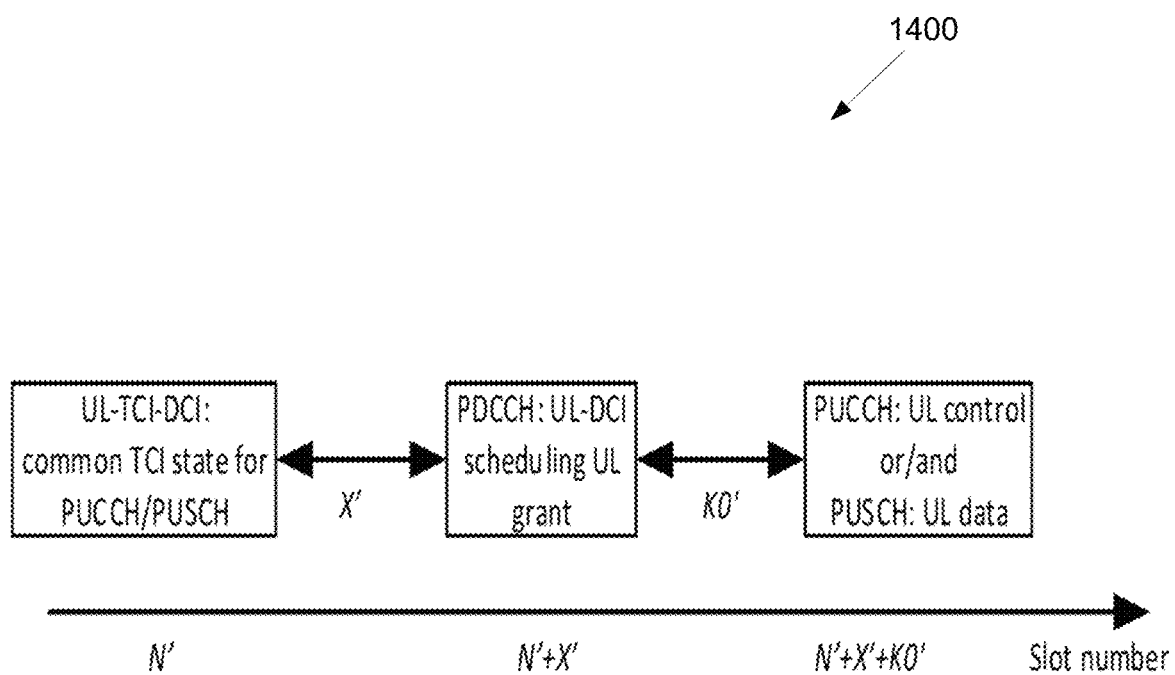
FIG. 14 illustrates an example of a dedicated DCI indicating the common beam for the transmission of UL control and data according to embodiments of the present disclosure.

In U.S. patent application Ser. No. 17/222,592 filed on Apr. 5, 2021, the disclosure of which is incorporated by reference herein, a common beam indication (via UL-TCI-DCI) for UL data (PUSCH) and UL control (PUCCH) is proposed. An example of a dedicated DCI indicating the common beam for the transmission of UL control and data 1400 is illustrated in FIG. 14. The example of a dedicated DCI indicating the common beam for the transmission of UL control and data 1400 illustrated in FIG. 14 is for illustration only. FIG. 14 does not limit the scope of this disclosure to any particular implementation of the example of a dedicated DCI indicating the common beam for the transmission of UL control and data 1400.

As shown in FIG. 14, a UE is configured to receive a dedicated DCI (UL-TCI-DCI) indicating the common beam (TCI state) for the transmission of UL control (PUCCH) and data (PUSCH), wherein PUCCH can be associated with (or in response to) DL reception and/or UL transmission. Optionally, the common beam can also be used for the transmission of PRACH. The UE receives (e.g., a UL-TCI-DCI format) and decodes UL-TCI-DCI in slot (or subframe) N', and uses either the indicated beam (TCI state) or another TCI state (beam) to receive DL control (PDCCH) starting in the same (slot N') or later slot(s). For illustration, let X' be the gap (in number of slots/subframes) between the slot carrying the DL-TCI-DCI and the slot carrying the DL control, then the UE receives DL control starting in slot N'+X'. The UE decodes UL-DCI (e.g., a UL-DCI format) contained in PDCCH to obtain scheduling information for the UL grant. The UE uses the indicated beam (TCI state) in UL-TCI-DCI to transmit UL control (PUCCH) and/or UL data (PUSCH, according to the UL grant) in slot N'+X'+K. Here, the value of X' can be fixed. Alternatively, the value of X' can be selected from a set of values. Optionally, the value of X' is not configured or set in a particular manner due to the aperiodic nature of the DCI signaling (UL-TCI-DCI and/or UL-DCI). That is, the time unit location (e.g., slot, subframe) used to signal the UL-TCI-DCI can be different from that used to signal the UL-DCI.

Figure 15:
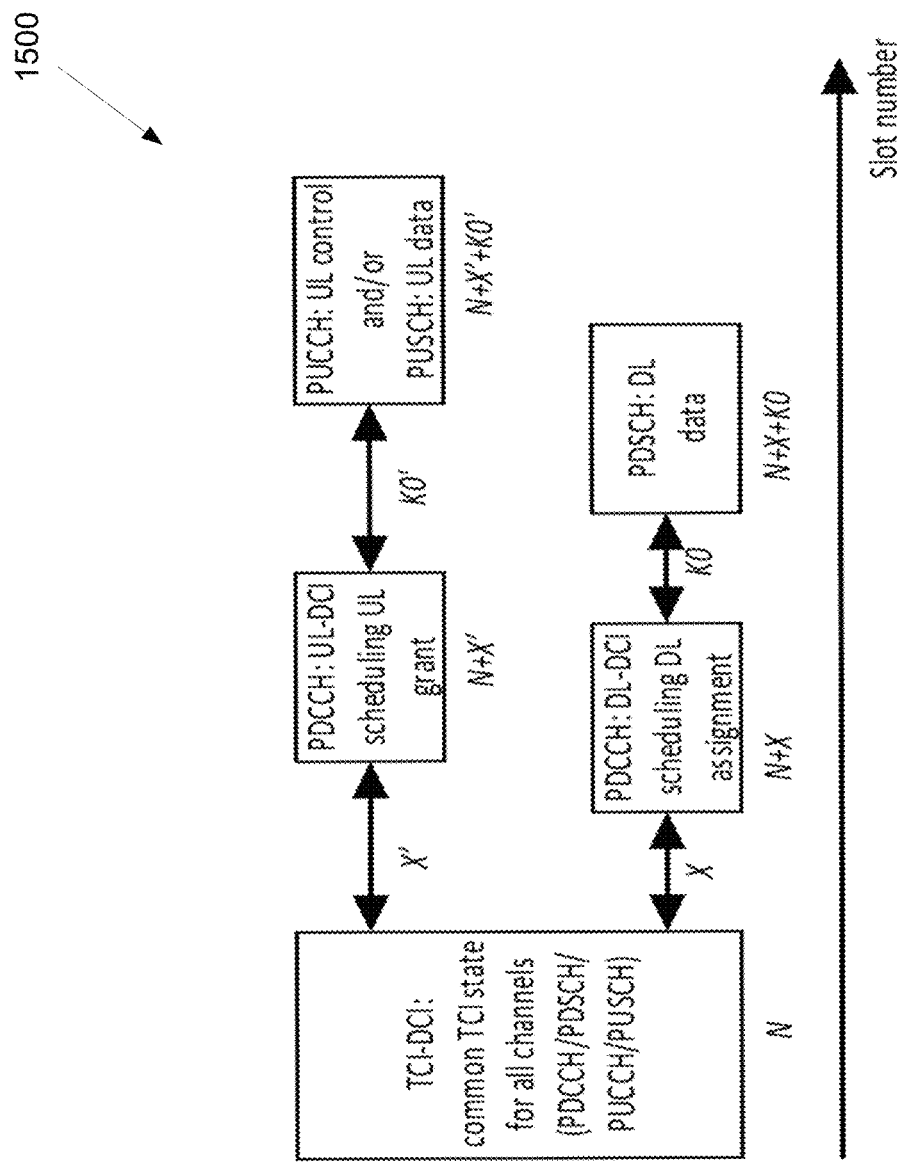
FIG. 15 illustrates an example of a dedicated DCI indicating the common beam for all DL and UL channels according to embodiments of the present disclosure.

In the U.S. patent application Ser. No. 17/222,592 filed on Apr. 5, 2021 referenced above, a common beam indication (via TCI-DCI) for both DL and UL as well as data and control is proposed. An example of a dedicated DCI indicating the common beam for all DL and UL channels 1500 is illustrated in FIG. 15. The example of a dedicated DCI indicating the common beam for all DL and UL channels 1500 illustrated in FIG. 15 is for illustration only. FIG. 15 does not limit the scope of this disclosure to any particular implementation of the example of a dedicated DCI indicating the common beam for all DL and UL channels 1500.

As shown in FIG. 15, a UE is configured to receive a dedicated DCI (TCI-DCI) indicating the common beam (TCI state) for all DL and UL channels. In particular, the indicated common beam is used for the reception of DL control (PDCCH) and DL data (PDSCH) as well as for the transmission of UL control (PUCCH) and UL data (PUSCH), wherein PUCCH can be associated with (or in response to) DL reception and/or UL transmission. Optionally, the common beam can also be used for the transmission of PRACH (cf. embodiment I.7). The UE receives (e.g., a TCI-DCI format) and decodes TCI-DCI in slot (or subframe) N, and uses either the indicated beam (TCI state) or another TCI state (beam) to receive DL control (PDCCH) scheduling DL assignment (via DL-DCI) and/or UL grant (via UL-DCI) starting in the same (slot N) or later slot(s).

For DL, let X be the gap (in number of slots/subframes) between the slot carrying the TCI-DCI and the slot carrying the DL control scheduling DL assignment (via DL-DCI), then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot $N+X+K_0$. Here, the value of X can be fixed. Alternatively, the value of X can be selected from a set of values. Optionally, the value of X is not configured or set in a particular manner due to the aperiodic nature of the DCI signaling (TCI-DCI and/or DL-DCI). That is, the time unit location (e.g., slot, subframe) used to signal the TCI-DCI can be different from that used to signal the DL-DCI.

For UL, let X' be the gap (in number of slots/subframes) between the slot carrying the TCI-DCI and the slot carrying the DL control scheduling UL grant (via UL-DCI), then the UE receives DL control starting in slot N'+X'. The UE decodes UL-DCI (e.g., a UL-DCI format) contained in PDCCH to obtain scheduling information for the UL grant. The UE uses the indicated beam (TCI state) in TCI-DCI to transmit UL control (PUCCH) and/or UL data (PUSCH, according to the UL grant) in slot N'+X'+K. Here, the value of X' can be fixed. Alternatively, the value of X' can be selected from a set of values. Optionally, the value of X' is not configured or set in a particular manner due to the aperiodic nature of the DCI signaling (TCI-DCI and/or UL-DCI). That is, the time unit location (e.g., slot, subframe) used to signal the TCI-DCI can be different from that used to signal the UL-DCI.

When the UE is configured with a set (list) of M>1 CCs (or DL BWPs or cells or UL BWPs), an index $i \in \{0, 1, \ldots, M-1\}$ is used to denote the i-th CC in the set (list) of M>1 CCs (or DL BWPs or cells or UL BWPs), i.e., the notations CC(i), DCI(i), PDCCH(i), PDSCH(i), TCI state(i), PUCCH(i), PUSCH(i), PRACH(i) etc. are used to denote the relevant terms for the i-th CC.

Component 1: Independent Beam for DL Reception and DCI Based Beam Indication

Figure 16:
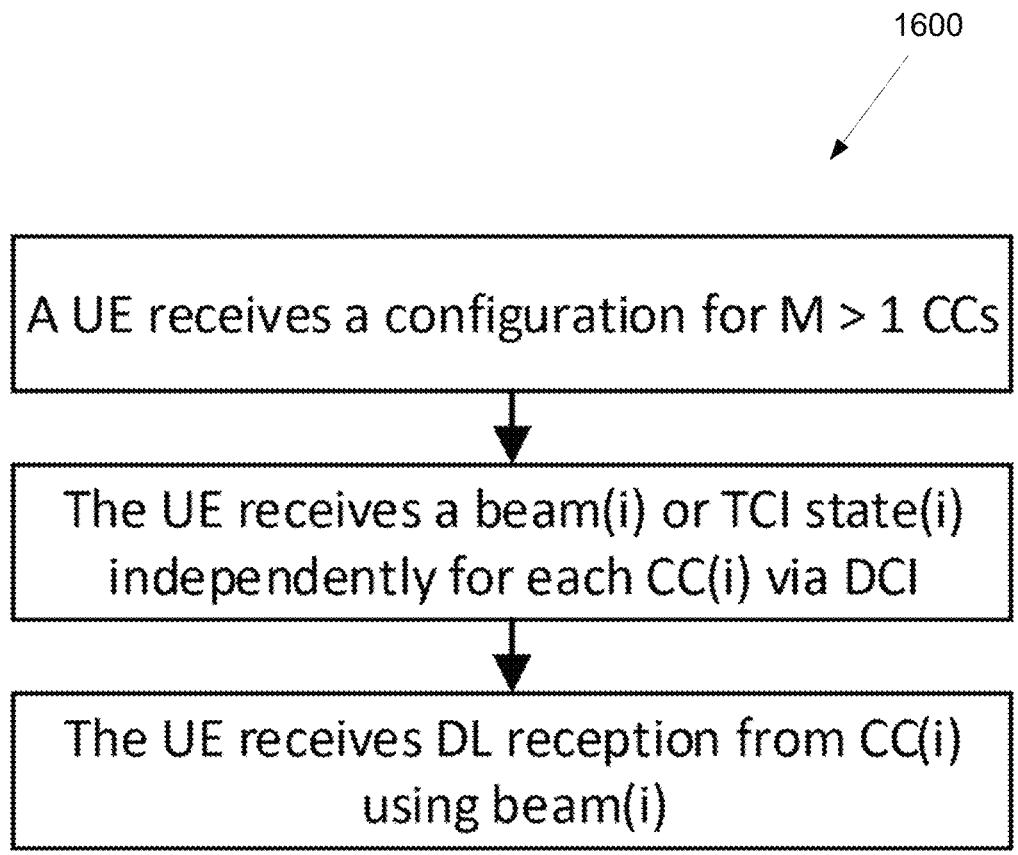
FIG. 16 illustrates a UE configured with a set of M>1 CCs for DL reception according to embodiments of the present disclosure.

FIG. 16 illustrates a UE configured with a set of M>1 CCs for DL reception 1600. The UE configured with a set of M>1 CCs for DL reception 1600 illustrated in FIG. 16 is for illustration only. FIG. 16 does not limit the scope of this disclosure to any particular implementation of the UE configured with a set of M>1 CCs for DL reception 1600.

In embodiment I.1, as shown in FIG. 16, a UE is configured with a set (list) of M>1 CCs (or DL BWPs or cells) for DL reception. The UE is further configured to receive a beam or TCI state(i) independently (separately) for each CC(i) via L-1 control (DCI) signaling. So, the UE receives M beams (TCI states), one for each CC(i), $i \in \{0, 1, \ldots, M-1\}$ via DCI.

In one example, the beam or TCI state(i) is used for the reception of PDSCH(i) (and/or DMRS for PDSCH(i)). In one example, the beam or TCI state(i) is used as a 'common' beam (TCI state) for the reception of both PDCCH(i) and PDSCH(i) (and/or DMRS for PDCCH(i) and PDSCH(i)). In one example, the beam or TCI state(i) is used (1) for the reception of PDSCH only or (2) as a 'common' beam (TCI state) for the reception of both PDCCH(i) and PDSCH(i). In one example, whether the beam or TCI state(i) is for (1) or (2) is indicated/configured (via RRC and/or MAC CE and/or DCI), where this indication/configuration can be common for all CCs or independent for each CC.

In a variation, the UE is further configured to receive two beams or TCI states independently (separately) for each CC(i) via L-1 control (DCI) signaling, wherein one of the two beams is used for the reception of PDSCH(i) (and/or DMRS for PDSCH(i)), and another of the two beams is used for the reception of PDCCH(i) (and/or DMRS for PDCCH (i)).

In another variation, the UE is further configured to receive K=1 or 2 beams independently (separately) for each CC(i) via L-1 control (DCI) signaling, wherein the value K can be configured via RRC and/or MAC CE and/or DCI based signaling. When K=2, one of the two beams is used for the reception of PDSCH(i) (and/or DMRS for PDSCH (i)), and another of the two beams is used for the reception of PDCCH(i) (and/or DMRS for PDCCH(i)). When K=1, the received beam is used receive PDSCH(i) and/or PDCCH (i) as explained above.

For simplicity, K=1 is assumed in the rest of this embodiment. The embodiment however is also applicable to K=2.

At least one of the following examples is used for the DCI indicating beams for M CCs.

Figure 17:
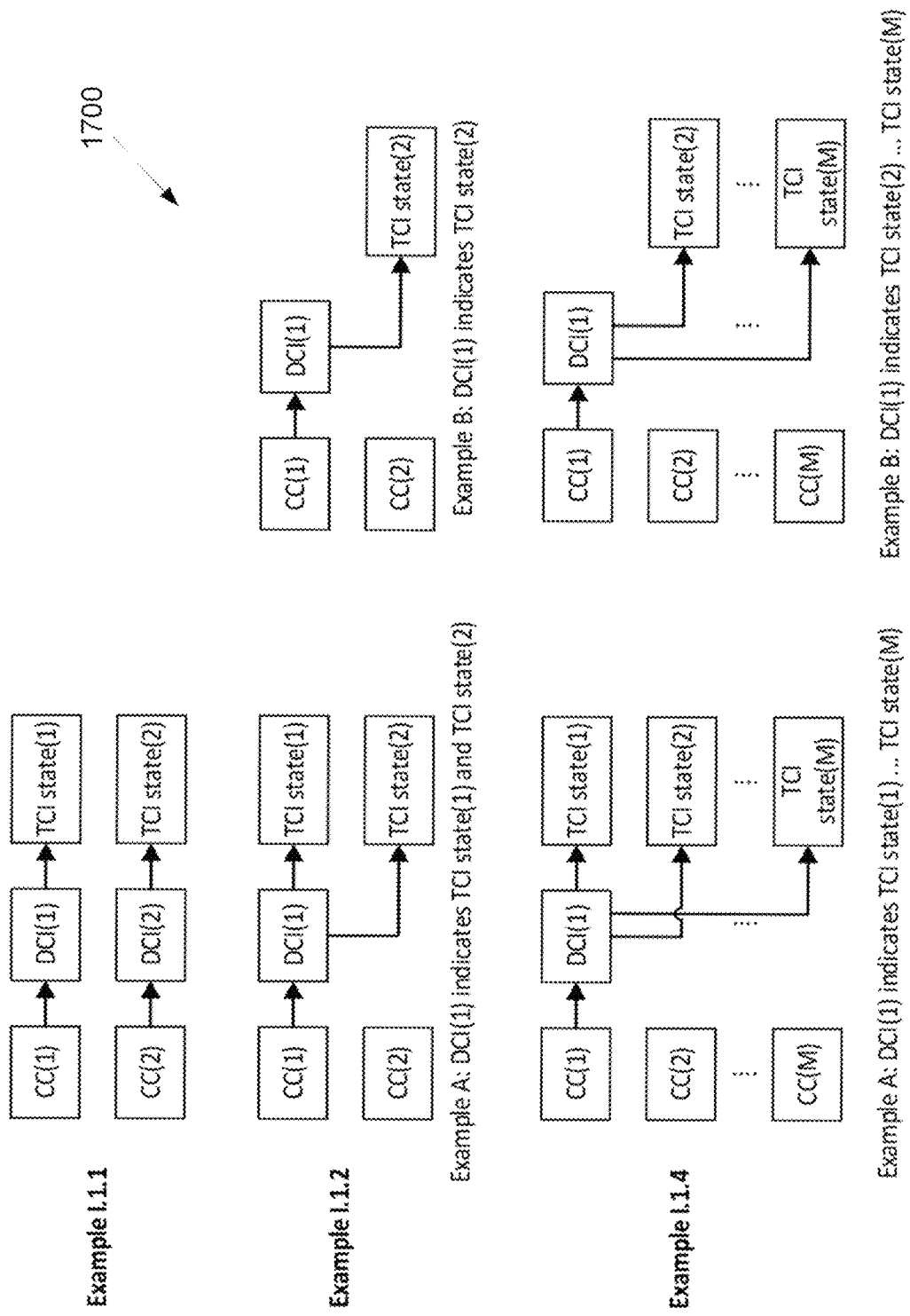
FIG. 17 illustrates examples of the DCI indicating beams for M CCs according to embodiments of the present disclosure.

Examples of the DCI indicating beams for M CCs 1700 is illustrated in FIG. 17. The example of the DCI indicating beams for M CCs 1700 illustrated in FIG. 17 is for illustration only. FIG. 17 does not limit the scope of this disclosure to any particular implementation of the DCI indicating beams for M CCs 1700.

In one example I..1.1 (in-carrier beam indication), for each CC(i), the UE is configured to receive a DCI(i) in PDCCH(i) associated with CC(i), wherein the DCI(i) includes an indication about the beam (TCI state) for CC(i). An example is shown in FIG. 17 for M=2.

In one example I.1.2 (of cross-carrier beam indication), the UE is configured to receive a DCI(i) in PDCCH(i) associated with CC(i), wherein the DCI(i) includes an indication about the beam (TCI state) for CC(i2) where i≠i2. In addition, the DCI(i) may also include an indication about the beam (TCI state) for CC(i). An example is shown in FIG. 17 for M=2 where two examples (A and B) are illustrated. At least one of the following examples is used or configured for (i, i2).

In one example I.1.2.1: both i and i2 are fixed, e.g., i=0 and i2=1.

In one example I.1.2.2: i is fixed (e.g., i=0) and i2 is configured (e.g., via higher layer RRC and/or MAC CE based signaling).

In one example I.1.2.3: i is configured (e.g., via higher layer RRC and/or MAC CE based signaling) and i2 is fixed (e.g., i2=1).

In one example I.1.2.4: both i and i2 are configured (e.g., via higher layer RRC and/or MAC CE based signaling).

In one example I.1.2.5: i is fixed or configured (e.g., via higher layer RRC and/or MAC CE based signaling), and i2 is indicated via DCI(i). For example, if M=3, i2 (M is indicated using a 1-bit indication in DCI(i).

In one example I.1.3, the UE is configured to receive a DCI(i) in PDCCH(i) associated with CC(i), wherein the DCI(i) includes an indication about the beam (TCI state) for CC(i2) where i2 can be the same as i or different from i, i.e., i=i2 or i≠i2. The information whether i=i2 or i≠i2 can be configured (e.g., via higher layer RRC and/or MAC CE based signaling).

In one example I.1.4 (of cross-carrier beam indication), the UE is configured to receive a DCI(i) in PDCCH(i) associated with CC(i), wherein the DCI(i) includes an indication about the beam (TCI state) for each CC(i2) in a subset comprising $M_2 \leq M$ CCs, where i2 $\in I_2$ and $I_2$ is the subset including $M_2$ CC indices. So, the indication via DCI(i) includes $M_2$ beams (TCI states), one for each CC(i2), where i2 $\in I_2$. The subset of indices $I_2$ may or may not include i. An example is shown in FIG. 17 where two examples (A and B) are illustrated. At least one of the following examples is used or configured for (i, $I_2$).

In one example I.1.4.1: both i and $I_2$ are fixed, e.g., i=0 and $I_2=\{0, 1, \ldots M-1\}$ or $\{1, M-1\}$.

In one example I.1.4.2: i is fixed (e.g., i=0) and $I_2$ is configured (e.g., via higher layer RRC and/or MAC CE based signaling).

In one example I.1.4.3: i is configured (e.g., via higher layer RRC and/or MAC CE based signaling) and $I_2$ is fixed (e.g., $I_2=\{0, 1, \ldots M-1\}$).

In one example I.1.4.4: both i and $I_2$ are configured (e.g., via higher layer RRC and/or MAC CE based signaling).

In one example I.1.4.5: i is fixed or configured (e.g., via higher layer RRC and/or MAC CE based signaling), and $I_2$ is indicated via DCI(i).

At least one of the following examples is used or configured for $M_2$.

In one example I.1.4.6: $M_2$ is fixed, e.g., $M_2$=M or M−1.

In one example I.1.4.7: $M_2$ is configured (e.g., via higher layer RRC and/or MAC CE based signaling).

In one example I.1.4.8: $M_2$ is indicated via DCI(i).

In one example I.1.5, the information (X) whether a beam (TCI state) for a CC(i) is provided (indicated) can be indicated. So, based on the information (X), the UE receives M or less, i.e., up to M beams (TCI states) indicated via DCI. The information (X) can be a bitmap (bit sequence) $b_1 b_2 \ldots b_M$ comprising M bits. In one example, $b_i$=0 indicates that a beam (TCI state) is not provided for CC(i) and $b_i$=1 indicates that a beam (TCI state) is provided for CC(i). In one example, $b_i$=1 indicates that a beam (TCI state) is not provided for CC(i) and $b_i$=0 indicates that a beam (TCI state) is provided for CC(i). At least one of the following examples is used or configured.

In one example I.1.5.1: a UE is configured to receive the information (X) via a separate DCI associated with a CC.

In one example I.1.5.2: a UE is configured to receive the information (X) via DCI1 of a two-stage DCI comprising DCI1 and DCI2. The first stage DCI1 can be associated with a fixed CC, e.g., CC(1) or the location (e.g., CC index) of the first stage DCI can be configured via RRC and/or MAC CE based signaling. The second stage DCI2 indicates beams (TCI states) only for the CCs whose beams are expected to be provided based on the information (X) via DCI1. The location (e.g., CC index) of the second stage DCI can be fixed (e.g., CC(1)) or configured via RRC and/or MAC CE based signaling.

In one example I.1.5.3: a UE is configured to receive the information (X) via DCI0 of a (P+1)-stage DCI comprising $DCI_0, DCI_1, \ldots, DCI_P$. Here, P is the number of CC(s) whose beams are indicated (provided) by $DCI_1, \ldots, DCI_P$. The first stage DCI0 can be associated with a fixed CC, e.g., CC(1) or the location (e.g., CC index) of the first stage DCI can be configured via RRC and/or MAC CE based signaling. The k-th stage $DCI_k$ indicates a beam (TCI state) for the k-th CC whose beam is expected to be provided based on the information (X) via $DCI_0$. The location (e.g., CC index) of the k-th stage $DCI_k$ can be fixed (e.g., k-th CC itself) or configured via RRC and/or MAC CE based signaling.

In one example I.1.5.4: a UE is configured to determine the number of TCI state(s) via an OCC cover and/or scrambling sequence of the PDCCH DMRS and/or frequency resource index (PRB index) and/or CCE index and/or time resource index (symbol, slot, subframe and/or frame). The UE is further configured to receive the information X and the group of TCI state(s) via a DCI associated with the PDCCH DMRS and a CC. For example, if the configured CCs whose TCI state is being indicated is 3, three OCC codes are configured for PDCCH DMRS {OCC(0), OCC(1), OCC(2)}, wherein OCC(0) is used to indicate TCI state for one component carrier, OCC(1) is used to indicate TCI state for two component carriers and OCC(2) is used to indicate TCI state for three component carriers. Furthermore, depending on the OCC used for the PDCCH DMRS:

In case of OCC(0): DCI includes either a 3-bit bitmap, or a combinatorial index from 1 to 3 (or 0 to 2) indicating the CC whose TCI state is included in the DCI.

In case of OCC(1): DCI includes either a 3-bit bitmap, or a combinatorial index from 1 to 3 (or 0 to 2) indicating the CCs, e.g., from set {CC(0) CC(1), CC(0) CC(2), CC(1) CC(2)} whose TCI states are included in the DCI.

In case of CC(2): DCI includes either a 3-bit bitmap, or no additional field, as the TCI states of all configured CCs are included in the DCI.

In the above examples, the DCI(i) for beam indication can be a dedicated DCI (separate from DL-DCI(i) scheduling DL assignment for CC(i)). Let DL-TCI-DCI(i) be the dedicated DCI. Alternatively, the DCI(i) can be the DL-DCI(i) scheduling DL assignment for CC(i). Alternatively, the DCI(i) can be either DL-TCI-DCI(i) or DL-DCI(i). Alternatively, the DCI(i) can be either DL-TCI-DCI(i) and/or DL-DCI(i). The details about the beam indication via DL-TCI-DCI(i) and/or DL-DCI(i) are according to U.S. patent application Ser. No. 17/214,738 filed on Mar. 26, 2021, the content of which is incorporated herein by reference.

Figure 18:
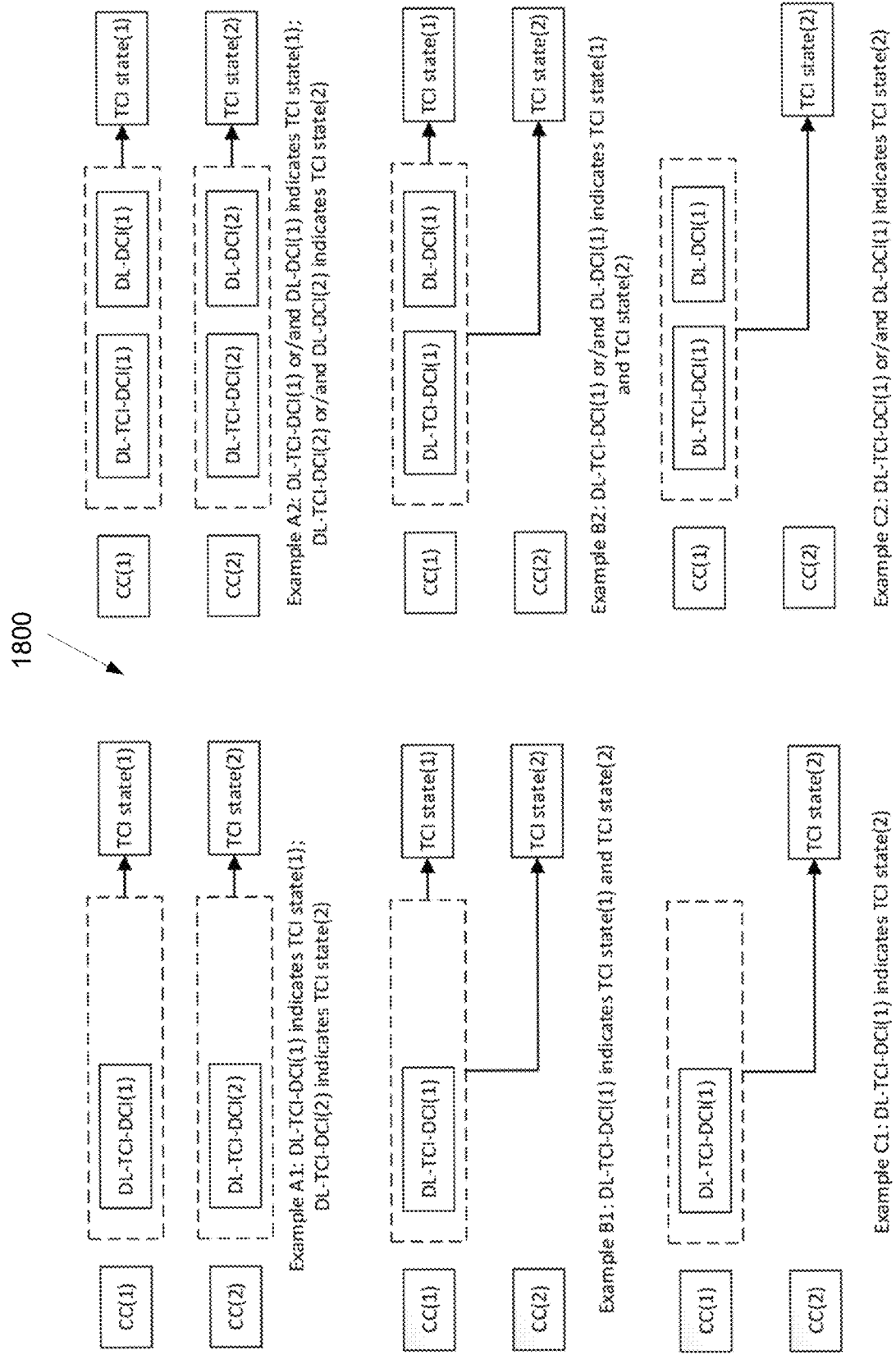
FIG. 18 illustrates examples of beam indication via DL-TCI-DCI(i) and/or DL-DCI(i) according to embodiments of the present disclosure.

Examples of beam indication via DL-TCI-DCI(i) and/or DL-DCI(i) 1800 are illustrated in FIG. 18. The examples of the beam indication via DL-TCI-DCI(i) and/or DL-DCI(i) 1800 illustrated in FIG. 18 is for illustration only. FIG. 18 does not limit the scope of this disclosure to any particular implementation of the beam indication via DL-TCI-DCI(i) and/or DL-DCI(i) 1800. A few examples are shown in FIG. 18 for M=2, wherein In one example A1, there is a dedicated DL-TCI-DCI(1) to indicate TCI state(1) for CC(1) and a dedicated DL-TCI-DCI(2) to indicate TCI state(2) for CC(2). Note that DL-TCI-DCI(1) and DL-TCI-DCI(2) are separate from DL-DCI(1) and DL-DCI(2) scheduling PDSCH from CC(1) and CC(2), respectively.

In one example A2, there is a dedicated DL-TCI-DCI(1) to indicate TCI state(1) for CC(1) and a dedicated DL-TCI-DCI(2) to indicate TCI state(2) for CC(2). In addition to the dedicated DL-TCI-DCI(i), the DL-DCI (i) can also be used to indicated TCI state(i) where i=1,2. Therefore, the TCI state(i) can be indicated via DL-TCI-DCI(i) and/or DL-DCI(i). The UE can be configured (e.g., via higher layer RRC) with the information whether the TCI state(i) is indicated via one of or both of DL-TCI-DCI(i) and DL-DCI(i).

In one example B1, there is a dedicated DL-TCI-DCI(1) to indicate TCI state(1) and TCI state(2) for CC(1) and CC(2), respectively. Note that DL-TCI-DCI(1) is separate from DL-DCI(1) scheduling PDSCH from CC(1).

In one example B2, there is a dedicated DL-TCI-DCI(1) to indicate TCI state(1) and TCI state(2) for CC(1) and CC(2), respectively. In addition to the dedicated DL-TCI-DCI(1), the DL-DCI(1) (and/or DL-DCI(2)) can also be used to indicated TCI state(1) and TCI state(2). Therefore, the TCI state(1) and TCI state(2) can be indicated via DL-TCI-DCI(1) and/or DL-DCI(1) (and/or DL-DCI(2)). The UE can be configured (e.g., via higher layer RRC) with the information whether the TCI state(1) and TCI state(2) are indicated via one of or both of DL-TCI-DCI(1) and DL-DCI(1) (and/or DL-DCI(2)).

In one example C1, there is a dedicated DL-TCI-DCI(1) to indicate TCI state(2) for CC(2). Note that DL-TCI-DCI(1) is separate from DL-DCI(1) scheduling PDSCH from CC(1).

In one example C2, there is a dedicated DL-TCI-DCI(1) to indicate TCI state(2) for CC(2). In addition to the dedicated DL-TCI-DCI(1), the DL-DCI(1) (and/or DL-DCI(2)) can also be used to indicated TCI state(2). Therefore, the TCI state(2) can be indicated via DL-TCI-DCI(1) and/or DL-DCI(1) (and/or DL-DCI(2)). The UE can be configured (e.g., via higher layer RRC) with the information whether the TCI state(2) are indicated via one of or both of DL-TCI-DCI(1) and DL-DCI(1) (and/or DL-DCI(2)).

It is straightforward to extend the above-mentioned examples to M>2.

Figure 19:
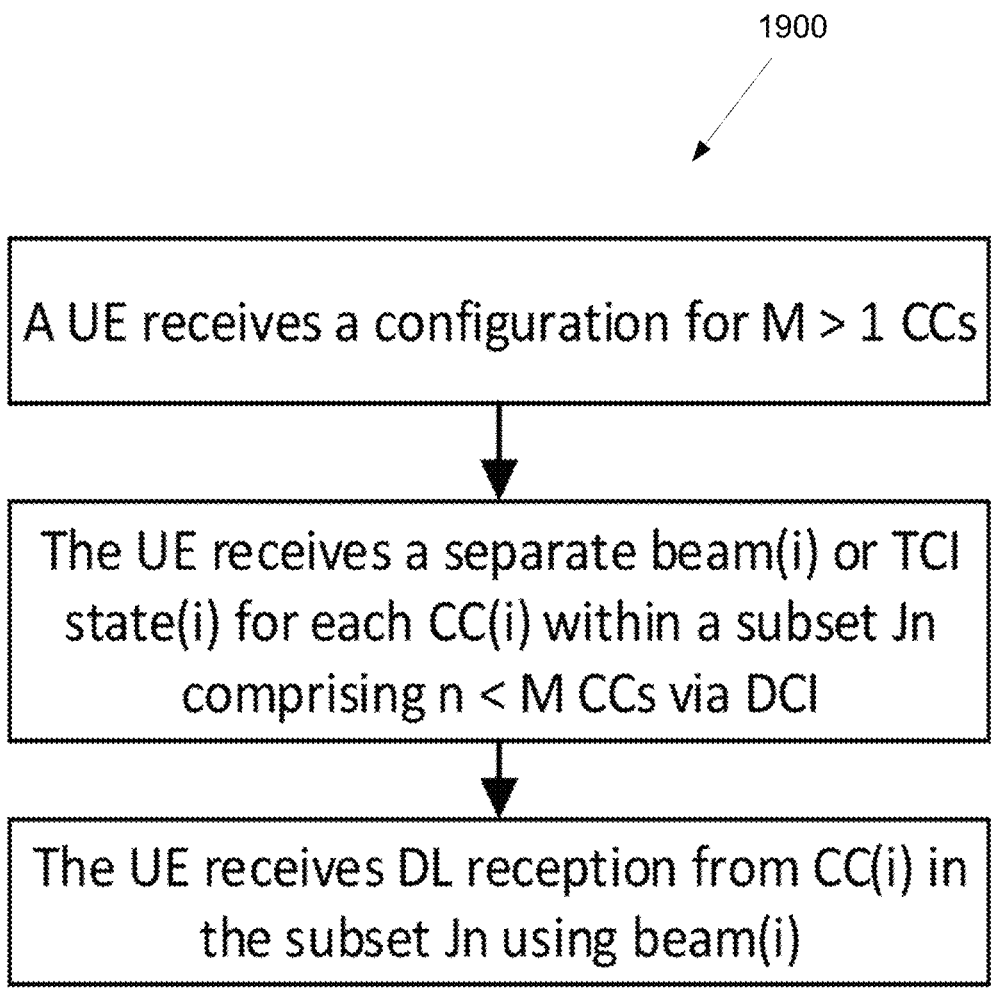
FIG. 19 illustrates a UE configured with a set of M>1 CCs for DL reception according to embodiments of the present disclosure.

FIG. 19 illustrates a UE configured with a set of M>1 CCs for DL reception 1900. The UE configured with a set of M>1 CCs for DL reception 1900 illustrated in FIG. 19 is for illustration only. FIG. 19 does not limit the scope of this disclosure to any particular implementation of the UE configured with a set of M>1 CCs for DL reception 1900.

In one embodiment I.2, as shown in FIG. 19, a UE is configured with a set (list) of M>1 CCs (or DL BWPs or cells) for DL reception. The UE is further configured to receive a beam or TCI state(i) independently (separately) for each CC(i) within a subset (list) of CCs via L-1 control (DCI) signaling. Let n (where n<M) be number of CCs in the subset (list) and let $J_n$ be the subset (list) of CCs. So, the UE receives n beams (TCI states), one for each CC(i), i∈$J_n$, in the subset.

In one example, the beam or TCI state(i) is used for the reception of PDSCH(i) (and/or DMRS for PDSCH(i)). In one example, the beam or TCI state(i) is used as a 'common' beam (TCI state) for the reception of both PDCCH(i) and PDSCH(i) (and/or DMRS for PDCCH(i) and PDSCH(i)). In one example, the beam or TCI state(i) is used (1) for the reception of PDSCH only or (2) as a 'common' beam (TCI state) for the reception of both PDCCH(i) and PDSCH(i). In one example, whether the beam or TCI state(i) is for (1) or (2) is indicated/configured (via RRC and/or MAC CE and/or DCI), where this indication/configuration can be common for all CCs or independent for each CC.

In a variation, the UE is further configured to receive two beams or TCI states independently (separately) for each CC(i) via L-1 control (DCI) signaling, wherein one of the two beams is used for the reception of PDSCH(i) (and/or DMRS for PDSCH(i)), and another of the two beams is used for the reception of PDCCH(i) (and/or DMRS for PDCCH(i)).

In another variation, the UE is further configured to receive K=1 or 2 beams independently (separately) for each CC(i) via L-1 control (DCI) signaling, wherein the value K can be configured via RRC and/or MAC CE and/or DCI based signaling. When K=2, one of the two beams is used for the reception of PDSCH(i) (and/or DMRS for PDSCH (i)), and another of the two beams is used for the reception of PDCCH(i) (and/or DMRS for PDCCH(i)). When K=1, the received beam is used receive PDSCH(i) and/or PDCCH (i) as explained above.

For simplicity, K=1 is assumed in the rest of this embodiment. The embodiment however is also applicable to K=2.

The subset $J_n$ can be fixed. Alternatively, the subset $J_n$ can be indicated via MAC CE based signaling/activation. Alternatively, the subset $J_n$ can be configured via RRC. Alternatively, the subset $J_n$ can be indicated/configured via a combination of MAC CE and RRC based signaling (RRC configures a potentially larger set of CCs and MAC CE selects the subset $J_n$ from the larger set of CCs).

In one example, a bitmap (bit sequence) $d_1 d_2 \ldots d_M$ comprising M bits is used to configure/indicate the first subset, where a bit $d_i$ is associated with CC(i). For example, the subset $J_n$ includes all CCs with indices i such that $d_i=0$. Alternatively, the subset $J_n$ includes all CCs with indices i such that $d_i=1$. The configuration of the bitmap can be via higher layer RRC signaling. Alternatively, the configuration of the bitmap can be via MAC CE based signaling.

In another example, an $$\left\lceil \log_2 \binom{M}{n} \right\rceil$$

bits indication is used to indicate a combinatorial index k $$\in \left\{ 0, 1, \ldots, \binom{M}{n} - 1 \right\}$$

which indicates the subset $J_n$. The indication of k can be via higher layer RRC signaling. Alternatively, the indication of k can be via MAC CE based signaling.

The number (n) of CCs in the subset $J_n$ can be fixed (e.g., $n=\lceil M/2 \rceil$ or $\lceil M/2 \rceil$) or can be any value such that $1 \le n < M$. Alternatively, the number (n) can be configured via RRC and/or MAC CE and/or DCI based signaling.

Note that since the beams (TCI states) for CCs not included in the subset $J_n$ are not indicated, their beams for DL reception can be the latest beams (if available) indicated for them or some default beams (e.g., if the latest beams for them are not received).

The DCI indicating beams for CCs in the subset $J_n$ can be associated with a fixed CC (e.g., CC(1) or a fixed CC within the subset $J_n$). Alternatively, the DCI indicating beams for CCs in the subset $J_n$ can be associated with a CC within the subset $J_n$. Alternatively, the DCI indicating beams for CCs in the subset $J_n$ can be associated with a CC outside (not belonging to or included in) the subset $J_n$. Alternatively, the DCI indicating beams for CCs in the subset $J_n$ can be associated with a CC whose index is configured (e.g., via MAC CE and/or RRC based signaling).

At least one of the following examples is used for the DCI indicating beams for CCs in the subset $J_n$.

Figure 20:
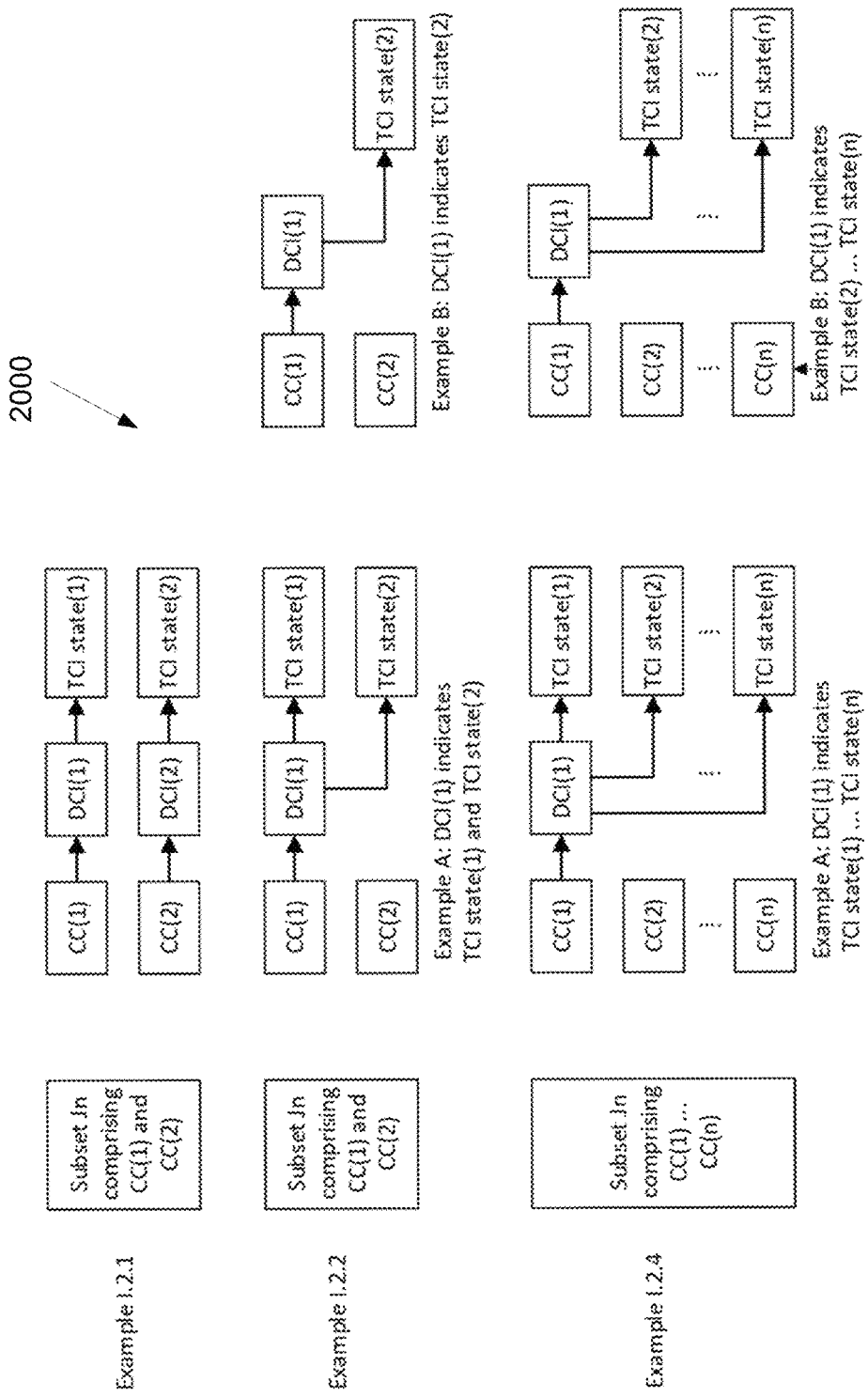
FIG. 20 illustrates a UE configured to receive a DCI(i) in PDCCH(i) associated with CC(i) according to embodiments of the present disclosure.

FIG. 20 illustrates a UE configured to receive a DCI(i) in PDCCH(i) associated with CC(i) 2000. The UE configured to receive a DCI(i) in PDCCH(i) associated with CC(i) 2000 illustrated in FIG. 20 is for illustration only. FIG. 20 does not limit the scope of this disclosure to any particular implementation of the UE configured to receive a DCI(i) in PDCCH(i) associated with CC(i) 2000.

In one example I.2.1 (in-carrier beam indication), for each CC(i) in the subset $J_n$, the UE is configured to receive a DCI(i) in PDCCH(i) associated with CC(i), wherein the DCI(i) includes an indication about the beam (TCI state) for CC(i). An example is shown in FIG. 20 for n=2.

In one example I.2.2 (of cross-carrier beam indication), the UE is configured to receive a DCI(i) in PDCCH(i) associated with CC(i), wherein the DCI(i) includes an indication about the beam (TCI state) for CC(i2) in the subset $J_n$ where i≠i2. In addition, the DCI(i) may also include an indication about the beam (TCI state) for CC(i) in the subset $J_n$. An example is shown in FIG. 20 for n=2 where two examples (A and B) are illustrated. At least one of the following examples is used or configured for (i, i2).

In one example I.2.2.1: both i and i2 are fixed, e.g., i=first CC in the subset $J_n$ and i2=second CC in the subset $J_n$.

In one example I.2.2.2: i is fixed (e.g., i=first CC in the subset $J_n$) and i2 is configured (e.g., via higher layer RRC and/or MAC CE based signaling).

In one example I.2.2.3: i is configured (e.g., via higher layer RRC and/or MAC CE based signaling) and i2 is fixed (e.g., i2=second CC in the subset $J_n$).

In one example I.2.2.4: both i and i2 are configured (e.g., via higher layer RRC and/or MAC CE based signaling).

In one example I.2.3, the UE is configured to receive a DCI(i) in PDCCH(i) associated with CC(i), wherein the DCI(i) includes an indication about the beam (TCI state) for CC(i2) in the subset $J_n$ where i2 can be the same as i or different from i, i.e., i=i2 or i≠i2. The information whether i=i2 or i≠i2 can be configured (e.g., via higher layer RRC and/or MAC CE based signaling).

In one example I.2.4 (of cross-carrier beam indication), the UE is configured to receive a DCI(i) in PDCCH(i) associated with CC(i), wherein the DCI(i) includes an indication about the beam (TCI state) for each CC(i2) in another subset (of the subset $J_n$) comprising $n_2 \le n$ CCs, where i2 $\in I_2$ and $I_2$ is the another subset including $n_2$ CC indices. So, the indication via DCI(i) includes $n_2$ beams (TCI states), one for each CC(i2), where i2 $\in I_2$. The subset of indices $I_2$ may or may not include i. An example is shown in FIG. 20 where two examples (A and B) are illustrated. At least one of the following examples is used or configured for (i, $I_2$).

In one example I.2.4.1: both i and $I_2$ are fixed, e.g., i=first CC in the subset $J_n$ and $I_2=\{0, 1, \ldots n-1\}$ or $\{1, \ldots n-1\}$.

In one example I.2.4.2: i is fixed (e.g., i=first CC in the subset $J_n$) and $I_2$ is configured (e.g., via higher layer RRC and/or MAC CE based signaling).

In one example I.2.4.3: i is configured (e.g., via higher layer RRC and/or MAC CE based signaling) and $I_2$ is fixed (e.g., $I_2=\{0, 1, \ldots n-1\}$).

In one example I.2.4.4: both i and $I_2$ are configured (e.g., via higher layer RRC and/or MAC CE based signaling).

At least one of the following examples is used or configured for $n_2$.

In one example I.2.4.5: $n_2$ is fixed, e.g., $n_2=n$ or $n-1$.

In one example I.2.4.6: $n_2$ is configured (e.g., via higher layer RRC and/or MAC CE based signaling).

In one example I.2.5, the information (X) whether a beam (TCI state) for a CC(i) in the subset $J_n$ is provided (indicated) can be indicated. So, based on the information (X), the UE receives n or less, i.e., up to n beams (TCI states) indicated via DCI. The information (X) can be a bitmap (bit sequence) $b_1 b_2 \ldots b_n$ comprising n bits. In one example, $b_i=0$ indicates that a beam (TCI state) is not provided for the i-th CC in the subset $J_n$ and $b_i=1$ indicates that a beam (TCI state) is provided for the i-th CC in the subset $J_n$. In one example, $b_i=1$ indicates that a beam (TCI state) is not provided for the i-th CC in the subset $J_n$ and $b_i=0$ indicates that a beam (TCI state) is provided for the i-th CC in the subset $J_n$. At least one of the following examples is used or configured.

In one example I.2.5.1: a UE is configured to receive the information (X) via a separate DCI associated with a CC (within the subset $J_n$ or outside the subset $J_n$).

In one example I.2.5.2: a UE is configured to receive the information (X) via DCI1 of a two-stage DCI comprising DCI1 and DCI2. The first stage DCI1 can be associated with a fixed CC (e.g., CC(1) or a CC within the subset $J_n$) or the location (e.g., CC index) of the first stage DCI can be configured via RRC and/or MAC CE based signaling. The second stage DCI2 indicates beams (TCI states) only for the CCs whose beams are expected to be provided based on the information (X) via DCI1. The location (e.g., CC index) of the second stage DCI can be fixed (e.g., CC(1) or a CC within the subset $J_n$) or configured via RRC and/or MAC CE based signaling.

In one example I.2.5.3: a UE is configured to receive the information (X) via DCI0 of a (P+1)-stage DCI comprising $DCI_0, DCI_1, \ldots, DCI_P$. Here, P is the number of CC(s) whose beams are indicated (provided) by $DCI_1, \ldots, DCI_P$. The first stage DCI0 can be associated with a fixed CC (e.g., CC(1) or a CC within the subset $J_n$) or the location (e.g., CC index) of the first stage DCI can be configured via RRC and/or MAC CE based signaling. The k-th stage $DCI_k$ indicates a beam (TCI state) for the k-th CC whose beam is expected to be provided based on the information (X) via $DCI_0$. The location (e.g., CC index) of the k-th stage $DCI_k$ can be fixed (e.g., k-th CC itself) or configured via RRC and/or MAC CE based signaling.

In one example I.2.5.4: a UE is configured to determine the number of TCI state(s) via an OCC cover and/or scrambling sequence of the PDCCH DMRS and/or frequency resource index (PRB index) and/or CCE index and/or time resource index (symbol, slot, subframe and/or frame). The UE is further configured to receive the information X and the group of TCI state(s) via a DCI associated with the PDCCH DMRS and a CC. For example, if the subset of CCs whose TCI state is being indicated is 3, three OCC codes are configured for PDCCH DMRS {OCC(0), OCC(1), OCC(2)}, wherein OCC(0) is used to indicate TCI state for one component carrier, OCC(1) is used to indicate TCI state for two component carriers and OCC(2) is used to indicate TCI state for three component carriers. Furthermore, depending on the OCC used for the PDCCH DMRS:

- In case of OCC(0): DCI includes either a 3-bit bitmap, or a combinatorial index from 1 to 3 (or 0 to 2) indicating the CC whose TCI state is included in the DCI.
- In case of OCC(1): DCI includes either a 3-bit bitmap, or a combinatorial index from 1 to 3 (or 0 to 2) indicating the CCs, e.g., from set {CC(0) CC(1), CC(0) CC(2), CC(1) CC(2)} whose TCI states are included in the DCI.
- In case of CC(2): DCI includes either a 3-bit bitmap, or no additional field, as the TCI states of all CCs in the subset are included in the DCI.

In the above examples, the DCI(i) for beam indication can be a dedicated DCI (separate from DL-DCI(i) scheduling DL assignment for CC(i)). Let DL-TCI-DCI(i) be the dedicated DCI. Alternatively, the DCI(i) can be the DL-DCI(i) scheduling DL assignment for CC(i). Alternatively, the DCI(i) can be either DL-TCI-DCI(i) or DL-DCI(i). Alternatively, the DCI(i) can be either DL-TCI-DCI(i) and/or DL-DCI(i). The details about the beam indication via DL-TCI-DCI(i) and/or DL-DCI(i) are according to U.S. patent application Ser. No. 17/214,738 filed on Mar. 26, 2021. A few examples are shown in FIG. 18 for M=2.

Independent Beam for DL Reception and DCI+MAC-CE Based Beam Indication

Figure 21:
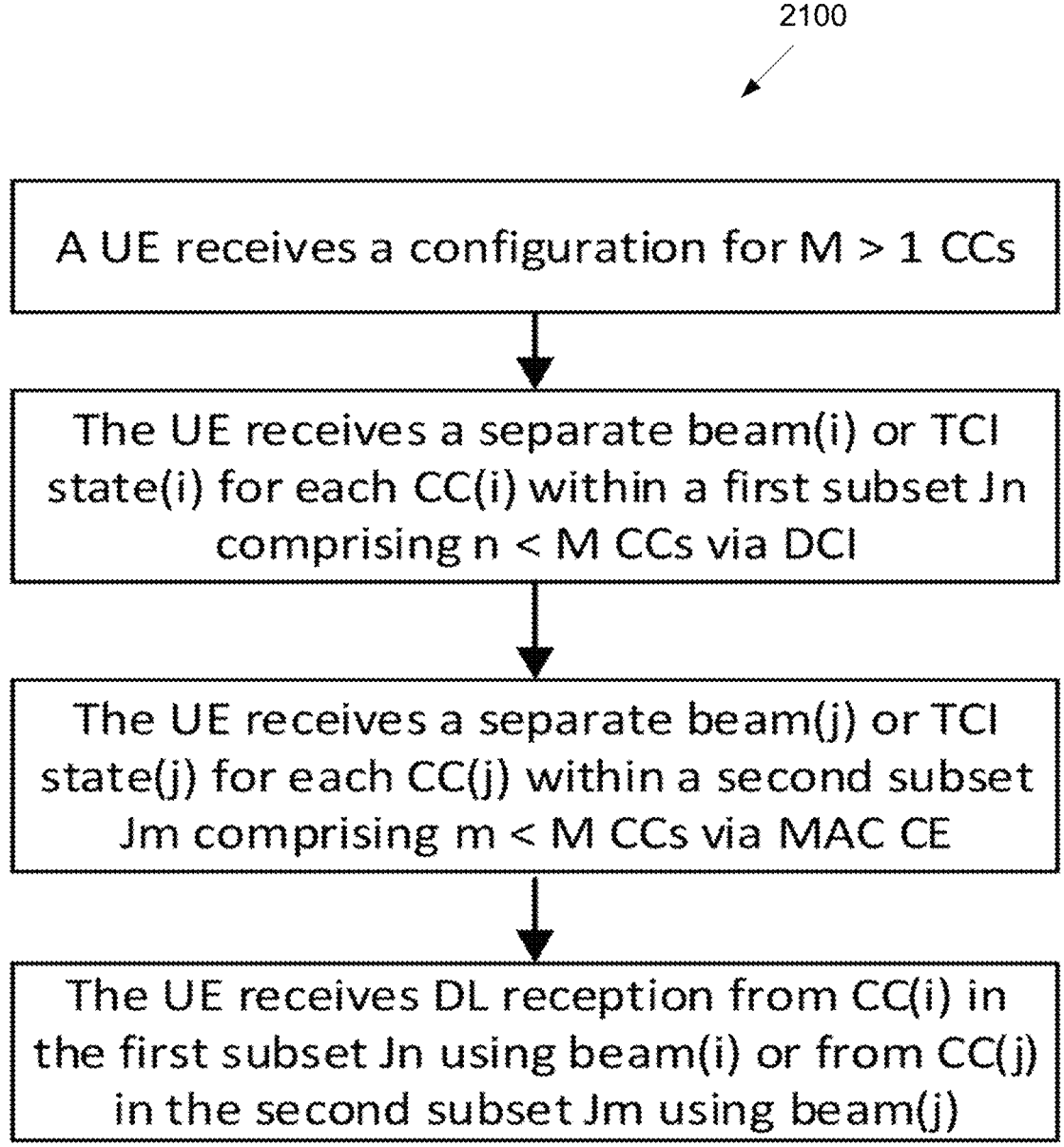
FIG. 21 illustrates a UE configured with a set of M>1 CCs for DL reception according to embodiments of the present disclosure.

FIG. 21 illustrates a UE configured with a set of M>1 CCs for DL reception 2100. The UE configured with a set of M>1 CCs for DL reception 2100 illustrated in FIG. 21 is for illustration only. FIG. 21 does not limit the scope of this disclosure to any particular implementation of the UE configured with a set of M>1 CCs for DL reception 2100.

In embodiment I.3, as shown in FIG. 21, a UE is configured with a set (list) of M>1 CCs (or DL BWPs or cells) for DL reception. The UE is further configured to receive a beam or TCI state(i) independently (separately) for each CC(i) within a first subset (list) of CCs via L-1 control (DCI) signaling, and a beam or TCI state(i) independently (separately) for each CC(i) within a second subset (list) of CCs via MAC CE based signaling/activation. Let n and m be number of CCs in the first and second subsets (lists), respectively, where $0 \le n, m \le M$ such that $n+m \le M$. Note that when n=0, there is no beam indication via DCI, and likewise, when m=0, there is no beam indication via MAC CE. Let $J_n$ and $J_m$ be the subset (list) of CCs in the first and second subsets (lists), respectively. So, the UE receives n beams (TCI states), one for each CC(i), $i \in J_n$, in the first subset via DCI, and m beams (TCI states), one for each CC(i), $i \in J_m$, in the second subset via MAC CE.

In one example, the beam or TCI state(i) is used for the reception of PDSCH(i) (and/or DMRS for PDSCH(i)). In one example, the beam or TCI state(i) is used as a 'common' beam (TCI state) for the reception of both PDCCH(i) and PDSCH(i) (and/or DMRS for PDCCH(i) and PDSCH(i)). In one example, the beam or TCI state(i) is used (1) for the reception of PDSCH only or (2) as a 'common' beam (TCI state) for the reception of both PDCCH(i) and PDSCH(i). In one example, whether the beam or TCI state(i) is for (1) or (2) is indicated/configured (via RRC and/or MAC CE and/or DCI), where this indication/configuration can be common for all CCs or independent for each CC.

In a variation, the UE is further configured to receive two beams or TCI states independently (separately) for each CC(i) via L-1 control (DCI) signaling, wherein one of the two beams is used for the reception of PDSCH(i) (and/or DMRS for PDSCH(i)), and another of the two beams is used for the reception of PDCCH(i) (and/or DMRS for PDCCH (i)).

In another variation, the UE is further configured to receive K=1 or 2 beams independently (separately) for each CC(i) via L-1 control (DCI) signaling, wherein the value K can be configured via RRC and/or MAC CE and/or DCI based signaling. When K=2, one of the two beams is used for the reception of PDSCH(i) (and/or DMRS for PDSCH (i)), and another of the two beams is used for the reception of PDCCH(i) (and/or DMRS for PDCCH(i)). When K=1, the received beam is used receive PDSCH(i) and/or PDCCH (i) as explained above.

For simplicity, K=1 is assumed in the rest of this embodiment. The embodiment however is also applicable to K=2.

The first and second subsets (lists) of CCs can be fixed or configured via RRC and/or MAC CE based signaling. At least one of the following examples is used or configured for (n, m).

Example 1.3.1: both n and m are fixed, e.g., $n = \lceil M/2 \rceil$ and $m = \lfloor M/2 \rfloor$ Example 1.3.2: n is fixed (e.g., $n = \lceil M/2 \rceil$) and m is configured (e.g., via higher layer RRC and/or MAC CE based signaling).

Example 1.3.3: n is configured (e.g., via higher layer RRC and/or MAC CE based signaling) and m is fixed (e.g., $m = \lfloor M/2 \rfloor$).

Example 1.3.4: both n and m are configured (e.g., via higher layer RRC and/or MAC CE based signaling).

Example 1.3.5: Each CC is configured with a flag indicating whether it can belong to the first subset (list) or to the second subset (list). Furthermore, the sum of n plus m is configured (e.g., via higher layer RRC and/or MAC CE based signaling).

The subsets $J_n$ and/or $J_m$ can be fixed. Alternatively, the subsets $J_n$ and/or $J_m$ can be indicated via MAC CE based signaling/activation. Alternatively, the subsets $J_n$ and/or $J_m$ can be configured via RRC. Alternatively, the subsets $J_n$ and/or $J_m$ can be indicated/configured via a combination of MAC CE and RRC based signaling (e.g., RRC configures a potentially larger set of CCs and MAC CE selects the subsets $J_n$ and/or $J_m$ from the larger set of CCs).

In one example, a bitmap (bit sequence) $d_1 d_2 \ldots d_M$ comprising M bits is used to configure the first and second subsets, where a bit $d_i$ is associated with CC(i). For example, the first subset $J_n$ includes all CCs with indices i such that $d_i=0$, and the second subset $J_m$ includes all CCs with indices i such that $d_i=1$. Alternatively, the first subset $J_n$ includes all CCs with indices i such that $d_i=1$, and the second subset $J_m$ includes all CCs with indices i such that $d_i=0$. The configuration of the bitmap can be via higher layer RRC signaling. Alternatively, the configuration of the bitmap can be via MAC CE based signaling.

In another example, an $$\left\lceil \log_2 \binom{M}{n} \right\rceil$$

bits indication is used to indicate a combinatorial index k $$\in \left\{0, 1, \ldots, \binom{M}{n} - 1\right\}$$

which indicates the first subset $J_n$. The second subset $J_m$ includes the CCs not included in the first subset $J_n$ indicated via k. Alternatively, an $$\left\lceil \log_2 \binom{M}{m} \right\rceil$$

bits indication is used to indicate a combinatorial index k $$\in \left\{0, 1, \ldots, \binom{M}{m} - 1\right\}$$

which indicates the second subset $J_m$. The first subset $J_n$ includes the CCs not included in the second subset $J_m$ indicated via k. The indication of k can be via higher layer RRC signaling. Alternatively, the indication of k can be via MAC CE based signaling. In this example, it is assumed that n+m=M.

In another example, when n+m≤M, the indication of the first and second subsets can be based on a two-step mechanism:
- In a first step, an intermediate set of CCs is selected/indicated from the full set of M CCs.
- In a second step, the first subset of CCs, $J_n$, is selected/indicated from the intermediate set, and the second subset $J_m$ includes the remaining CCs in the intermediate set that are not included in the first subset $J_n$. Alternatively, the second subset of CCs, $J_m$, is selected/indicated from the intermediate set, and the first subset $J_n$ includes the remaining CCs in the intermediate set that are not included in the second subset $J_m$.

The indication in the first step and/or the indication in the second step can be via higher layer RRC signaling. Alternatively, the indication in the first step and/or the indication in the second step can be via MAC CE based signaling. Alternatively, the indication in the first step can be via RRC, and the indication in the second step can be via MAC CE.

In another example, when n+m<M, an $$\left\lceil \log_2 \binom{M}{n} \right\rceil$$

bits indication is used to indicate a combinatorial index k $$\in \left\{0, 1, \ldots, \binom{M}{n} - 1\right\}$$

which indicates the first subset $J_n$ and an $\lceil \log_2 \binom{M}{m} \rceil$ bits indication is used to indicate a combinatorial index l $$\in \left\{0, 1, \ldots, \binom{M}{m} - 1\right\}$$

which indicates the second subset $J_m$. The indication of k and/or l can be via higher layer RRC signaling. Alternatively, the indication of k and/or l can be via MAC CE based signaling.

In another example, when n+m<M, an $$\left\lceil \log_2 \binom{M}{n+m} \right\rceil$$

bits indication is used to indicate a combinatorial index k $$\in \left\{0, 1, \ldots, \binom{M}{n+m} - 1\right\}$$

which indicates an intermediate set comprising CCs in the first and second subsets, $J_n$ and $J_m$, and an $$\left\lceil \log_2 \binom{m+n}{n} \right\rceil$$

bits indication is used to indicate a combinatorial index l $$\in \left\{0, 1, \ldots, \binom{m+n}{n} - 1\right\}$$

which indicates the first subset $J_n$ of the intermediate set. The second subset $J_m$ includes the remaining CCs in the intermediate set that are not included in the first subset $J_n$ indicated via l. The indication of k and/or l can be via higher layer RRC signaling. Alternatively, the indication of k and/or l can be via MAC CE based signaling. Alternatively, the indication of k can be via RRC, and the indication of l can be via MAC CE.

In another example, when n+m<M, an $$\left\lceil \log_2 \binom{M}{n+m} \right\rceil$$

bits indication is used to indicate a combinatorial index k $$\in \left\{ 0, 1, \ldots, \binom{M}{n+m} - 1 \right\}$$

which indicates an intermediate set comprising CCs in the first and second subsets, $J_n$ and $J_m$, and an $$\left\lceil \log_2 \binom{m+n}{m} \right\rceil$$

bits indication is used to indicate a combinatorial index l $$\in \left\{ 0, 1, \ldots, \binom{m+n}{n} - 1 \right\}$$

which indicates the second subset $J_m$ of the intermediate set. The first subset $J_n$ includes the remaining CCs in the intermediate set that are not included in the second subset $J_m$ indicated via l. The indication of k and/or l can be via higher layer RRC signaling. Alternatively, the indication of k and/or l can be via MAC CE based signaling. Alternatively, the indication of k can be via RRC, and the indication of l can be via MAC CE.

When n+m<M, the beams (TCI states) for CCs not included in the subsets $J_n$ and $J_m$ are not indicated, and their beams for DL reception can be the latest beams (if available) indicated for them or some default beams (e.g., if the latest beams for them are not received).

The DCI indicating beams for CCs in the first subset $J_n$ can be associated with a fixed CC (e.g., CC(1) or a fixed CC within the first subset $J_n$). Alternatively, the DCI indicating beams for CCs in the first subset $J_n$ can be associated with a CC within the first subset $J_n$. Alternatively, the DCI indicating beams for CCs in the first subset $J_n$ can be associated with a CC outside (not belonging to or included in) the first subset $J_n$. Alternatively, the DCI indicating beams for CCs in the first subset $J_n$ can be associated with a CC whose index is configured (e.g., via MAC CE and/or RRC based signaling).

At least one of the examples I.2.1 through I.2.5 is used for the DCI indicating beams for CCs in the first subset $J_n$.

In the above examples, the DCI(i) for beam indication can be a dedicated DCI (separate from DL-DCI(i) scheduling DL assignment for CC(i)). Let DL-TCI-DCI(i) be the dedicated DCI. Alternatively, the DCI(i) can be the DL-DCI(i) scheduling DL assignment for CC(i). Alternatively, the DCI(i) can be either DL-TCI-DCI(i) or DL-DCI(i). Alternatively, the DCI(i) can be either DL-TCI-DCI(i) and/or DL-DCI(i). The details about the beam indication via DL-TCI-DCI(i) and/or DL-DCI(i) are according to U.S. patent application Ser. No. 17/214,738 filed on Mar. 26, 2021. A few examples are shown in FIG. 18 for M=2.

Component 2: Common Beam for DL Reception and DCI Based Beam Indication

Figure 22:
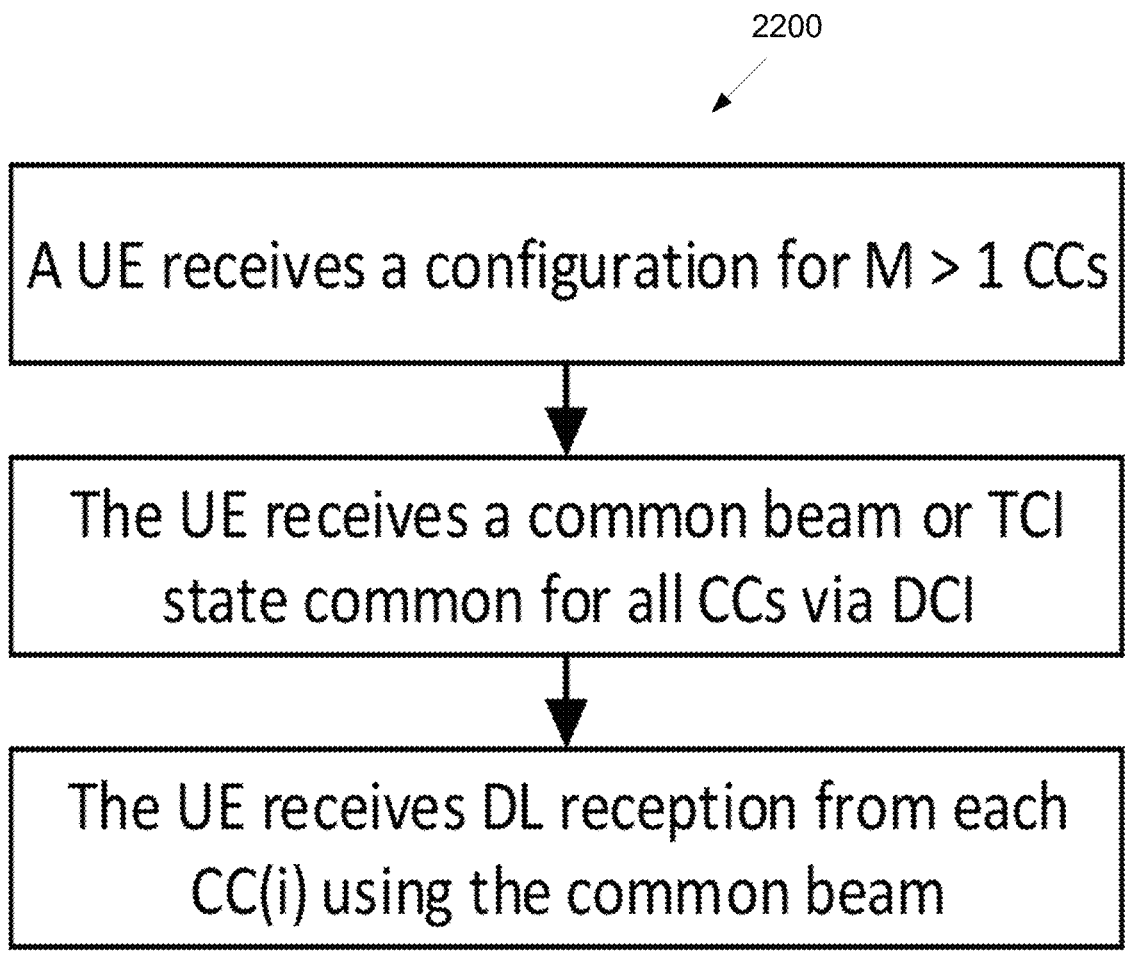
FIG. 22 illustrates a UE configured with a set of M>1 CCs for DL reception according to embodiments of the present disclosure.

FIG. 22 illustrates a UE configured with a set of M>1 CCs for DL reception 2200. The UE configured with a set of M>1 CCs for DL reception 2200 illustrated in FIG. 22 is for illustration only. FIG. 22 does not limit the scope of this disclosure to any particular implementation of the UE configured with a set of M>1 CCs for DL reception 2200.

In embodiment II.1, as shown in FIG. 22, a UE is configured with a set (list) of M>1 CCs (or DL BWPs or cells) for DL reception. The UE is further configured to receive a (single) common beam or TCI state for all CCs via L-1 control (DCI) signaling. So, the UE receives a common beam (TCI state) for all CCs via DCI. The reception of the common beam or TCI state can be via an identifier (ID) of the TCI state. The TCI state includes one/single source RS across the set of CCs, the one/single source can be determined from the indicated ID of the common TCI state and provides a spatial quasi-co-location (QCL) (e.g. QCL Type-D in NR specification) indication and determines UL transmit beam (e.g. spatial filter in NR specification) for the set of configured CCs.

In one example, the common beam or TCI state is used for the reception of PDSCH(i) (and/or DMRS for PDSCH(i)) of all CCs. In one example, the common beam or TCI state is used for the reception of both PDCCH(i) and PDSCH(i) (and/or DMRS for PDCCH(i) and PDSCH(i)) of all CCs. In one example, the common beam or TCI state is used for the reception of (1) PDSCH(i) only or (2) both PDCCH(i) and PDSCH(i). In one example, whether the common beam or TCI state is for (1) or (2) is indicated/configured (via RRC and/or MAC CE and/or DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs.

In another variation, the UE is further configured to receive K=1 or 2 beams common for all CCs via L-1 control (DCI) signaling, wherein the value K can be configured via RRC and/or MAC CE and/or DCI based signaling. When K=2, one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs. When K=1, the common beam is used receive PDSCH(i) and/or PDCCH(i) for all CCs as explained above.

For simplicity, K=1 is assumed in the rest of this embodiment. The embodiment however is also applicable to K=2.

Figure 23:
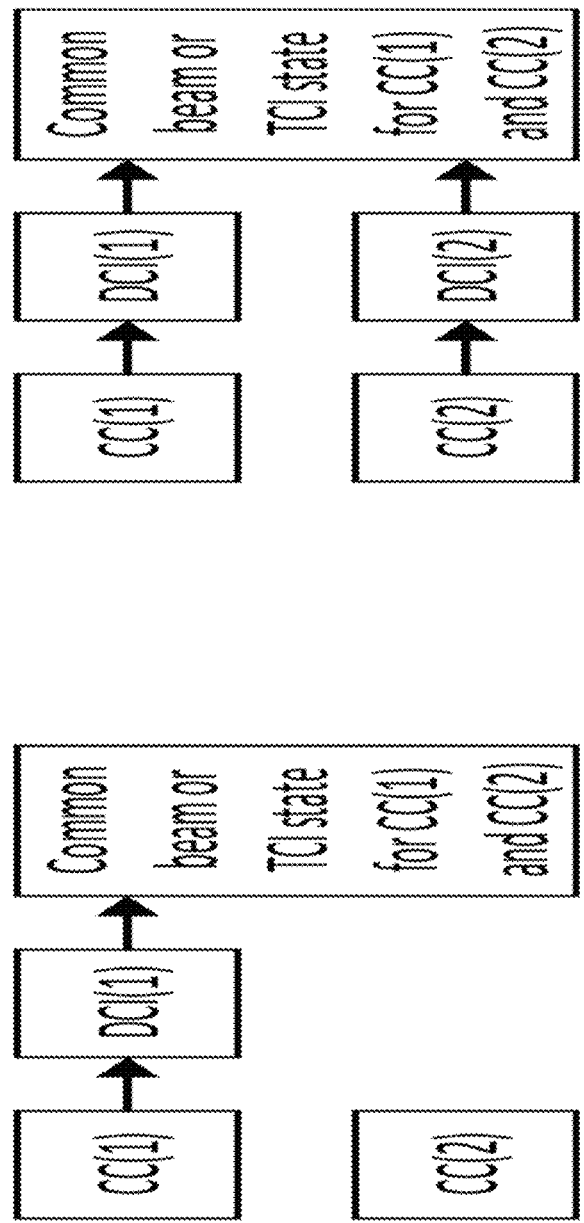
FIG. 23 illustrates examples of the DCI indicating beams for M CCs according to embodiments of the present disclosure.

Examples of the DCI indicating beams for M CCs 2300 is illustrated in FIG. 23. The example of the DCI indicating beams for M CCs 2300 illustrated in FIG. 23 is for illustration only. FIG. 23 does not limit the scope of this disclosure to any particular implementation of the DCI indicating beams for M CCs 2300.

At least one of the following examples is used for the DCI indicating beams for M CCs.

In one example II.1.1, the same (common) beam indication is a via a single DCI(x), where the location (CC index) x of the DCI is fixed, e.g., x=1. Alternatively, the location (CC index) x of the DCI is configured (e.g., RRC and/or MAC CE and/or DCI). An example is shown in FIG. 23 for M=2. In this example, the source RS determined from the indicated ID of the common TCI state provides QCL Type-D indication and determines UL TX spatial filter for a target CC in the list of CCs can be configured (e.g., via higher layer RRC), wherein the configuration can be received in a CC that can be the target CC or another CC.

In one example II.1.2, the same (common) beam indication is via multiple DCIs (i.e., repetition of the same beam indication), where the locations (CC indices) x of the multiple DCIs are fixed, e.g., x=1,2. Alternatively, the locations (CC indices) x of the multiple DCIs are configured (e.g., RRC and/or MAC CE and/or DCI). An example is shown in FIG. 23 for M=2.

In one example, the common beam indication according to this embodiment is restricted to the case of intra-band carrier aggregation (CA) with contiguous CCs. There is no restriction on the frequency range (i.e., FR1, FR2 in NR or FR4 for >52.4 GHz).

In one example, the common beam indication according to this embodiment is restricted to the case of intra-band with contiguous or non-contiguous CCs. There is no restriction on the frequency range (i.e., FR1, FR2 in NR or FR4 for >52.4 GHz).

In one example, the common beam indication according to this embodiment is restricted to the case of intra-band carrier aggregation (CA) with contiguous CCs, and the frequency range 1 (FR1).

In one example, the common beam indication according to this embodiment is restricted to the case of intra-band with contiguous or non-contiguous CCs, and the frequency range 1 (FR1).

In one example, the common beam indication according to this embodiment is restricted to the case of intra-band carrier aggregation (CA) with contiguous CCs, and the frequency range 2 (FR2).

In one example, the common beam indication according to this embodiment is restricted to the case of intra-band with contiguous or non-contiguous CCs, and the frequency range 2 (FR2).

In one example, the common beam indication according to this embodiment is restricted to the case of intra-band carrier aggregation (CA) with contiguous CCs, and the frequency range 4 (FR4).

In one example, the common beam indication according to this embodiment is restricted to the case of intra-band with contiguous or non-contiguous CCs, and the frequency range 4 (FR4).

In one example, the common beam indication according to this embodiment is restricted to the case of intra-band carrier aggregation (CA) with contiguous CCs, and the frequency range 2 and/or frequency range 4 (FR2+FR4).

In one example, the common beam indication according to this embodiment is restricted to the case of intra-band with contiguous or non-contiguous CCs, and the frequency range 2 and/or frequency range 4 (FR2+FR4).

In one example, a UE is configured/indicated to receive a DCI that indicates (a) a common (or same) DL TCI state for all or a subset of CCs/BWPs (according to embodiment II.1 or II.2), or (b) M TCI states, one independent/separate DL TCI state for each active CC/BWP.

Whether the UE is configured to receive DCI is according to (a) or (b) is based on a fixed condition. At least one of the following examples, us sued for the condition.

In one example, the fixed condition is based on the value M. For example, the indication is according to (a) if M>x, and according to (b) if M<=x, where x is a fixed number. Alternatively, for example, the indication is according to (a) if N>=x, and according to (b) if N<x, where x is a fixed number.

In one example, the fixed condition is based on the separation (distance), denoted as Z, between CCs or BWPs, where the separation (distance) between two CCs or BWPs can be defined (in RB s or other frequency domain units) as the absolute value of the difference of reference points in the two CCs or BWPs, and a reference point of a CC or BWP can be the starting RB index of the CC or BWP. For example, the indication is according to (a) if Z<=y, and according to (b) if Z>y, where y is a fixed number. Alternatively, for example, the indication is according to (a) if Z<y, and according to (b) if Z>=y, where y is a fixed number.

In one example, the fixed condition is based on the value M and the separation (distance), denoted as Z, between CCs or BWPs. For example, the indication is according to (a) if M>x and Z<=y, and according to (b) otherwise, where x and y are fixed numbers.

In one example, the fixed condition is that the DCI indication (cf. embodiment II.1 or II.2) is applied only to the intra-band carrier aggregation (CA), i.e., CCs within the same frequency band are aggregated (e.g., EN-DC, NE-DC, NR-DC in 3GPP NR specification), where the aggregated CCs are contiguous. For instance, such DCI indication is applied only when a UE is configured to operate with carrier aggregation over a set of cells in a frequency band of FR2 or with frequency-contiguous carrier aggregation over a set of cells in a frequency band of FR1.

In one example, the fixed condition is that the DCI indication (cf. embodiment II.1 or II.2) is applied only to the intra-band carrier aggregation (CA), i.e., CCs within the same frequency band are aggregated (e.g., EN-DC, NE-DC, NR-DC in 3GPP NR specification), where the aggregated CCs are contiguous or non-contiguous. For instance, such DCI indication is applied only when a UE is configured to operate with carrier aggregation over a set of cells in a frequency band of FR2 or with frequency-contiguous or frequency-non-contiguous carrier aggregation over a set of cells in a frequency band of FR1.

In one example, the fixed condition is based on the value M and the condition in one of the last two examples. For example, the indication is according to (a) if M>x and the condition in one of the last two examples is met, and according to (b) otherwise, where x is a fixed number. Alternatively, for example, the indication is according to (a) if M>=x and the condition in one of the last two examples is met, and according to (b) otherwise, where x is a fixed number. In one example, x equals the maximum number of CCs/BWPs the UE can be configured with. In another example, x is reported by the UE via capability signaling (either jointly with or separately from other capability signaling).

In one example, the fixed condition is that the DCI indication (cf. embodiment II.1 or II.2) is applied to the intra-band carrier aggregation (CA) always regardless of the frequency range FR1 or FR2, but applied to the inter-band CA only when the frequency range is FR1. Note that CCs belong to the same operating frequency band in case of intra-band CA, and CCs belong to different operating frequency bands in case of inter-band CA.

In one example, the fixed condition is that the DCI indication (cf. embodiment II.1 or II.2) is applied to both intra-band carrier aggregation (CA) and the inter-band CA always regardless of the frequency range FR1 or FR2, but it is subject to a condition that whether the common TCI-state (or the TCI-state ID) refers to the same TCI state (spatial TX filter) for different CCs or not. A few examples of the condition are as follows.

In one example, when the indication of the common DL TCI state via DCI is for PDSCH, where the same common DL TCI-state ID is applied for the all BWPs in the configured CCs,
  For the inter-band CA case, depending on the TCI state definition across different CCs (configured via RRC), the same common TCI-state ID may not refer to the same set of TCI state (spatial TX filters) for different CCs.
    For example, when the TCI state definition across different CCs (configured via RRC) can be (or are) different, then the same set of TCI-state IDs may or may not refer to the same set of TCI states (spatial TX filters) for different CCs.
    For example, when the TCI state definition across different CCs (configured via RRC) can be (or are) different, then the same set of TCI-state IDs does not refer to the same set of TCI states (spatial TX filters) for different CCs.
    For example, when the TCI state definition across different CCs (configured via RRC) are the same, then the same set of TCI-state IDs may or may not refer to the same set of TCI states (spatial TX filters) for different CCs.
    For example, when the TCI state definition across different CCs (configured via RRC) are the same, then the same set of TCI-state IDs refers to the same set of TCI states (spatial TX filters) for different CCs.
  For the intra-band CA case, depending on the TCI state definition across different CCs (configured via RRC), the same TCI-state ID may not refer to the same TCI state (spatial TX filter) for different CCs.
    For example, when the TCI state definition across different CCs (configured via RRC) can be (or are) different, then the same set of TCI-state IDs may or may not refer to the same set of TCI states (spatial TX filters) for different CCs.
    For example, when the TCI state definition across different CCs (configured via RRC) can be (or are) different, then the same set of TCI-state IDs does not refer to the same set of TCI states (spatial TX filters) for different CCs.
    For example, when the TCI state definition across different CCs (configured via RRC) are the same, then the same set of TCI-state IDs may or may not refer to the same set of TCI states (spatial TX filters) for different CCs.
    For example, when the TCI state definition across different CCs (configured via RRC) are the same, then the same set of TCI-state IDs refers to the same set of TCI states (spatial TX filters) for different CCs.
In one example, when the indication of the common (or same) DL TCI state ID via DCI is for a CORESET, where the same TCI-state ID is applied for the all BWPs in the configured CCs,
  For the inter-band CA case, depending on the TCI state definition across different CCs (configured via RRC), the same TCI-state ID may not refer to the same TCI state (spatial TX filter) for different CCs.
    For example, when the TCI state definition across different CCs (configured via RRC) can be (or are) different, then the same TCI-state ID may or may not refer to the same TCI state (spatial TX filter) for different CCs.
    For example, when the TCI state definition across different CCs (configured via RRC) can be (or are) different, then the same TCI-state ID does not refer to the same TCI state (spatial TX filter) for different CCs.
    For example, when the TCI state definition across different CCs (configured via RRC) are the same, then the same TCI-state ID may or may not refer to the same TCI state (spatial TX filter) for different CCs.
    For example, when the TCI state definition across different CCs (configured via RRC) are the same, then the same TCI-state ID refers to the same TCI state (spatial TX filter) for different CCs.
  For the intra-band CA case, depending on the TCI state definition across different CCs (configured via RRC), the same TCI-state ID may not refer to the same TCI states (spatial TX filters) for different CCs.
    For example, when the TCI state definition across different CCs (configured via RRC) can be (or are) different, then the same TCI-state ID may or may not refer to the same TCI state (spatial TX filter) for different CCs.
    For example, when the TCI state definition across different CCs (configured via RRC) can be (or are) different, then the same TCI-state ID does not refer to the same TCI state (spatial TX filter) for different CCs.
    For example, when the TCI state definition across different CCs (configured via RRC) are the same, then the same TCI-state ID may or may not refer to the same TCI state (spatial TX filter) for different CCs.
    For example, when the TCI state definition across different CCs (configured via RRC) are the same, then the same TCI-state ID refers to the same TCI state (spatial TX filter) for different CCs.

Note that CCs belong to the same operating frequency band in case of intra-band CA, and CCs belong to different operating frequency bands in case of inter-band CA.

Alternatively, whether the DCI indication is according to (a) or (b) is configured either implicitly (via other existing configuration and/or indication and/or indication command received by the UE) or explicitly (via a separate 'new' configuration and/or indication and/or indication command).

In this embodiment and examples herein, the DCI(i) for beam indication can be a dedicated DCI (separate from DL-DCI(i) scheduling DL assignment for CC(i)). Let DL-TCI-DCI(i) be the dedicated DCI. Alternatively, the DCI(i) can be the DL-DCI(i) scheduling DL assignment for CC(i). Alternatively, the DCI(i) can be either DL-TCI-DCI(i) or DL-DCI(i). Alternatively, the DCI(i) can be either DL-TCI-DCI(i) and/or DL-DCI(i). The details about the beam indication via DL-TCI-DCI(i) and/or DL-DCI(i) are according to U.S. patent application Ser. No. 17/214,738 filed on Mar. 26, 2021. A few examples are shown in FIG. 18 for M=2.

Figure 24:
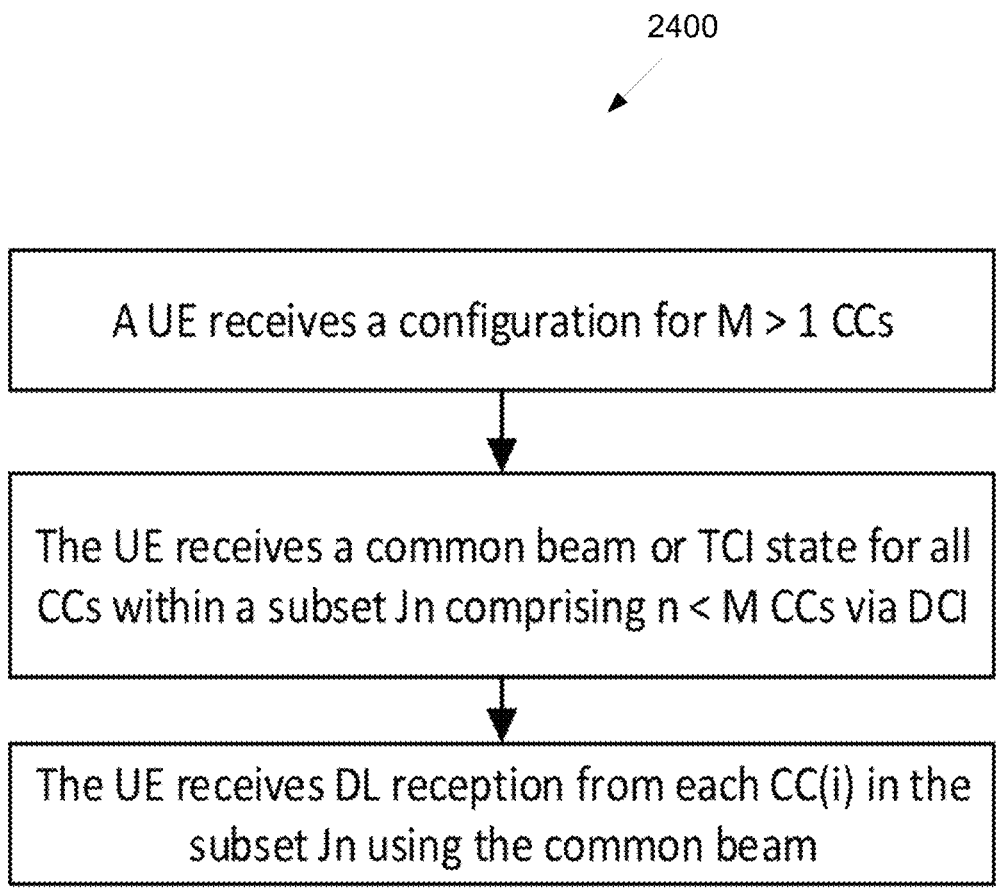
FIG. 24 illustrates a UE configured with a set of M>1 CCs for DL reception according to embodiments of the present disclosure.

FIG. 24 illustrates a UE configured with a set of M>1 CCs for DL reception 2400. The UE configured with a set of M>1 CCs for DL reception 2400 illustrated in FIG. 24 is for illustration only. FIG. 24 does not limit the scope of this disclosure to any particular implementation of the UE configured with a set of M>1 CCs for DL reception 2400.

In embodiment II.2, as shown in FIG. 24, a UE is configured with a set (list) of M>1 CCs (or DL BWPs or cells) for DL reception. The UE is further configured to receive a (single) common beam or TCI state for a subset (list) of CCs via L-1 control (DCI) signaling. Let n (where n≤M) be number of CCs in the subset (list) and let $J_n$ be the subset (list) of CCs. So, the UE receives a common beam (TCI state) for all CCs in the subset $J_n$.

In one example, the common beam or TCI state is used for the reception of PDSCH(i) (and/or DMRS for PDSCH(i)) of all CCs in the subset $J_n$. In one example, the common beam or TCI state is used for the reception of both PDCCH(i) and PDSCH(i) (and/or DMRS for PDCCH(i) and PDSCH(i)) of all CCs in the subset $J_n$. In one example, the common beam or TCI state is used for the reception of (1) PDSCH(i) only or (2) both PDCCH(i) and PDSCH(i). In one example, whether the common beam or TCI state is for (1) or (2) is indicated/configured (via RRC and/or MAC CE and/or DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs.

In another variation, the UE is further configured to receive K=1 or 2 beams common for all CCs via L-1 control (DCI) signaling, wherein the value K can be configured via RRC and/or MAC CE and/or DCI based signaling. When K=2, one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs. When K=1, the common beam is used receive PDSCH(i) and/or PDCCH(i) for all CCs as explained above.

For simplicity, K=1 is assumed in the rest of this embodiment. The embodiment however is also applicable to K=2.

The subset $J_n$ can be fixed. Alternatively, the subset $J_n$ can be indicated via MAC CE based signaling/activation. Alternatively, the subset $J_n$ can be configured via RRC. Alternatively, the subset $J_n$ can be indicated/configured via a combination of MAC CE and RRC based signaling (RRC configures a potentially larger set of CCs and MAC CE selects the subset $J_n$ from the larger set of CCs).

In one example, a bitmap (bit sequence) $d_1 d_2 \ldots d_M$ comprising M bits is used to configure/indicate the first subset, where a bit $d_i$ is associated with CC(i). For example, the subset $J_n$ includes all CCs with indices i such that $d_i=0$. Alternatively, the subset $J_n$ includes all CCs with indices i such that $d_i=1$. The configuration of the bitmap can be via higher layer RRC signaling. Alternatively, the configuration of the bitmap can be via MAC CE based signaling.

In another example, an $$\left\lceil \log_2 \binom{M}{n} \right\rceil$$

bits indication is used to indicate a combinatorial index k $$\in \left\{ 0, 1, \ldots, \binom{M}{n}-1 \right\}$$

which indicates the subset $J_n$. The indication of k can be via higher layer RRC signaling. Alternatively, the indication of k can be via MAC CE based signaling.

The number (n) of CCs in the subset $J_n$ can be fixed (e.g., $n=\lceil M/2 \rceil$ or $\lfloor M/2 \rfloor$) or can be any value such that $1 \leq n < M$. Alternatively, the number (n) can be configured via RRC and/or MAC CE and/or DCI based signaling.

Note that since the beams (TCI states) for CCs not included in the subset $J_n$ are not indicated, their beams for DL reception can be the latest beams (if available) indicated for them or some default beams (e.g., if the latest beams for them are not received).

The DCI indicating the common beam for CCs in the subset $J_n$ can be associated with a fixed CC (e.g., CC(1) or a fixed CC within the subset $J_n$). Alternatively, the DCI indicating common beam for CCs in the subset $J_n$ can be associated with a CC within the subset $J_n$. Alternatively, the DCI indicating common beam for CCs in the subset $J_n$ can be associated with a CC outside (not belonging to or included in) the subset $J_n$. Alternatively, the DCI indicating common beam for CCs in the subset $J_n$ can be associated with a CC whose index is configured (e.g., via MAC CE and/or RRC based signaling).

At least one of the following examples is used for the DCI indicating beams for CCs in the subset $J_n$.

Figure 25:
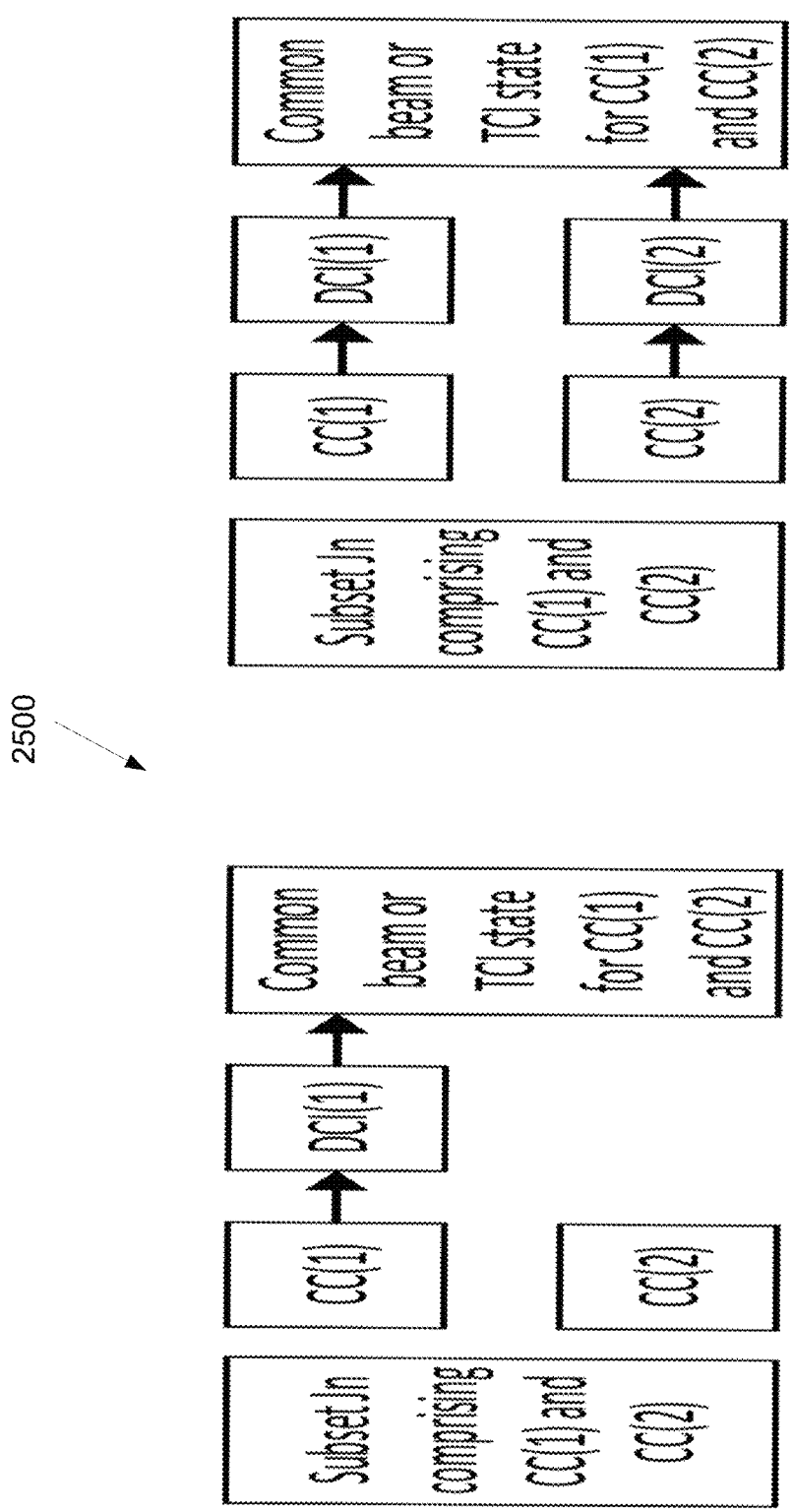
FIG. 25 illustrates the same (common) beam indication being via DCI according to embodiments of the present disclosure.

FIG. 25 illustrates the same (common) beam indication being via DCI 2500. The same (common) beam indication being via DCI 2500 illustrated in FIG. 25 is for illustration only. FIG. 25 does not limit the scope of this disclosure to any particular implementation of the same (common) beam indication being via DCI 2500.

In one example II.2.1, the same (common) beam indication is a via a single DCI(x), where the location (CC index) x of the DCI is fixed, e.g., x=1. Alternatively, the location (CC index) x of the DCI is configured (e.g., RRC and/or MAC CE and/or DCI). An example is shown in FIG. 21 for M=2.

In one example II.2.2, the same (common) beam indication is via multiple DCIs (i.e., repetition of the same beam indication), where the locations (CC indices) x of the multiple DCIs are fixed, e.g., x=1,2. Alternatively, the locations (CC indices) x of the multiple DCIs are configured (e.g., RRC and/or MAC CE and/or DCI). An example is shown in FIG. 21 for M=2.

In this embodiment and examples herein, the DCI(i) for beam indication can be a dedicated DCI (separate from DL-DCI(i) scheduling DL assignment for CC(i)). Let DL-TCI-DCI(i) be the dedicated DCI. Alternatively, the DCI(i) can be the DL-DCI(i) scheduling DL assignment for CC(i). Alternatively, the DCI(i) can be either DL-TCI-DCI(i) or DL-DCI(i). Alternatively, the DCI(i) can be either DL-TCI-DCI(i) and/or DL-DCI(i). The details about the beam indication via DL-TCI-DCI(i) and/or DL-DCI(i) are according to U.S. patent application Ser. No. 17/214,738 filed on Mar. 26, 2021. A few examples are shown in FIG. 18 for M=2.

For CCs in the subset $J_n$, the common beam indication for DL reception is according to this embodiment (II.2), and for the remaining CCs (not included in the subset $J_n$), the beam indication is according to at least one of the following examples.

In one example, the beam indication for DL reception for the remaining CCs is according to the 3GPP NR specification beam indication mechanism, wherein the beam for PDCCH reception is indicated via MAC CE, and the beam for PDSCH reception is either the same PDCCH beam (i.e., indicated via MAC CE) or indicated via DCI from a set of 8 beams (TCI states) where the set of 8 beams is indicated via MAC CE. The beam indication for PDCCH and PDSCH are independent across CCs comprising the remaining CCs.

In one example, the beam indication for DL reception for the remaining CCs is according to the 3GPP NR specification beam indication mechanism, wherein a common beam for PDCCH reception for the remaining CCs is indicated via a single MAC CE activation command, and a common set of 8 beams for PDSCH reception for the remaining CCs is indicated via a single MAC CE activation command.

In one example, the beam indication for DL reception for a subset of the remaining CCs is according to the 3GPP NR specification beam indication mechanism, and the beam indication for DL reception for a rest of the remaining CCs is according to the Rel. 16 beam indication mechanism.

Common Beam for DL Reception and DCI+MAC-CE Based Beam Indication

Common Via DCI+Independent Via MAC CE

Figure 26:
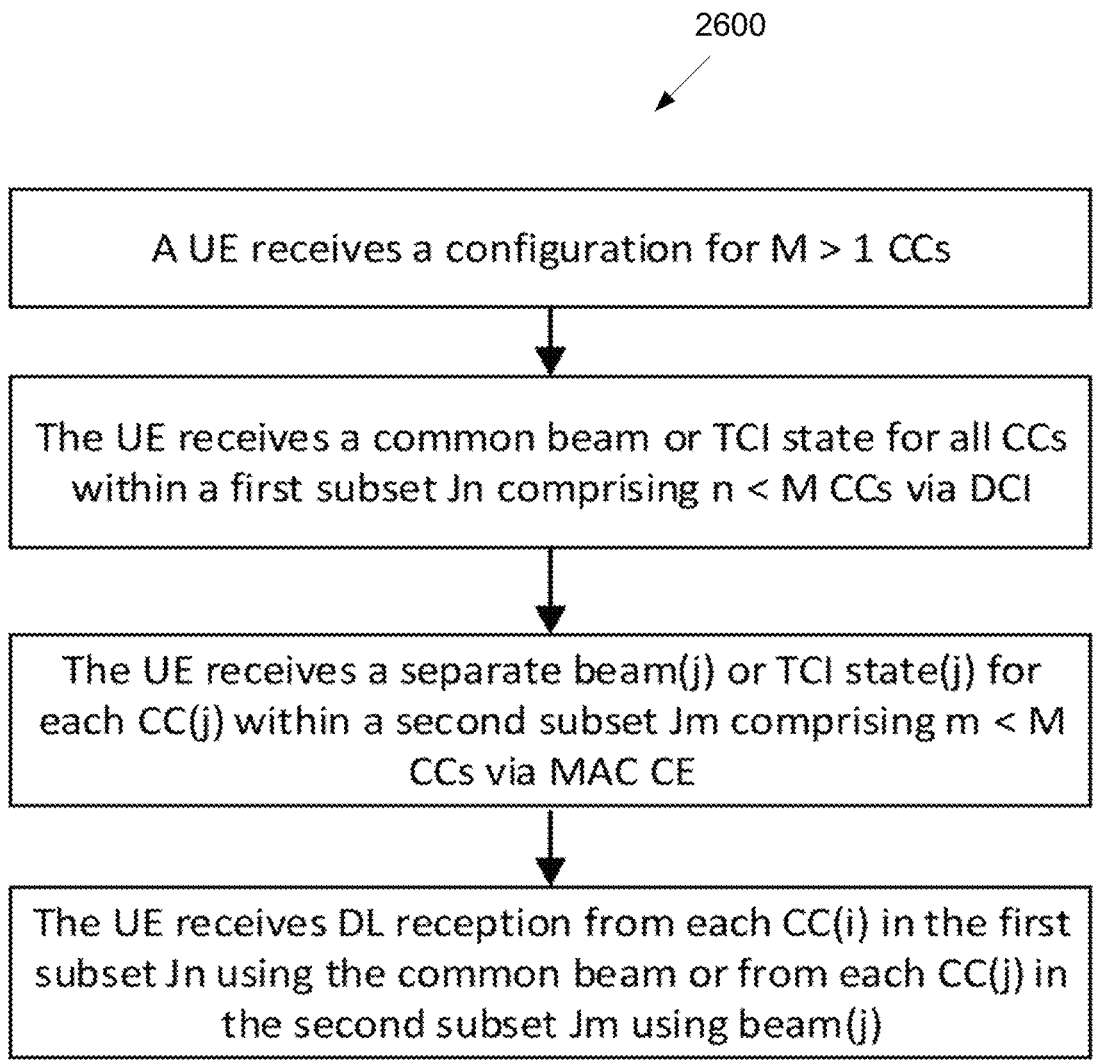
FIG. 26 illustrates a UE configured with a set of M>1 CCs for DL reception according to embodiments of the present disclosure.

FIG. 26 illustrates a UE configured with a set of M>1 CCs for DL reception 2600. The UE configured with a set of M>1 CCs for DL reception 2600 illustrated in FIG. 26 is for illustration only. FIG. 26 does not limit the scope of this disclosure to any particular implementation of the UE configured with a set of M>1 CCs for DL reception 2600.

In embodiment II.3, as shown in FIG. 26, a UE is configured with a set (list) of M>1 CCs (or DL BWPs or cells) for DL reception. The UE is further configured to receive a (single) common beam or TCI state for a first subset (list) of CCs via L-1 control (DCI) signaling, and a beam or TCI state(i) independently (separately) for each CC(i) within a second subset (list) of CCs via MAC CE based signaling/activation. Let n and m be number of CCs in the first and second subsets (lists), respectively, where 0<n, m≤M such that n+m≤M. Note that when n=0, there is no beam indication via DCI, and likewise, when m=0, there is no beam indication via MAC CE. Let $J_n$ and $J_m$ be the subset (list) of CCs in the first and second subsets (lists), respectively. So, the UE receives a common beam (TCI state) for all CCs in the first subset $J_n$ via DCI, and m beams (TCI states), one for each CC(i), i∈$J_m$, in the second subset via MAC CE.

In one example, the common beam or TCI state is used for the reception of PDSCH(i) (and/or DMRS for PDSCH(i)) of all CCs in the first subset $J_n$. In one example, the common beam or TCI state is used for the reception of both PDCCH(i) and PDSCH(i) (and/or DMRS for PDCCH(i) and PDSCH(i)) of all CCs in the first subset $J_n$. In one example, the common beam or TCI state is used for the reception of (1) PDSCH(i) only or (2) both PDCCH(i) and PDSCH(i). In one example, whether the common beam or TCI state is for (1) or (2) is indicated/configured (via RRC and/or MAC CE and/or DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs.

In another variation, the UE is further configured to receive K=1 or 2 beams common for all CCs via L-1 control (DCI) signaling, wherein the value K can be configured via RRC and/or MAC CE and/or DCI based signaling. When K=2, one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs. When K=1, the common beam is used receive PDSCH(i) and/or PDCCH(i) for all CCs as explained above.

For simplicity, K=1 is assumed in the rest of this embodiment. The embodiment however is also applicable to K=2.

The rest of the details about (n, m) and ($J_n$, $J_m$) are according to embodiment I.3.

$1^{st}$ Common Via DCI+$2^{nd}$ Common Via MAC CE

Figure 27:
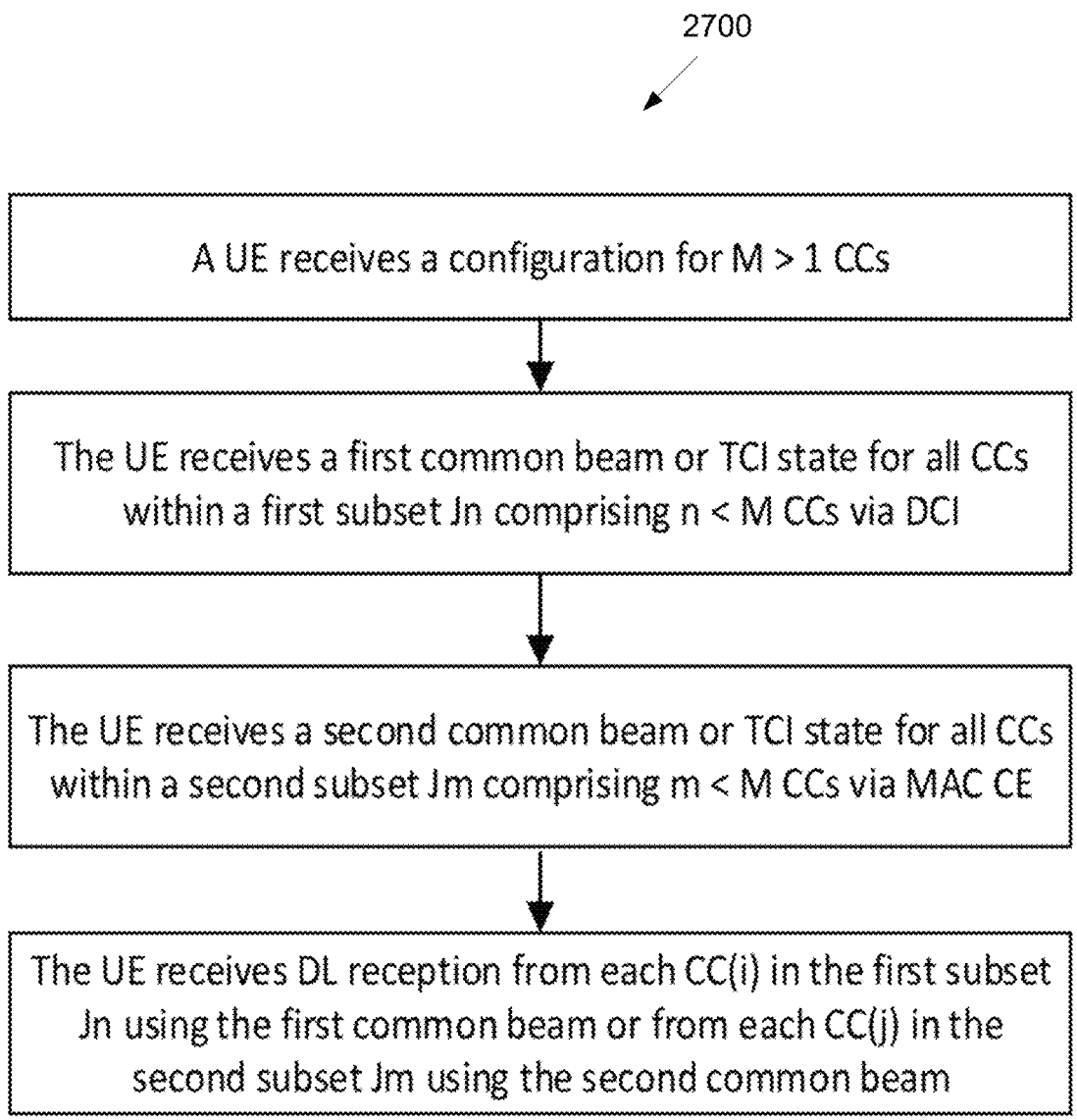
FIG. 27 illustrates a UE configured with a set of M>1 CCs for DL reception according to embodiments of the present disclosure.

FIG. 27 illustrates a UE configured with a set of M>1 CCs for DL reception 2700. The UE configured with a set of M>1 CCs for DL reception 2700 illustrated in FIG. 27 is for illustration only. FIG. 27 does not limit the scope of this disclosure to any particular implementation of the UE configured with a set of M>1 CCs for DL reception 2700.

In embodiment II.4, as shown in FIG. 27, a UE is configured with a set (list) of M>1 CCs (or DL BWPs or cells) for DL reception. The UE is further configured to receive a first (single) common beam or TCI state for a first subset (list) of CCs via L-1 control (DCI) signaling, and a second (single) common beam or TCI state for a second subset (list) of CCs via MAC CE based signaling/activation. Let n and m be number of CCs in the first and second subsets (lists), respectively, where 0≤n, m≤M such that n+m≤M. Note that when n=0, there is no beam indication via DCI, and likewise, when m=0, there is no beam indication via MAC CE. Let $J_n$ and $J_m$ be the subset (list) of CCs in the first and second subsets (lists), respectively. So, the UE receives the first common beam (TCI state) for all CCs in the first subset $J_n$ via DCI, and the second common beam (TCI state) for all CCs in the second subset $J_m$ via MAC CE.

In one example, the first common beam or TCI state (or the second common beam) is used for the reception of PDSCH(i) (and/or DMRS for PDSCH(i)) of all CCs in the first subset $J_n$ (or the second subset $J_m$). In one example, the first common beam or TCI state (or the second common beam) is used for the reception of both PDCCH(i) and PDSCH(i) (and/or DMRS for PDCCH(i) and PDSCH(i)) of all CCs in the first subset $J_n$ (or the second subset $J_m$). In one example, the first common beam or TCI state (or the second common beam) is used for the reception of (1) PDSCH(i) only or (2) both PDCCH(i) and PDSCH(i). In one example, whether the first common beam or TCI state (or the second common beam) is for (1) or (2) is indicated/configured (via RRC and/or MAC CE and/or DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs.

In another variation, the UE is further configured to receive K=1 or 2 beams common for all CCs via L-1 control (DCI) signaling, wherein the value K can be configured via RRC and/or MAC CE and/or DCI based signaling. When K=2, one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs. When K=1, the common beam is used receive PDSCH(i) and/or PDCCH(i) for all CCs as explained above.

For simplicity, K=1 is assumed in the rest of this embodiment. The embodiment however is also applicable to K=2.

The rest of the details about (n, m) and ($J_n$, $J_m$) are according to embodiment I.3.

1st Common Via DCI+$2^{nd}$ Common Via DCI

Figure 28:
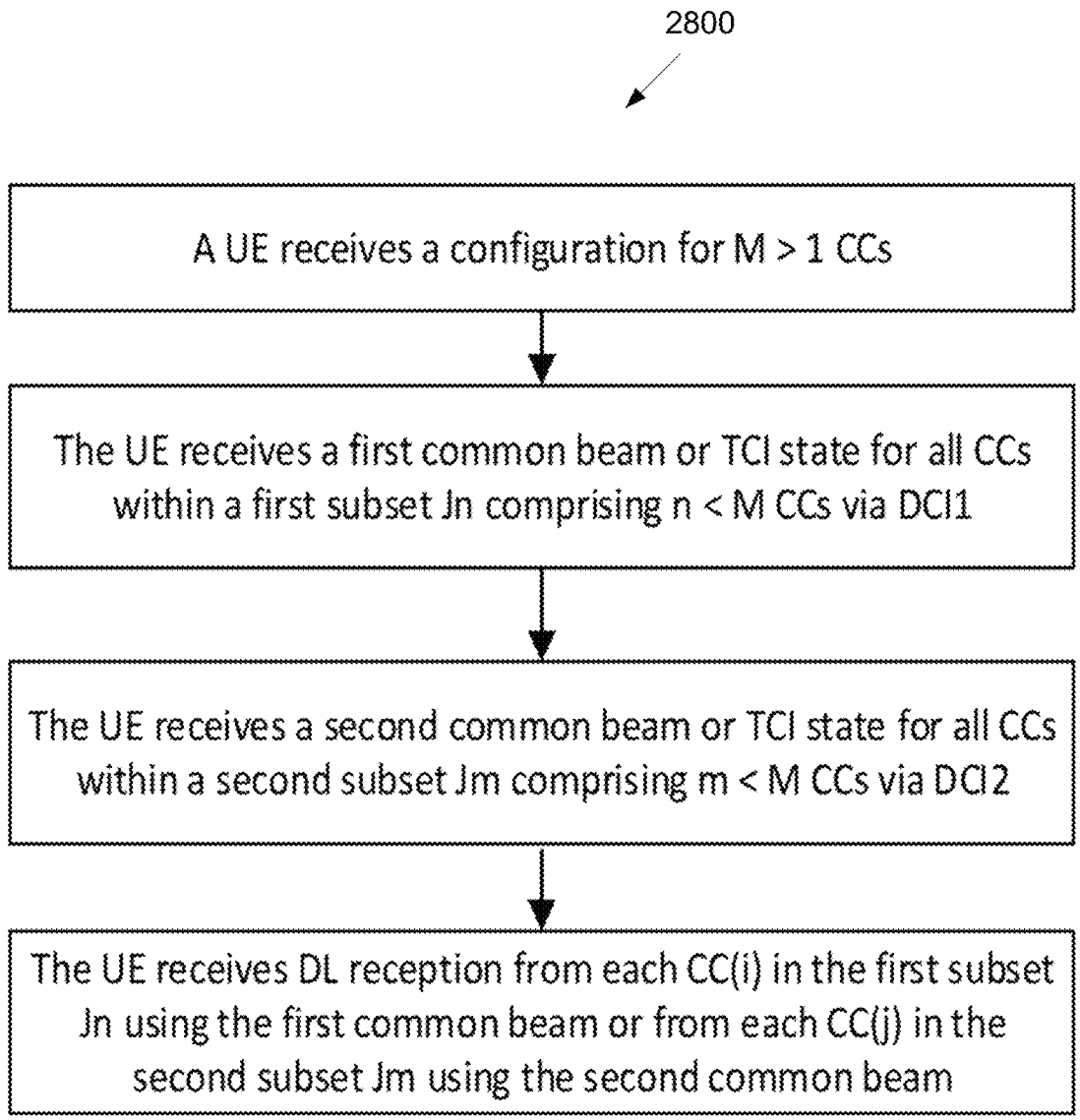
FIG. 28 illustrates a UE configured with a set of M>1 CCs for DL reception according to embodiments of the present disclosure.

FIG. 28 illustrates a UE configured with a set of M>1 CCs for DL reception 2800. The UE configured with a set of M>1

CCs for DL reception 2800 illustrated in FIG. 28 is for illustration only. FIG. 28 does not limit the scope of this disclosure to any particular implementation of the UE configured with a set of M>1 CCs for DL reception 2800.

In embodiment II.5, as shown in FIG. 28, a UE is configured with a set (list) of M>1 CCs (or DL BWPs or cells) for DL reception. The UE is further configured to receive a first (single) common beam or TCI state for a first subset (list) of CCs via a first L-1 control (DCI1) signaling, and a second (single) common beam or TCI state for a second subset (list) of CCs via a second L-1 control (DCI2) signaling. Let n and m be number of CCs in the first and second subsets (lists), respectively, where $0 \le n$, $m \le M$ such that $n+m \le M$. Note that when n=0, there is no beam indication via DCI1, and likewise, when m=0, there is no beam indication via DCI2. Let $J_n$ and $J_m$ be the subset (list) of CCs in the first and second subsets (lists), respectively. So, the UE receives the first common beam (TCI state) for all CCs in the first subset $J_n$ via DCI1, and the second common beam (TCI state) for all CCs in the second subset $J_m$ via DCI2.

In one example, DCI1 and DCI2 are the same DCI1=DCI2=DCI(i) where the CC index i can be fixed (e.g., i=1) or can be configured via RRC and/or MAC CE and/or DCI signaling.

In another example, DCI1 and DCI2 are different DCI1=DCI(i) and DCI2=DCI(j) where the CC index i and/or I can be fixed (e.g., i=1, j=2) or one of both of them can be configured via RRC and/or MAC CE and/or DCI signaling.

In one example, the first common beam or TCI state (or the second common beam) is used for the reception of PDSCH(i) (and/or DMRS for PDSCH(i)) of all CCs in the first subset $J_n$ (or the second subset $J_m$). In one example, the first common beam or TCI state (or the second common beam) is used for the reception of both PDCCH(i) and PDSCH(i) (and/or DMRS for PDCCH(i) and PDSCH(i)) of all CCs in the first subset $J_n$ (or the second subset $J_m$). In one example, the first common beam or TCI state (or the second common beam) is used for the reception of (1) PDSCH(i) only or (2) both PDCCH(i) and PDSCH(i). In one example, whether the first common beam or TCI state (or the second common beam) is for (1) or (2) is indicated/configured (via RRC and/or MAC CE and/or DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs.

In another variation, the UE is further configured to receive K=1 or 2 beams common for all CCs via L-1 control (DCI) signaling, wherein the value K can be configured via RRC and/or MAC CE and/or DCI based signaling. When K=2, one of the two common beams is used for the reception of PDSCH(i) (and/or DMRS for PDSCH(i)) for all CCs, and another of the two common beams is used for the reception of PDCCH(i) (and/or DMRS for PDCCH(i)) for all CCs. When K=1, the common beam is used receive PDSCH(i) and/or PDCCH(i) for all CCs as explained above.

For simplicity, K=1 is assumed in the rest of this embodiment. The embodiment however is also applicable to K=2.

The rest of the details about (n, m) and ($J_n$, $J_m$) are according to embodiment I.3.

In embodiment II.6, a UE is configured with a set (list) of M>1 CCs (or DL BWPs or cells) for DL reception, wherein the M CCs are partitioned into P subsets. Let $Q_p$ where p=0, 1, ..., P-1 be the p-th subset comprising $q_p$ number of CCs. Note that $\Sigma_{p=0}^{P-1} q_p \le M$. For each subset $p \in \{0, 1, ..., P-1\}$, the UE is further configured to receive a p-th (single) common beam or TCI state for all CCs within the p-th subset via a p-th L-1 control ($DCI_p$) or MAC-$CE_p$ signaling. So, the UE receives the first common beam (TCI state) for all CCs in the $1^{st}$ subset $Q_0$ via $DCI_0$ or MAC-$CE_0$, and the second common beam (TCI state) for all CCs in the $2^{nd}$ subset $Q_1$ via $DCI_1$ or MAC-$CE_1$ and so on.

In one example, P can be fixed (e.g., 2 or 3). In one example, P can be configured via RRC and/or MAC CE and/or DCI based signaling. Likewise, $Q_p$ where p=0, 1, ..., P-1 can also be fixed or configured via RRC and/or MAC and/or DCI CE based signaling.

In one example, the information whether the common beam indication is via DCI or MAC CE is fixed. In another example, this information is configured via higher layer RRC signaling. In one example, this information (fixed or configured) is common for all subsets (i.e., for all subsets, either DCI or MAC CE is used for the beam indication). In one example, this information (fixed or configured) is independent/separate for each subset.

When $T = M - \Sigma_{p=0}^{P-1} q_p > 0$, for each of the T CCs not included in the P subsets, the UE is further configured to receive a beam or TCI state via a L-1 control ($DCI_p$) or MAC-$CE_p$ signaling. Alternatively, their beams for DL reception can be the latest beams (if available) indicated for them or some default beams (e.g., if the latest beams for them are not received).

Independent or Common Beam for DL Reception Based on Signaling

In embodiment 11.7, whether the beam indication is independent (cf. embodiment I.1, 1.2, 1.3) or common (cf. embodiment II.1 through II.6) or common for one or more subsets of CCs and independent for one or more subsets of CCs is configured. In one example, this information is configured/indicated via RRC. In one example, this information is configured/indicated via MAC CE. In one example, this information is configured/indicated via a combination of RRC and MAC CE. In one example, this information is configured/indicated via DCI. In one example, this information is configured/indicated via a combination of RRC and DCI. In one example, this information is configured/indicated via a combination of RRC, MAC CE, and DCI.

Two-Step Beam Indication

In embodiment II.8, a UE is configured with a set (list) of M>1 CCs (or DL BWPs or cells) for DL reception. The UE is further configured with a two-step (or group-based) beam indication method, wherein Step 1: a CC(i) indicates a set (group) of Y beams (or TCI states) which comprises an intermediate set (common pool) of beams for all M CCs, and Step 2: beam(s), independent for each CC or common for all CCs, for DL reception are selected/indicated from the indicated intermediate set.

The UE is configured to receive the intermediate set (common pool) of beams via DCI(i) and/or MAC CE and/or RRC, where i is fixed or configured via RRC and/or MAC CE and/or DCI signaling. The UE is further configured to receive the beam(s) for M CCs via L-1 control (DCI) signaling. Here, i is an index of a CC which serves as a reference for the reception of the common pool of TCI states across all CCs. The information about this reference CC is configured (e.g. via higher layer RRC signaling). An information about the common pool of TCI states being in the reference CC can be provided in each CC (e.g. in PDSCH-Config).

The rest of the details (such as DL channels for DL reception and DCI indication) are according to some embodiments of this disclosure.

Component 3: For UL Via UL-TCI-DCI

In embodiment III.1, a UE is configured with a set (list) of M>1 CCs (or DL BWPs or cells or UL BWPs) for UL transmission. The UE is further configured to receive a beam or TCI state(i) (independent for each CC or common for a subset of CCs) for all or a subset of CCs via L-1 control (DCI) signaling. So, the UE receives M beams (TCI states), one for each CC(i), $i \in \{0, 1, \ldots, M-1\}$ via DCI.

In one example, the beam or TCI state(i) is used for the transmission of PUSCH(i) (and/or DMRS for PUSCH(i)). In one example, the beam or TCI state(i) is used as a 'common' beam (TCI state) for the transmission of both PUCCH(i) and PUSCH(i) (and/or DMRS for PUCCH(i) and PUSCH(i)). In one example, the beam or TCI state(i) is used (1) for the transmission of PUSCH only or (2) as a 'common' beam (TCI state) for the transmission of both PUCCH(i) and PUSCH(i). In one example, whether the beam or TCI state(i) is for (1) or (2) is indicated/configured (via RRC and/or MAC CE and/or DCI), where this indication/configuration can be common for all CCs or independent for each CC. In one example, the beam or TCI state(i) is used as a 'common' beam (TCI state) for the transmission of PUCCH(i), PUSCH(i), and PRACH(i).

In a variation, the UE is further configured to receive two beams or TCI states independently (separately) for each CC(i) via L-1 control (DCI) signaling, wherein one of the two beams is used for the transmission of PUSCH(i) (and/or DMRS for PUSCH(i)), and another of the two beams is used for the transmission of PUCCH(i) (and/or DMRS for PUCCH(i)). For PRACH(i) transmission, either one of the two beams is used, or the beam is configured/indicated separately.

In another variation, the UE is further configured to receive K=1 or 2 beams independently (separately) for each CC(i) via L-1 control (DCI) signaling, wherein the value K can be configured via RRC and/or MAC CE and/or DCI based signaling. When K=2, one of the two beams is used for the transmission of PUSCH(i) (and/or DMRS for PUSCH(i)), and another of the two beams is used for the transmission of PUCCH(i) (and/or DMRS for PUCCH(i)). When K=1, the received beam is used transmit PUSCH(i) and/or PUCCH(i) as explained above. For PRACH(i) transmission, either one of the two beams is used, or the beam is configured/indicated separately.

At least one of the examples I.1.1. through I.1.5 can be used for the DCI indicating beams for M CCs by replacing DL-TCI-DCI and DL-DCI with UL-TCI-DCI and UL-DCI, respectively, and extending the beam indication mechanisms to include PRACH transmission also.

In addition, the DCI(i) for beam indication can be a dedicated DCI (separate from UL-DCI(i) scheduling UL grant for CC(i)). Let UL-TCI-DCI(i) be the dedicated DCI. Alternatively, the DCI(i) can be the UL-DCI(i) scheduling UL grant for CC(i). Alternatively, the DCI(i) can be either UL-TCI-DCI(i) or UL-DCI(i). Alternatively, the DCI(i) can be either UL-TCI-DCI(i) and/or UL-DCI(i). The details about the beam indication via UL-TCI-DCI(i) and/or UL-DCI(i) are according to U.S. patent application Ser. No. 17/222,592 filed on Apr. 5, 2021, the content of which is incorporated herein by reference. A few examples similar to those shown in FIG. 18 for M=2 can be constructed by replacing DL-TCI-DCI and DL-DCI with UL-TCI-DCI and UL-DCI, respectively. It is straightforward to extend these examples to M>2.

The rest of the details of embodiments I.1 through I.3, and II.1 through II.8 of this disclosure can be applied in a straight-forward manner by replacing DL reception with UL transmission, PDCCH with PUCCH, PDSCH with PUSCH, and extending the beam indication mechanisms to include PRACH transmission also.

Component 4: For DL and UL Via TCI-DCI

In embodiment IV.1, a UE is configured with a set (list) of M>1 CCs (or DL BWPs or cells or UL BWPs) for both DL reception and UL transmission. The UE is further configured to receive a beam or TCI state(i) (independent for each CC or common for a subset of CCs) for all or a subset of CCs via L-1 control (DCI) signaling. So, the UE receives M beams (TCI states), one for each CC(i), $i \in \{0, 1, \ldots, M-1\}$ via DCI.

In one example, the beam or TCI state(i) is used for both the reception of PDSCH(i) (and/or DMRS for PDSCH(i)), and the transmission of PUSCH(i) (and/or DMRS for PUSCH(i)). In one example, the beam or TCI state(i) is used as a 'common' beam (TCI state) for the reception of both PDCCH(i) and PDSCH(i) as well as for the transmission of both PUCCH(i) and PUSCH(i). In one example, the beam or TCI state(i) is used (1) for the transmission/reception of PUSCH/PDSCH only or (2) as a 'common' beam (TCI state) for the transmission/reception of both PUCCH(i) and PUSCH(i)/PDCCH(i) and PDSCH(i). In one example, whether the beam or TCI state(i) is for (1) or (2) is indicated/configured (via RRC and/or MAC CE and/or DCI), where this indication/configuration can be common for all CCs or independent for each CC. In one example, the beam or TCI state(i) is used as a 'common' beam (TCI state) for the transmission of PUCCH(i), PUSCH(i), and PRACH(i) as well as for the reception of PDCCH(i) and PDSCH(i).

In a variation, the UE is further configured to receive two beams or TCI states independently (separately) for each CC(i) via L-1 control (DCI) signaling, wherein one of the two beams is used for the transmission/reception of PUSCH(i)/PDSCH(i) (and/or DMRS for PUSCH(i)/PDSCH(i)), and another of the two beams is used for the transmission/reception of PUCCH(i)/PDCCH(i) (and/or DMRS for PUCCH(i)/PDCCH(i)). For PRACH(i) transmission, either one of the two beams is used, or the beam is configured/indicated separately.

In another variation, the UE is further configured to receive K=1 or 2 beams independently (separately) for each CC(i) via L-1 control (DCI) signaling, wherein the value K can be configured via RRC and/or MAC CE and/or DCI based signaling. When K=2, one of the two beams is used for the transmission/reception of PUSCH(i)/PDSCH(i) (and/or DMRS for PUSCH(i)/PDSCH(i)), and another of the two beams is used for the transmission/reception of PUCCH(i)/PDCCH(i) (and/or DMRS for PUCCH(i)/PDCCH(i)). When K=1, the received beam is used receive/transmit PUSCH(i)/PDSCH(i) and/or PUCCH(i)/PDCCH(i) as explained above. For PRACH(i) transmission, either one of the two beams is used, or the beam is configured/indicated separately.

At least one of the examples I.1.1. through I.1.5 can be used for the DCI indicating beams for M CCs by replacing DL-TCI-DCI and DL-DCI with TCI-DCI and UL-DCI/DL-DCI, respectively, and extending the beam indication mechanisms to include PRACH transmission also.

In addition, the DCI(i) for beam indication can be a dedicated DCI (separate from UL-DCI(i)/DL-DCI(i) scheduling UL grant/DL assignment for CC(i)). Let TCI-DCI(i) be the dedicated DCI. Alternatively, the DCI(i) can be the UL-DCI(i)/DL-DCI(i) scheduling UL grant/DL assignment for CC(i). Alternatively, the DCI(i) can be either TCI-DCI(i) or UL-DCI(i)/DL-DCI(i). Alternatively, the DCI(i) can be either TCI-DCI(i) and/or UL-DCI(i)/DL-DCI(i). The details about the beam indication via TCI-DCI(i) and/or UL-DCI(i)/DL-DCI(i) are according to U.S. patent application Ser. No. 17/222,592 filed on Apr. 5, 2021. A few examples similar to those shown in FIG. 18 for M=2 can be constructed by replacing DL-TCI-DCI and DL-DCI with TCI-DCI and UL-DCI/DL-DCI, respectively. It is straightforward to extend these examples to M>2.

The rest of the details of embodiments I.1 through I.3, and II.1 through II.8 of this disclosure can be applied in a straight-forward manner by including beam indication for both DL reception and UL transmission, and all DL and UL channels (PDCCH, PUCCH, PDSCH, PUSCH, PRACH) the beam indication can be used for.

In some embodiments of this disclosure, an indication of a TCI state or beam refers to (or is via) an identifier (ID) associated with the TCI state(s) or beam(s) that is (are) indicated. In one example, this ID is referred to as TCI state ID.

The "indication of a common TCI state or beam for/across a set of CCs" refers to a common TCI state ID implying that the same/single RS determined according to the TCI state(s) indicated by a common TCI state ID is used to provide spatial property (such as QCL Type-D for DL and UL TX spatial filter for UL) across the set of configured CCs. When the indication is common for DL, the RS in the TCI state that provides QCL-TypeA (or QCL-TypeB) shall be in the same CC as the target channel or RS.

In some embodiments of this disclosure, when the indication of the TCI state update that is common for a set of CCs (comprising N CCs) is based on (or is via) one TCI state ID, at least one of the following examples is used/configured regarding the TCI state or beam for each CC in the set of CCs.

In one example A, the TCI state indication (ID) indicates one single/same TCI state (with a source RS of QCL type D) that is common (and applies to) all N CCs.

In one example B, the TCI state indication (ID) indicates N TCI states (each with a source RS of QCL type D) that applies to each of the N CCs.

In one example, a combination of the previous examples is used, i.e., the TCI state indication (ID) indicates M TCI states, M<N, each TCI state in a subset of the M TCI states applies to multiple CCs (cf. example A) and each TCI state in the remaining of the M TCI states applies to one CC (cf. example B).

Additional embodiments for signaling related to the TCI states are discussed below.

Component 5: Independent Beam for DL Reception and DCI Based Beam Indication

In embodiment V.1, a UE is configured with a set (list) of M>1 CCs (or DL BWPs or cells) for DL reception. The UE is further configured to receive a beam or TCI state(i) independently (separately) for each CC(i) via a beam indication, where the beam indication for each CC is either via MAC CE or X-DCI, where X is DL or DL-TCI, and MAC CE is carried via PDSCH which is scheduled via a DCI. The MAC CE or X-DCI can be transmitted from the respective CC the beam indication is intended for. Alternatively, it can be transmitted from a CC different from the CC the beam indication is intended for. There is only one beam indication, whose location (or carrier channel) is configured to the UE. This configuration can be via RRC or/and MAC CE. In one example (E1), the beam indication indicates a single or common beam (TCI state) for both DL and UL channels/RSs for the respective CC. In one example (E2), the beam indication indicates two beams (TCI states) one for DL channels/RSs and one for UL channels/RSs for the respective CC.

For each CC, the beam (TCI state) indication, common or separate across DL and UL, can be via X-DCI or MAC CE based on a condition.

In one example V.1.1, the condition is based on the value of M (the number of CCs). At least one of the following examples is used/configured.

In one example V.1.1.1, if M=1, the beam indication is via MAC CE, and if M>1, the beam indication is via X-DCI. Alternatively, optionally, if M=1, the beam indication is via X-DCI, and if M>1, the beam indication is via MAC CE. In one example, the value of M (or the condition whether M=1 or M>1) is configured explicitly, for example, via RRC or/and MAC CE. In another example, the value of M is configured implicitly, for example, via RRC or/and MAC CE.

In one example V.1.1.2, if M≤t (or M<t), the beam indication is via MAC CE, and if M>t (or M≥t), the beam indication is via X-DCI. The value of t can be fixed e.g. t=1, 2, 4, or 8. Alternatively, the value of t can be configured, e.g. via RRC or/and MACE CE. When configured, the set of candidate values for t can be $\{1,2\}$ or $\{1,4\}$, $\{1,2,3\}$, or $\{1,2,4\}$, or $\{1,2,3,4\}$. In one example, the value of M or/and t (or the condition whether M≤t (or M<t) or M>t (or M≥t)) is configured explicitly, for example, via RRC or/and MAC CE. In another example, the value of M or/and t (or the condition whether M≤t (or M<t) or M>t (or M≥t)) is configured implicitly, for example, via RRC or/and MAC CE.

In one example V.1.1.3, if M≤t (or M<t), the beam indication is via X-DCI, and if M>t (or M≥t), the beam indication is via MAC CE. The value of t can be fixed e.g. t=1, 2, 4, or 8. Alternatively, the value of t can be configured, e.g. via RRC or/and MACE CE. When configured, the set of candidate values for t can be $\{1,2\}$ or $\{1,4\}$, $\{1,2,3\}$, or $\{1,2,4\}$, or $\{1,2,3,4\}$. In one example, the value of M or/and t (or the condition whether M≤t (or M<t) or M>t (or M≥t)) is configured explicitly, for example, via RRC or/and MAC CE. In another example, the value of M or/and t (or the condition whether M≤t (or M<t) or M>t (or M≥t)) is configured implicitly, for example, via RRC or/and MAC CE.

In one example V.1.2, the condition is based on the value of N (the number of activated TCI states). At least one of the following examples is used/configured.

In one example V.1.2.1, if N=1, the beam indication is via MAC CE, and if N>1, the beam indication is via X-DCI. Alternatively, optionally, if N=1, the beam indication is via X-DCI, and if N>1, the beam indication is via MAC CE. In one example, the value of N (or the condition whether N=1 or N>1) is configured explicitly, for example, via RRC or/and MAC CE. In another example, the value of N is configured implicitly, for example, via RRC or/and MAC CE such as examples in embodiment V.2.

In one example V.1.2.2, if N≤u (or N<u), the beam indication is via MAC CE, and if N>u (or N≥u), the beam indication is via X-DCI. The value of u can be fixed e.g. u=1, 2, 4, or 8. Alternatively, the value of u can be configured, e.g. via RRC or/and MACE CE.

When configured, the set of candidate values for u can be {1,2} or {1,4}, {1,2,3}, or {1,2,4}, or {1,2,3,4}. In one example, the value of N or/and u (or the condition whether N≤u (or N<u) or N>u (or N≥u)) is configured explicitly, for example, via RRC or/and MAC CE. In another example, the value of N or/and u (or the condition whether N≤u (or N<u) or N>u (or N≥u)) is configured implicitly, for example, via RRC or/and MAC CE such as examples in embodiment V.2.

In one example V.1.2.3, if N≤u (or N<u), the beam indication is via X-DCI, and if N>u (or N≥u), the beam indication is via MAC CE. The value of u can be fixed e.g. u=1, 2, 4, or 8. Alternatively, the value of u can be configured, e.g. via RRC or/and MACE CE. When configured, the set of candidate values for u can be {1,2} or {1,4}, {1,2,3}, or {1,2,4}, or {1,2,3,4}. In one example, the value of N or/and u (or the condition whether N≤u (or N<u) or N>u (or N≥u)) is configured explicitly, for example, via RRC or/and MAC CE. In another example, the value of N or/and u (or the condition whether N≤u (or N<u) or N>u (or N≥u)) is configured implicitly, for example, via RRC or/and MAC CE such as examples in embodiment V.2.

In one example V.1.3, the condition is based on the value of N (the number of activated TCI states) and M (the number of number of CCs). At least one of the following examples is used/configured.

In one example V.1.3.1, if N=M=1, the beam indication is via MAC CE, and if N>1 or M>1, the beam indication is via X-DCI. Alternatively, optionally, if N=M=1, the beam indication is via X-DCI, and if N>1 or M>1, the beam indication is via MAC CE. In one example, the value of N or/and M (or the condition whether N=M=1 or N>1 or M>1) is configured explicitly, for example, via RRC or/and MAC CE. In another example, the value of N or/and M is configured implicitly, for example, via RRC or/and MAC CE.

In one example V.1.3.2, if N≤u and M≤Y (or N<u and M<Y), the beam indication is via MAC CE, and otherwise, the beam indication is via X-DCI. The value of u or/and Y can be fixed e.g. u, Y=1, 2, 4, or 8. Alternatively, the value of u or/and Y can be configured, e.g. via RRC or/and MACE CE. When configured, the set of candidate values for u or/and Y can be {1,2} or {1,4}, {1,2,3}, or {1,2,4}, or {1,2,3,4}. In one example, the value of N or/and u or/and M or/and Y (or the condition whether N≤u and M≤Y or otherwise) is configured explicitly, for example, via RRC or/and MAC CE. In another example, the value of N or/and u or/and M or/and Y (or the condition whether N≤u and M≤Y or otherwise) is configured implicitly, for example, via RRC or/and MAC CE.

In one example V.1.3.3, if N≤u and M≤Y (or N<u and M<Y), the beam indication is via X-DCI, and otherwise, the beam indication is via MAC CE. The value of u or/and Y can be fixed e.g. u, Y=1, 2, 4, or 8. Alternatively, the value of u or/and Y can be configured, e.g. via RRC or/and MACE CE. When configured, the set of candidate values for u or/and Y can be {1,2} or {1,4}, {1,2,3}, or {1,2,4}, or {1,2,3,4}. In one example, the value of N or/and u or/and M or/and Y (or the condition whether N≤u and M≤Y or otherwise) is configured explicitly, for example, via RRC or/and MAC CE. In another example, the value of N or/and u or/and M or/and Y (or the condition whether N≤u and M≤Y or otherwise) is configured implicitly, for example, via RRC or/and MAC CE.

In one example V.1.3.4, if NM≤u (or NM<u), the beam indication is via MAC CE, and NM>u (or NM≥u), the beam indication is via X-DCI. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of N or/and u or/and M (or the condition whether NM<u or otherwise) is configured explicitly, for example, via RRC or/and MAC CE. In another example, the value of N or/and u or/and M (or the condition whether NM<u or otherwise) is configured implicitly, for example, via RRC or/and MAC CE.

In one example V.1.3.5, if NM≤u (or NM<u), the beam indication is via X-DCI, and NM>u (or NM≥u), the beam indication is via MAC CE. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of N or/and u or/and M (or the condition whether NM<u or otherwise) is configured explicitly, for example, via RRC or/and MAC CE. In another example, the value of N or/and u or/and M (or the condition whether NM<u or otherwise) is configured implicitly, for example, via RRC or/and MAC CE.

In one example V.1.3.6, when the number of activated TCI states can be different across CCs, then if $\Sigma_{i=1}^{M} N_i \leq u$ (or $\Sigma_{i=1}^{M} N_i < u$), the beam indication is via MAC CE, and $\Sigma_{i=1}^{M} N_i > u$ (or $\Sigma_{i=1}^{M} N_i \geq u$), the beam indication is via X-DCI, where $N_i$ is the number of activated TCI states for CC i. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of $N_i$ or/and u or/and M (or the condition whether $\Sigma_{i=1}^{M} N_i \leq u$ or otherwise) is configured explicitly, for example, via RRC or/and MAC CE. In another example, the value of $N_i$ or/and u or/and M (or the condition whether $\Sigma_{i=1}^{M} N_i \leq u$ or otherwise) is configured implicitly, for example, via RRC or/and MAC CE.

In one example V.1.3.7, when the number of activated TCI states can be different across CCs, then if $\Sigma_{i=1}^{M} N_i \leq u$ (or $\Sigma_{i=1}^{M} N_i < u$), the beam indication is via X-DCI, and $\Sigma_{i=1}^{M} N_i > u$ (or $\Sigma_{i=1}^{M} N_i \geq u$), the beam indication is via MAC CE, where $N_i$ is the number of activated TCI states for CC i. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of $N_i$ or/and u or/and M (or the condition whether $\Sigma_{i=1}^{M} N_i \leq u$ or otherwise) is configured explicitly, for example, via RRC or/and MAC CE. In another example, the value of $N_i$ or/and u or/and M (or the condition whether $\Sigma_{i=1}^{M} N_i \leq u$ or otherwise) is configured implicitly, for example, via RRC or/and MAC CE.

In one example V.1.4, the condition is based on the value of K (the number of activated TCI states for UL) and the value of N (the number of activated TCI states for DL). At least one of the following examples is used/configured.

In one example V.1.4.1, if N=K=1, the beam indication is via MAC CE, and if N>1 or K>1, the beam indication is via X-DCI. In one example, the value of N or/and K (or the condition whether N=K=1 or N>1 or K>1) is configured explicitly, for example, via RRC or/and MAC CE. In another example, the value of N or/and K is configured implicitly, for example, via RRC or/and MAC CE such as examples in embodiment V.2. Optionally, if N=K=1, the beam indication is via X-DCI, and if N>1 or K>1, the beam indication is via MAC CE. In one example, the value of N (or the condition whether N=1 or N>1) is configured explicitly, for example, via RRC or/and MAC CE. In another example, the value of N or/and K is configured implicitly, for example, via RRC or/and MAC CE.

In one example V.1.4.2, if N≤t and K≤Y (or N<t and K<Y), the beam indication is via MAC CE, and otherwise, the beam indication is via X-DCI. The value of t or/and Y can be fixed e.g. t, Y=1, 2, 4, or 8. Alternatively, the value of t or/and Y can be configured, e.g. via RRC or/and MACE CE. When configured, the set of candidate values for t or/and can be {1,2} or {1,4}, {1,2,3}, or {1,2,4}, or {1,2,3,4}. In one example, the value of N or/and t or/and K or/and Y (or the condition whether N≤t and K≤Y or otherwise) is configured explicitly, for example, via RRC or/and MAC CE. In another example, the value of N or/and t or/and K or/and Y (or the condition whether N≤t and K≤Y or otherwise) is configured implicitly, for example, via RRC or/and MAC CE.

In one example V.1.4.3, if N≤t and K≤Y (or N<t and K<Y), the beam indication is via X-DCI, and otherwise, the beam indication is via MAC CE. The value of t or/and Y can be fixed e.g. t, Y=1, 2, 4, or 8. Alternatively, the value of t or/and Y can be configured, e.g. via RRC or/and MACE CE. When configured, the set of candidate values for t or/and can be {1,2} or {1,4}, {1,2,3}, or {1,2,4}, or {1,2,3,4}. In one example, the value of N or/and t or/and K or/and Y (or the condition whether N≤t and K≤Y or otherwise) is configured explicitly, for example, via RRC or/and MAC CE. In another example, the value of N or/and t or/and K or/and Y (or the condition whether N≤t and K≤Y or otherwise) is configured implicitly, for example, via RRC or/and MAC CE.

In one example V.1.4.4, if N+K≤t (or N+K<t), the beam indication is via MAC CE, and N+K>t (or N+K≥t), the beam indication is via X-DCI. The value of t can be fixed e.g. t, Y=2, 4, or 8. Alternatively, the value of t or/and Y can be configured, e.g. via RRC or/and MACE CE. When configured, the set of candidate values for t or/and can be {2,4} or {2,8}, {2,3}, or {2,4,6}, or {2,4,6,8}. In one example, the value of N or/and t or/and K (or the condition whether N+K≤t or otherwise) is configured explicitly, for example, via RRC or/and MAC CE. In another example, the value of N or/and t or/and K (or the condition whether N+K≤t or otherwise) is configured implicitly, for example, via RRC or/and MAC CE.

In one example V.1.4.5, if N+K≤t (or N+K<t), the beam indication is via X-DCI, and N+K>t (or N+K≥t), the beam indication is via MAC CE. The value of t can be fixed e.g. t, Y=2, 4, or 8. Alternatively, the value of t or/and Y can be configured, e.g. via RRC or/and MACE CE. When configured, the set of candidate values for t or/and can be {2,4} or {2,8}, {2,3}, or {2,4,6}, or {2,4,6,8}. In one example, the value of N or/and t or/and K (or the condition whether N+K≤t or otherwise) is configured explicitly, for example, via RRC or/and MAC CE. In another example, the value of N or/and t or/and K (or the condition whether N+K≤t or otherwise) is configured implicitly, for example, via RRC or/and MAC CE.

In one example V.1.4.6, if max(N,K)≤t (or max(N,K)<t), the beam indication is via MAC CE, and max(N,K)>t (or max(N,K)≥t), the beam indication is via X-DCI. The value of t can be fixed e.g. t, Y=2, 4, or 8. Alternatively, the value of t or/and Y can be configured, e.g. via RRC or/and MACE CE. When configured, the set of candidate values for t or/and can be {2,4} or {2,8}, {2,3}, or {2,4,6}, or {2,4,6,8}. In one example, the value of N or/and t or/and K (or the condition whether max(N,K)≤t or otherwise) is configured explicitly, for example, via RRC or/and MAC CE. In another example, the value of N or/and t or/and K (or the condition whether max(N,K)≤t or otherwise) is configured implicitly, for example, via RRC or/and MAC CE.

In one example V.1.4.7, if max(N,K)≤t (or max(N,K)<t), the beam indication is via X-DCI, and max(N,K)>t (or max(N,K)≥t), the beam indication is via MAC CE. The value of t can be fixed e.g. t, Y=2, 4, or 8. Alternatively, the value of t or/and Y can be configured, e.g. via RRC or/and MACE CE. When configured, the set of candidate values for t or/and can be {2,4} or {2,8}, {2,3}, or {2,4,6}, or {2,4,6,8}. In one example, the value of N or/and t or/and K (or the condition whether max(N,K)≤t or otherwise) is configured explicitly, for example, via RRC or/and MAC CE. In another example, the value of N or/and t or/and K (or the condition whether max(N,K)≤t or otherwise) is configured implicitly, for example, via RRC or/and MAC CE.

In one example V.1.5, the condition is based on the value of M (the number of CCs), the value of N (the number of activated TCI states for DL), and the value of K (the number of activated TCI states for UL). At least one of the following examples is used/configured.

In one example V.1.5.1, if K=N=M=1, the beam indication is via MAC CE, and otherwise, the beam indication is via X-DCI. Alternatively, optionally, if K=N=M=1, the beam indication is via X-DCI, and otherwise, the beam indication is via MAC CE. In one example, the value of K or/and N or/and M (or the condition whether K=N=M=1 or otherwise) is configured explicitly, for example, via RRC or/and MAC CE. In another example, the value of K or/and N or/and M is configured implicitly, for example, via RRC or/and MAC CE.

In one example V.1.5.2, if M≤u, N≤t, and K<Y (or M<u, N<t, and K<Y), the beam indication is via MAC CE, and otherwise, the beam indication is via X-DCI. The value of u or/and t or/and Y can be fixed e.g. u, t, Y=1, 2, 4, or 8. Alternatively, the value of u or/and t or/and Y can be configured, e.g. via RRC or/and MACE CE. When configured, the set of candidate values for u or/and t or/and Y can be {1,2} or {1,4}, {1,2,3}, or {1,2,4}, or {1,2,3,4}. In one example, the value of N or/and t or/and K or/and Y or/and M or/and u (or the condition whether M≤u, N≤t, and K≤Y or otherwise) is configured explicitly, for example, via RRC or/and MAC CE. In another example, the value of N or/and t or/and K or/and Y or/and M or/and u (or the condition whether M≤u, N≤t, and K≤Y or otherwise) is configured implicitly, for example, via RRC or/and MAC CE.

In one example V.1.5.3, if M≤u, N≤t, and K≤Y (or M<u, N<t, and K<Y), the beam indication is via X-DCI, and otherwise, the beam indication is via MAC CE. The value of u or/and t or/and Y can be fixed e.g. u, t, Y=1, 2, 4, or 8. Alternatively, the value of u or/and t or/and Y can be configured, e.g. via RRC or/and MACE CE. When configured, the set of candidate values for u or/and t or/and Y can be {1,2} or {1,4}, {1,2,3}, or {1,2,4}, or {1,2,3,4}. In one example, the value of N or/and t or/and K or/and Y or/and M or/and u (or the condition whether M≤u, N≤t, and K≤Y or otherwise) is configured explicitly, for example, via RRC or/and MAC CE. In another example, the value of N or/and t or/and K or/and Y or/and M or/and u (or the condition whether M≤u, N≤t, and K≤Y or otherwise) is configured implicitly, for example, via RRC or/and MAC CE.

In one example V.1.5.4, if M(N+K)≤t (or M(N+K)<t), the beam indication is via MAC CE, and M(N+K)>t (or M(N+K)≥t), the beam indication is via X-DCI. The value of t can be fixed e.g. t=2, 4, or 8. Alternatively, the value of t can be configured, e.g. via RRC or/and MACE CE. When configured, the set of candidate values for t can be {2,4} or {2,8}, {2,3}, or {2,4,6}, or {2,4,6,8}. In one example, the value of N or/and t or/and K or/and M (or the condition whether M(N+K) or otherwise) is configured explicitly, for example, via RRC or/and MAC CE. In another example, the value of N or/and t or/and K or/and M (or the condition whether M(N+K) or otherwise) is configured implicitly, for example, via RRC or/and MAC CE.

In one example V.1.5.5, if M(N+K)≤t (or M(N+K)<t), the beam indication is via X-DCI, and M(N+K)>t (or M(N+K)≥t), the beam indication is via MAC CE. The value of t can be fixed e.g. t=2, 4, or 8. Alternatively, the value of t can be configured, e.g. via RRC or/and MACE CE. When configured, the set of candidate values for t can be {2,4} or {2,8}, {2,3}, or {2,4,6}, or {2,4,6,8}. In one example, the value of N or/and t or/and K or/and M (or the condition whether M(N+K) or otherwise) is configured explicitly, for example, via RRC or/and MAC CE. In another example, the value of N or/and t or/and K or/and M (or the condition whether M(N+K) or otherwise) is configured implicitly, for example, via RRC or/and MAC CE.

In one example V.1.5.6, same as example V.1.5.4 except that M(N+K) is replaced with M×max(N,K).

In one example V.1.5.7, same as example V.1.5.6 except that M(N+K) is replaced with M×max(N,K).

In one example V.1.5.8, when the number of activated TCI states can be different across CCs, then if $\Sigma_{i=1}^{M}(N_i+K_i) \leq u$ (or $\Sigma_{i=1}^{M}(N_i K_i) < u$), the beam indication is via MAC CE, and $\Sigma_{i=1}^{M}(N_i K_i) > u$ (or $\Sigma_{i=1}^{M}(N_i+K_i) \geq u$), the beam indication is via X-DCI, where $N_i$ and $K_i$ are the number of activated TCI states for DL and UL, respectively, for CC i. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of $N_i$ or/and $K_i$ or/and u or/and M (or the condition whether $\Sigma_{i=1}^{M}(N_i+K_i) \leq u$ or otherwise) is configured explicitly, for example, via RRC or/and MAC CE. In another example, the value of $N_i$ or/and $K_i$ or/and u or/and M (or the condition whether $\Sigma_{i=1}^{M}(N_i+K_i) \leq u$ or otherwise) is configured implicitly, for example, via RRC or/and MAC CE.

In one example V.1.5.9, when the number of activated TCI states can be different across CCs, then if $\Sigma_{i=1}^{M}(N_i+K_i) \leq u$ (or $\Sigma_{i=1}^{M}(N_i+K_i) < u$), the beam indication is via X-DCI, and $\Sigma_{i=1}^{M}(N_i+K_i) > u$ (or $\Sigma_{i=1}^{M}(N_i+K_i) \geq u$), the beam indication is via MAC CE, where $N_i$ and $K_i$ are the number of activated TCI states for DL and UL, respectively, for CC i. The value of u can be fixed e.g. u=2, 4, or 8. Alternatively, the value of u can be configured, e.g. via RRC or/and MACE CE. When configured, the set of candidate values for u can be {2,4} or {2,8}, {2,3}, or {2,4,6}, or {2,4,6,8}. In one example, the value of $N_i$ or/and $K_i$ or/and u or/and M (or the condition whether $\Sigma_{i=1}^{M}(N_i+K_i) \leq u$ or otherwise) is configured explicitly, for example, via RRC or/and MAC CE. In another example, the value of $N_i$ or/and $K_i$ or/and u or/and M (or the condition whether $\Sigma_{i=1}^{M}(N_i+K_i) \leq u$ or otherwise) is configured implicitly, for example, via RRC or/and MAC CE.

In one example V.1.6, the condition is based on whether the CCs corresponds to inter-band or intra-band (contiguous or non-contiguous) carrier aggregation (CA). At least one of the following examples is used/configured.

In one example V.1.6.1, the condition applied only to the intra-band CA case, i.e., for intra-band CA (i.e., CCs within the same carrier), the beam indication is either via MAC CE or DCI. For the inter-band CA (i.e. CCs within different carriers), the beam indication is fixed, e.g. to via MAC CE only, or, optionally, to DCI only.

In one example V.1.6.2, the condition applied only to the inter-band CA case, i.e., for inter-band CA (i.e., CCs within different carriers), the beam indication is either via MAC CE or DCI. For the intra-band CA (i.e. CCs within the same carriers), the beam indication is fixed, e.g. to via MAC CE only, or, optionally, to DCI only.

In one example V.1.7, the condition is based on whether the CCs corresponds to inter-band or intra-band (contiguous or non-contiguous) carrier aggregation (CA) and a number of CCs (M). At least one of the combinations of examples in V.1.1 and in V.1.6 is used/configured.

In one example V.1.8, the condition is based on whether the CCs corresponds to inter-band or intra-band (contiguous or non-contiguous) carrier aggregation (CA) and a number of activate TCI states (N). At least one of the combinations of examples in V.1.2 and in V.1.6 is used/configured.

In one example V.1.9, the condition is based on whether the CCs corresponds to inter-band or intra-band (contiguous or non-contiguous) carrier aggregation (CA), a number of activate TCI states (N), and a number of CCs (M). At least one of the combinations of examples in V.1.3 and in V.1.6 is used/configured.

In one example V.1.10, the condition is based on whether the CCs corresponds to inter-band or intra-band (contiguous or non-contiguous) carrier aggregation (CA), a number of activate TCI states for DL (N), and number of activate TCI states for UL (K). At least one of the combinations of examples in V.1.4 and in V.1.6 is used/configured.

In one example V.1.11, the condition is based on whether the CCs corresponds to inter-band or intra-band (contiguous or non-contiguous) carrier aggregation (CA), and a number of CCs (M), a number of activate TCI states for DL (N), and number of activate TCI states for UL (K). At least one of the combinations of examples in V.1.5 and in V.1.6 is used/configured.

Figure 29:
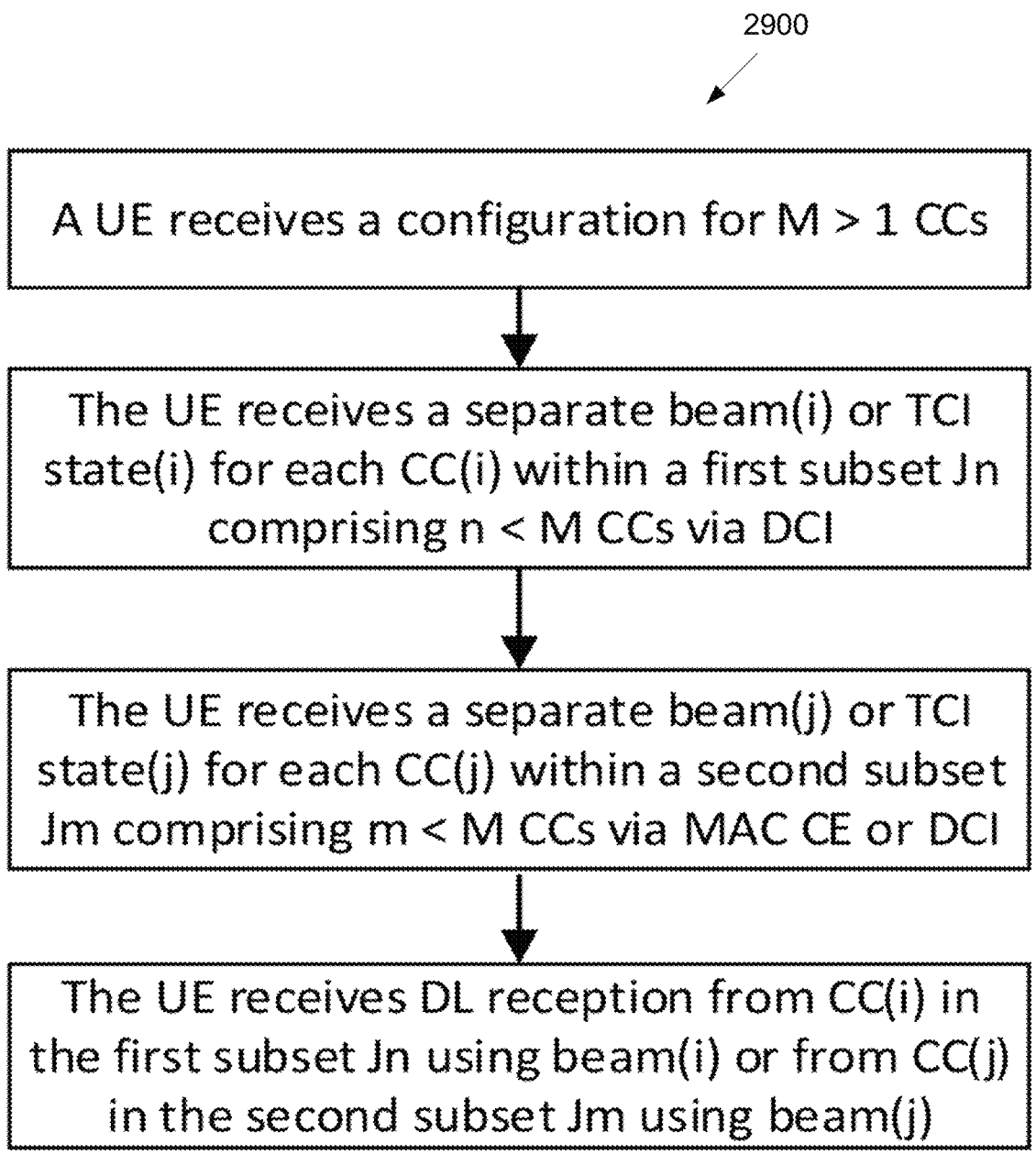
FIG. 29 illustrates a UE configured with a set of M>1 CCs for DL reception according to embodiments of the present disclosure.

FIG. 29 illustrates a UE configured with a set of M>1 CCs for DL reception 2900. The UE configured with a set of M>1 CCs for DL reception 2900 illustrated in FIG. 29 is for illustration only. FIG. 29 does not limit the scope of this disclosure to any particular implementation of the UE configured with a set of M>1 CCs for DL reception 2900.

In embodiment V.2, as shown in FIG. 29, a UE is configured with a set (list) of M>1 CCs (or DL BWPs or cells) for DL reception. The UE is further configured to receive a beam or TCI state(i) independently (separately) for each CC(i) within a first subset (list) of CCs via L-1 control (DCI) signaling, and a beam or TCI state(i) independently (separately) for each CC(i) within a second subset (list) of CCs via either MAC CE or DCI based signaling/activation. Let n and m be number of CCs in the first and second subsets (lists), respectively, where 0<n, m≤M such that n+m≤M. Let $J_n$ and $J_m$ be the subset (list) of CCs in the first and second subsets (lists), respectively. So, the UE receives n beams (TCI states), one for each CC(i), i∈$J_n$, in the first subset via DCI, and m beams (TCI states), one for each CC(i), i∈$J_m$, in the second subset via MAC CE or DCI.

In the special case, when n=0, this embodiment is equivalent to embodiment V.1. In the special case, when m=0, this embodiment is equivalent to the beam indication via DCI for all CCs.

The details of MAC CE or DCI based beam indication for the second subset of CCs is according to at least one of the examples in embodiment V.1.

In one example, the beam or TCI state(i) is used for the reception of PDSCH(i) (or/and DMRS for PDSCH(i)). In one example, the beam or TCI state(i) is used as a "beam (TCI state) for the reception of both PDCCH(i) and PDSCH (i) (or/and DMRS for PDCCH(i) and PDSCH(i)). In one example, the beam or TCI state(i) is used (1) for the reception of PDSCH only or (2) as a 'common' beam (TCI state) for the reception of both PDCCH(i) and PDSCH(i). In one example, whether the beam or TCI state(i) is for (1) or (2) is indicated/configured (via RRC or/and MAC CE or/and DCI), where this indication/configuration can be common for all CCs or independent for each CC.

In a variation, the UE is further configured to receive two beams or TCI states independently (separately) for each CC(i) via L-1 control (DCI) signaling, wherein one of the two beams is used for the reception of PDSCH(i) (or/and DMRS for PDSCH(i)), and another of the two beams is used for the reception of PDCCH(i) (or/and DMRS for PDCCH (i)).

In another variation, the UE is further configured to receive K=1 or 2 beams independently (separately) for each CC(i) via L-1 control (DCI) signaling, wherein the value K can be configured via RRC or/and MAC CE or/and DCI based signaling. When K=2, one of the two beams is used for the reception of PDSCH(i) (or/and DMRS for PDSCH (i)), and another of the two beams is used for the reception of PDCCH(i) (or/and DMRS for PDCCH(i)). When K=1, the received beam is used receive PDSCH(i) or/and PDCCH (i) as explained above.

In embodiment V.3, a UE is configured with a set (list) of M>1 CCs (or DL BWPs or cells) for DL reception. The UE is further configured to receive a beam or TCI state(i) independently (separately) for each CC(i) within a first subset (list) of CCs via MAC CE signaling, and a beam or TCI state(i) independently (separately) for each CC(i) within a second subset (list) of CCs via either MAC CE or DCI based signaling/activation. Let n and m be number of CCs in the first and second subsets (lists), respectively, where 0≤n, m≤M such that n+m≤M. Let $J_n$ and $J_m$ be the subset (list) of CCs in the first and second subsets (lists), respectively. So, the UE receives n beams (TCI states), one for each CC(i), i∈$J_n$, in the first subset via MAC CE, and m beams (TCI states), one for each CC(i), i∈$J_m$, in the second subset via MAC CE or DCI.

In the special case, when n=0, this embodiment is equivalent to embodiment V.1. In the special case, when m=0, this embodiment is equivalent to the beam indication via MAC CE for all CCs.

The details of MAC CE or DCI based beam indication for the second subset of CCs is according to at least one examples in embodiment V.1.

Component 6: Common Beam for DL Reception and DCI Based Beam Indication

Figure 30:
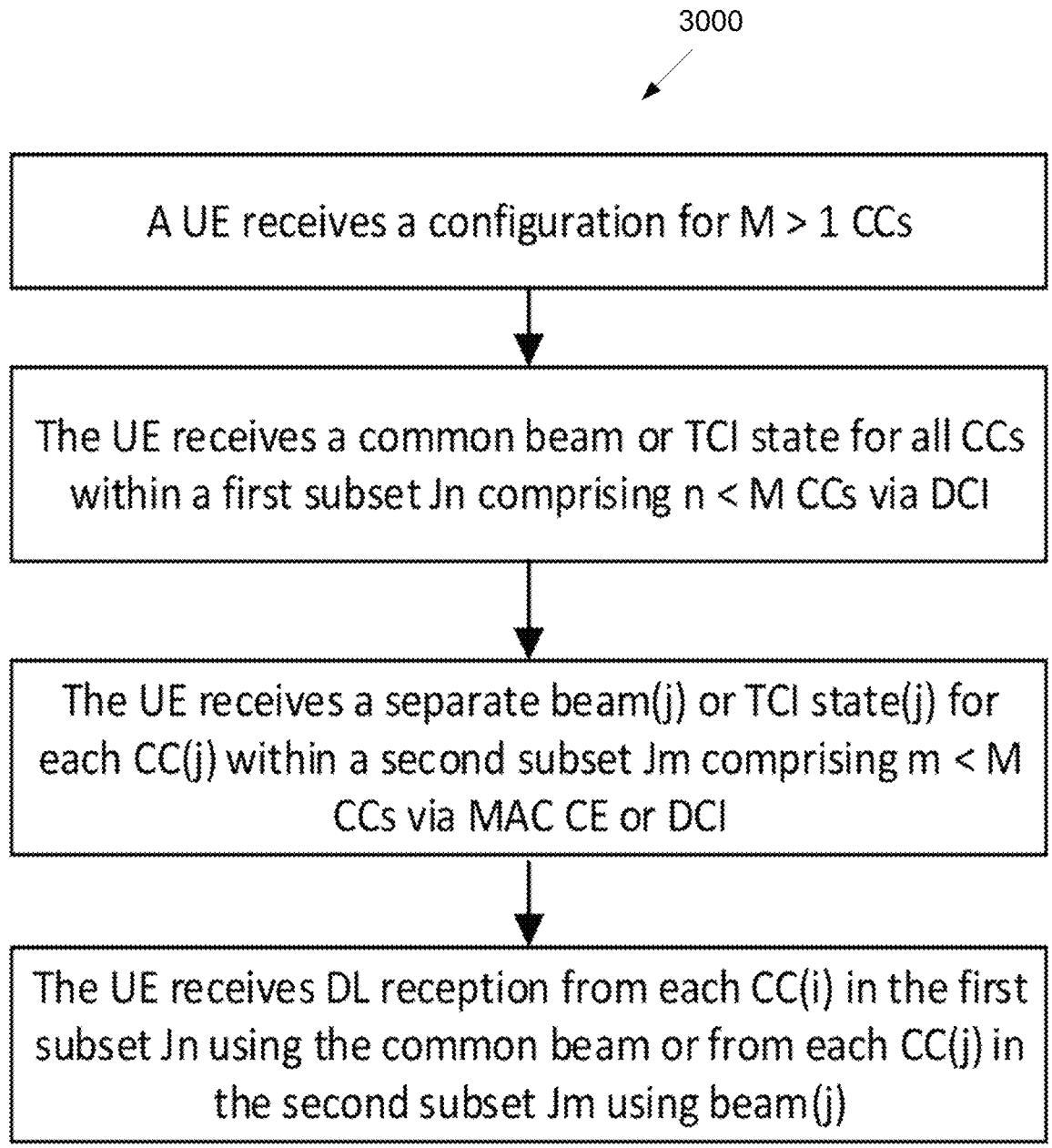
FIG. 30 illustrates a UE configured with a set of M>1 CCs for DL reception according to embodiments of the present disclosure.

FIG. 30 illustrates a UE configured with a set of M>1 CCs for DL reception 3000. The UE configured with a set of M>1 CCs for DL reception 3000 illustrated in FIG. 30 is for illustration only. FIG. 30 does not limit the scope of this disclosure to any particular implementation of the UE configured with a set of M>1 CCs for DL reception 3000.

In embodiment VI.1, as shown in FIG. 30, a UE is configured with a set (list) of M>1 CCs (or DL BWPs or cells) for DL reception. The UE is further configured to receive a (single) common beam or TCI state for a first subset (list) of CCs via L-1 control (DCI) signaling, and a beam or TCI state(i) independently (separately) for each CC(i) within a second subset (list) of CCs via MAC CE or DCI based signaling/activation. Let n and m be number of CCs in the first and second subsets (lists), respectively, where 0≤n, m≤M such that n+m≤M. Let $J_n$ and $J_m$ be the subset (list) of CCs in the first and second subsets (lists), respectively. So, the UE receives a common beam (TCI state) for all CCs in the first subset $J_n$ via DCI, and m beams (TCI states), one for each CC(i), i∈$J_m$, in the second subset via MAC CE or DCI.

In the special case, when n=0, this embodiment is equivalent to embodiment V.1. In the special case, when m=0, this embodiment is equivalent to the common beam indication via DCI for all CCs.

The details of MAC CE or DCI based beam indication for the second subset of CCs is according to at least one examples in embodiment V.1.

In one example, the common beam or TCI state is used for the reception of PDSCH(i) (or/and DMRS for PDSCH(i)) of all CCs in the first subset $J_n$. In one example, the common beam or TCI state is used for the reception of both PDCCH (i) and PDSCH(i) (or/and DMRS for PDCCH(i) and PDSCH (i)) of all CCs in the first subset $J_n$. In one example, the common beam or TCI state is used for the reception of (1) PDSCH(i) only or (2) both PDCCH(i) and PDSCH(i). In one example, whether the common beam or TCI state is for (1) or (2) is indicated/configured (via RRC or/and MAC CE or/and DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (or/and DMRS for PDSCH(i)) for all CCs, and another of the two common beams is used for the reception of PDCCH(i) (or/and DMRS for PDCCH(i)) for all CCs.

In another variation, the UE is further configured to receive K=1 or 2 beams common for all CCs via L-1 control (DCI) signaling, wherein the value K can be configured via RRC or/and MAC CE or/and DCI based signaling. When K=2, one of the two common beams is used for the reception of PDSCH(i) (or/and DMRS for PDSCH(i)) for all CCs, and another of the two common beams is used for the reception of PDCCH(i) (or/and DMRS for PDCCH(i)) for all CCs. When K=1, the common beam is used receive PDSCH(i) or/and PDCCH(i) for all CCs as explained above.

In embodiment VI.2, a UE is configured with a set (list) of M>1 CCs (or DL BWPs or cells) for DL reception. The UE is further configured to receive a (single) common beam or TCI state for a first subset (list) of CCs via MAC CE, and a beam or TCI state(i) independently (separately) for each CC(i) within a second subset (list) of CCs via MAC CE or DCI based signaling/activation. Let n and m be number of CCs in the first and second subsets (lists), respectively, where $0<n$, $m \leq M$ such that $n+m \leq M$. Let $J_n$ and $J_m$ be the subset (list) of CCs in the first and second subsets (lists), respectively. So, the UE receives a common beam (TCI state) for all CCs in the first subset $J_n$ via MAC CE, and m beams (TCI states), one for each CC(i), $i \in J_m$, in the second subset via MAC CE or DCI.

In the special case, when n=0, this embodiment is equivalent to embodiment V.1. In the special case, when m=0, this embodiment is equivalent to the common beam indication via MAC CE for all CCs.

The details of MAC CE or DCI based beam indication for the second subset of CCs is according to at least one examples in embodiment V.1.

In embodiment VI.3, a UE is configured with a set (list) of M>1 CCs (or DL BWPs or cells) for DL reception. The UE is further configured to receive a (single) common beam or TCI state for a first subset (list) of CCs via MAC CE or DCI, and a beam or TCI state(i) independently (separately) for each CC(i) within a second subset (list) of CCs via MAC CE based signaling/activation.

The details of MAC CE or DCI based beam indication for the first subset of CCs is according to at least one examples in embodiment V.1.

In embodiment VI.4, a UE is configured with a set (list) of M>1 CCs (or DL BWPs or cells) for DL reception. The UE is further configured to receive a (single) common beam or TCI state for a first subset (list) of CCs via MAC CE or DCI, and a beam or TCI state(i) independently (separately) for each CC(i) within a second subset (list) of CCs via DCI based signaling/activation.

The details of MAC CE or DCI based beam indication for the first subset of CCs is according to at least one examples in embodiment V.1.

In embodiment VI.5, a UE is configured with a set (list) of M>1 CCs (or DL BWPs or cells) for DL reception. The UE is further configured to receive a (single) common beam or TCI state for a first subset (list) of CCs via MAC CE or DCI, and a beam or TCI state(i) independently (separately) for each CC(i) within a second subset (list) of CCs via MAC CE or DCI based signaling/activation.

The details of MAC CE or DCI based beam indication for the first and second subsets of CCs is according to at least one examples in embodiment V.1.

Figure 31:
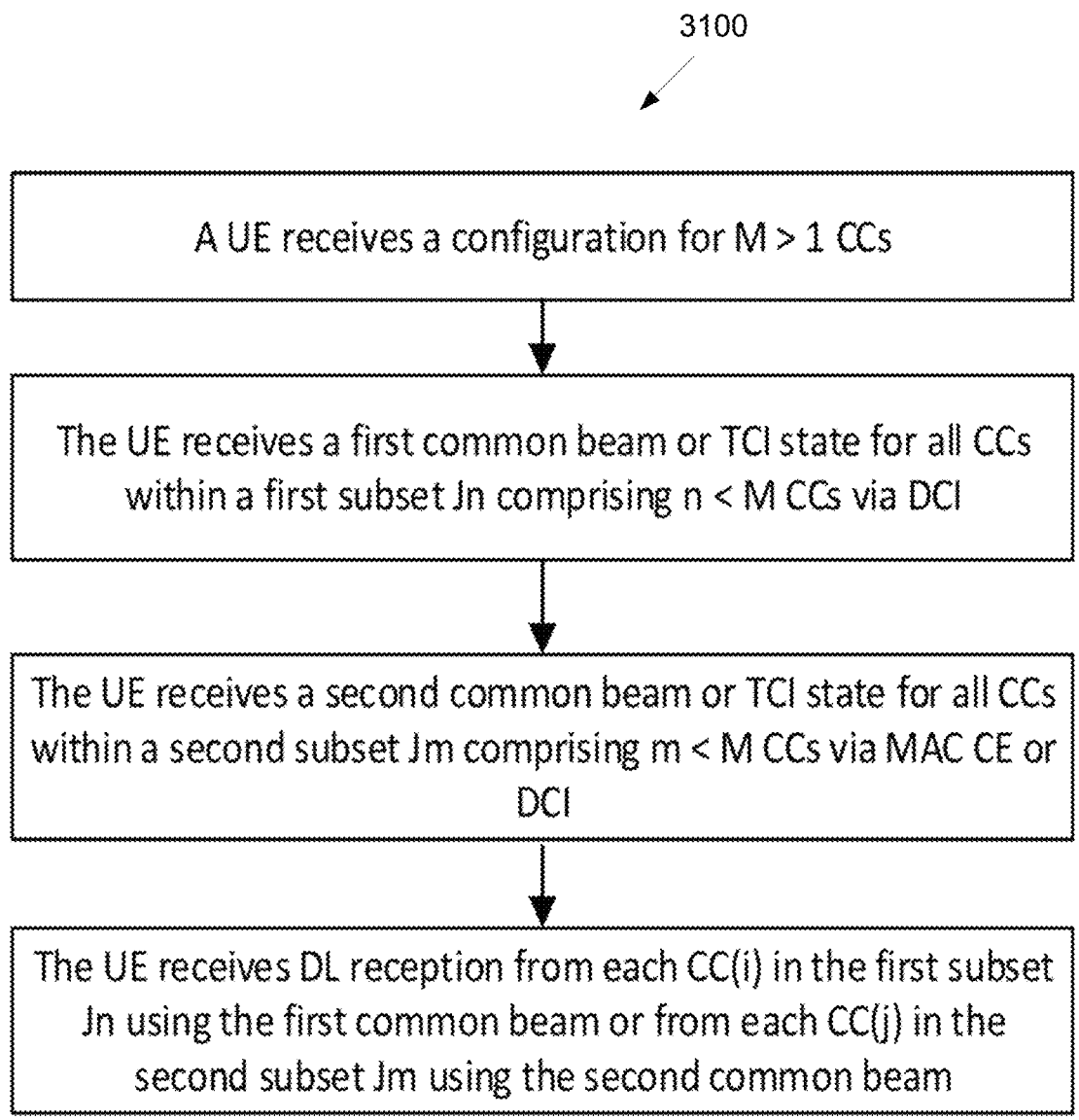
FIG. 31 illustrates a UE configured with a set of M>1 CCs for DL reception according to embodiments of the present disclosure.

FIG. 31 illustrates a UE configured with a set of M>1 CCs for DL reception 3100. The UE configured with a set of M>1 CCs for DL reception 3000 illustrated in FIG. 31 is for illustration only. FIG. 31 does not limit the scope of this disclosure to any particular implementation of the UE configured with a set of M>1 CCs for DL reception 3100.

In embodiment VI.6, as shown in FIG. 31, a UE is configured with a set (list) of M>1 CCs (or DL BWPs or cells) for DL reception. The UE is further configured to receive a first (single) common beam or TCI state for a first subset (list) of CCs via L-1 control (DCI) signaling, and a second (single) common beam or TCI state for a second subset (list) of CCs via MAC CE or DCI based signaling/activation. Let n and m be number of CCs in the first and second subsets (lists), respectively, where $0<n$, $m \leq M$ such that $n+m \leq M$. Let $J_n$ and $J_m$ be the subset (list) of CCs in the first and second subsets (lists), respectively. So, the UE receives the first common beam (TCI state) for all CCs in the first subset $J_n$ via DCI, and the second common beam (TCI state) for all CCs in the second subset $J_m$ via MAC CE or DCI.

The details of MAC CE or DCI based beam indication for the second subset of CCs is according to at least one examples in embodiment V.1.

In one example, the first common beam or TCI state (or the second common beam) is used for the reception of PDSCH(i) (or/and DMRS for PDSCH(i)) of all CCs in the first subset $J_n$ (or the second subset $J_m$). In one example, the first common beam or TCI state (or the second common beam) is used for the reception of both PDCCH(i) and PDSCH(i) (or/and DMRS for PDCCH(i) and PDSCH(i)) of all CCs in the first subset $J_n$ (or the second subset $J_m$). In one example, the first common beam or TCI state (or the second common beam) is used for the reception of (1) PDSCH(i) only or (2) both PDCCH(i) and PDSCH(i). In one example, whether the first common beam or TCI state (or the second common beam) is for (1) or (2) is indicated/configured (via RRC or/and MAC CE or/and DCI), where this indication/configuration can be common for all CCs or independent for each CC.

In a variation, the UE is further configured to receive two beams or TCI states common for all CCs via L-1 control (DCI) signaling, wherein one of the two common beams is used for the reception of PDSCH(i) (or/and DMRS for PDSCH(i)) for all CCs, and another of the two common beams is used for the reception of PDCCH(i) (or/and DMRS for PDCCH(i)) for all CCs.

In another variation, the UE is further configured to receive K=1 or 2 beams common for all CCs via L-1 control (DCI) signaling, wherein the value K can be configured via RRC or/and MAC CE or/and DCI based signaling. When K=2, one of the two common beams is used for the reception of PDSCH(i) (or/and DMRS for PDSCH(i)) for all CCs, and another of the two common beams is used for the reception of PDCCH(i) (or/and DMRS for PDCCH(i)) for all CCs. When K=1, the common beam is used receive PDSCH(i) or/and PDCCH(i) for all CCs as explained above.

In embodiment VI.7, a UE is configured with a set (list) of M>1 CCs (or DL BWPs or cells) for DL reception. The UE is further configured to receive a first (single) common beam or TCI state for a first subset (list) of CCs via MAC CE signaling, and a second (single) common beam or TCI state for a second subset (list) of CCs via MAC CE or DCI based signaling/activation. Let n and m be number of CCs in the first and second subsets (lists), respectively, where $0<n$, $m \leq M$ such that $n+m \leq M$. Let $J_n$ and $J_m$ be the subset (list) of CCs in the first and second subsets (lists), respectively. So, the UE receives the first common beam (TCI state) for all CCs in the first subset $J_n$ via MAC CE, and the second common beam (TCI state) for all CCs in the second subset $J_m$ via MAC CE or DCI.

The details of MAC CE or DCI based beam indication for the second subset of CCs is according to at least one examples in embodiment I.1.

In embodiment VI.8, a UE is configured with a set (list) of M>1 CCs (or DL BWPs or cells) for DL reception. The UE is further configured to receive a first (single) common beam or TCI state for a first subset (list) of CCs via MAC CE or DCI signaling, and a second (single) common beam or TCI state for a second subset (list) of CCs via DCI based signaling/activation.

The details of MAC CE or DCI based beam indication for the first subset of CCs is according to at least one examples in embodiment V.1.

In embodiment VI.9, a UE is configured with a set (list) of M>1 CCs (or DL BWPs or cells) for DL reception. The UE is further configured to receive a first (single) common beam or TCI state for a first subset (list) of CCs via MAC CE or DCI signaling, and a second (single) common beam or TCI state for a second subset (list) of CCs via MAC CE based signaling/activation.

The details of MAC CE or DCI based beam indication for the first subset of CCs is according to at least one examples in embodiment V.1.

In embodiment VI.10, a UE is configured with a set (list) of M>1 CCs (or DL BWPs or cells) for DL reception. The UE is further configured to receive a first (single) common beam or TCI state for a first subset (list) of CCs via MAC CE or DCI signaling, and a second (single) common beam or TCI state for a second subset (list) of CCs via MAC CE or DCI based signaling/activation.

The details of MAC CE or DCI based beam indication for the first and second subsets of CCs is according to at least one examples in embodiment V.1.

The extensions such as the common or separate beam indication for more than two subsets of CCs, and the beam indication for UL transmission (of PUCCH/PUSCH/PRACH) is straightforward for the one skilled-in-the-art.

Any of the above variation embodiments can be utilized independently or in combination with at least one other variation embodiment.

Figure 32:
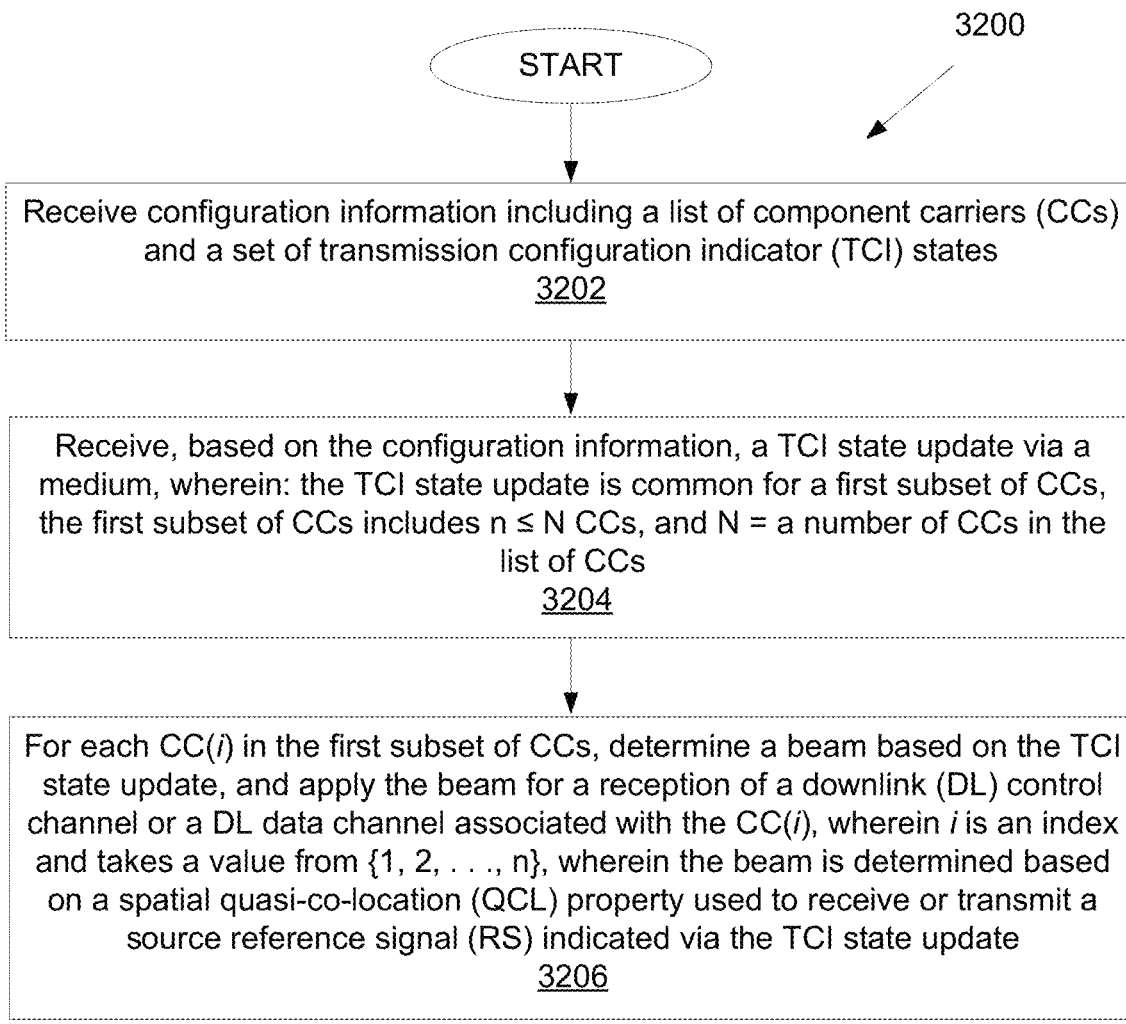
FIG. 32 illustrates a flow chart of a method for operating a UE according to embodiments of the present disclosure.

FIG. 32 illustrates a flow chart of a method 3200 for operating a user equipment (UE), as may be performed by a UE such as UE 116, according to embodiments of the present disclosure. The embodiment of the method 3200 illustrated in FIG. 32 is for illustration only. FIG. 20 does not limit the scope of this disclosure to any particular implementation.

As illustrated in FIG. 32, the method 3200 begins at step 3202. In step 3202, the UE (e.g., 111-116 as illustrated in FIG. 1) receives configuration information including a list of component carriers (CCs) and a set of transmission configuration indicator (TCI) states.

In step 3204, the UE receives, based on the configuration information, a TCI state update via a medium, wherein: the TCI state update is common for a first subset of CCs, the first subset of CCs includes n≤N CCs, and N=a number of CCs in the list of CCs.

In step 3206, for each CC(i) in the first subset of CCs, the UE determines a beam based on the TCI state update, and applies the beam for a reception of a downlink (DL) control channel or a DL data channel associated with the CC(i), wherein i is an index and takes a value from {1, 2, . . . , n}, wherein the beam is determined based on a spatial quasi-co-location (QCL) property used to receive or transmit a source reference signal (RS) indicated via the TCI state update.

In one embodiment, the TCI state update corresponds to an identifier (ID) of a TCI state that includes a single source RS that determines the beam for all CCs in the first subset of CCs.

In one embodiment, the TCI state update including the single source RS is received via the medium that is associated with a CC from the set of CCs, where the CC is configured via higher layer signaling.

In one embodiment, the set of TCI states are common for all CCs and are received in a reference CC, and an information about the set of TCI states being in the reference CC is configured via higher signaling.

In one embodiment, the medium is a downlink control information (DCI).

In one embodiment, the medium is a medium access control-control element (MAC-CE).

In one embodiment, in response to the TCI state update indicating a joint TCI state for both DL and uplink (UL), the UE applies the beam for the CC(i) for a transmission of an UL control channel or an UL data channel associated with the CC(i).

In one embodiment, in response to the TCI state update indicating two separate TCI states for DL and uplink (UL), a DL TCI state and an UL TCI state, respectively, the UE, for each CC(i): determines the beam based on the DL TCI state, determines an UL transmit beam based on the UL TCI state, and applies the UL transmit beam for a transmission of an UL control channel or an UL data channel associated with the CC(i).

Figure 33:
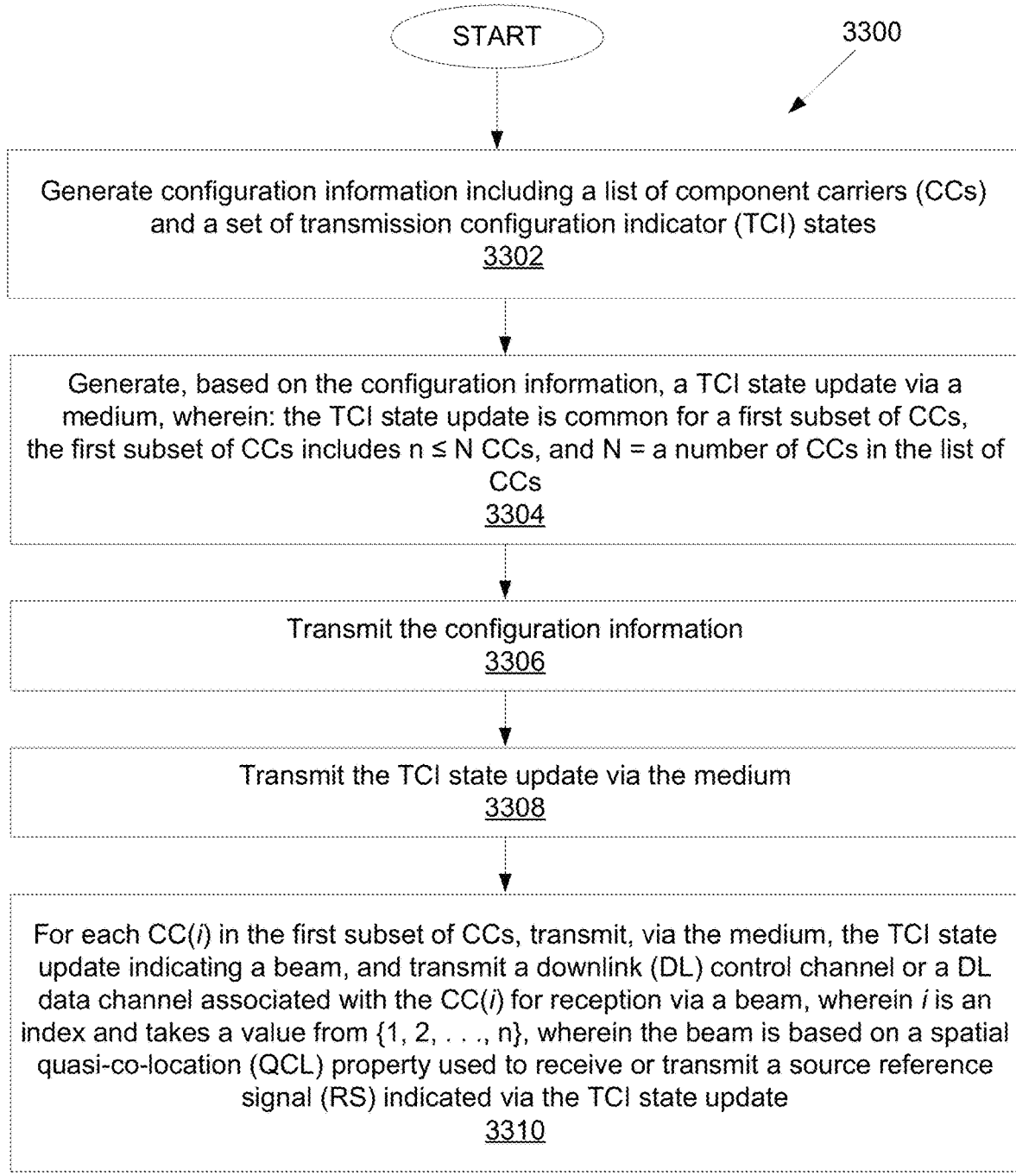
FIG. 33 illustrates a flow chart of a method for operating a BS according to embodiments of the present disclosure.

FIG. 33 illustrates a flow chart of another method 3300, as may be performed by a base station (BS) such as BS 102, according to embodiments of the present disclosure. The embodiment of the method 3300 illustrated in FIG. 33 is for illustration only. FIG. 33 does not limit the scope of this disclosure to any particular implementation.

As illustrated in FIG. 33, the method 3300 begins at step 3302. In step 3302, the BS (e.g., 101-103 as illustrated in FIG. 1), generates configuration information including a list of component carriers (CCs) and a set of transmission configuration indicator (TCI) states.

In step 3304, the BS generates, based on the configuration information, a TCI state update via a medium, wherein: the TCI state update is common for a first subset of CCs, the first subset of CCs includes n≤N CCs, and N=a number of CCs in the list of CCs.

In step 3306, the BS transmits the configuration information.

In step 3308, the BS transmits the TCI state update via the medium.

In step 3310, for each CC(i) in the first subset of CCs, the BS transmits, via the medium, the TCI state update indicating a beam, and transmits a downlink (DL) control channel or a DL data channel associated with the CC(i) for reception via a beam, wherein i is an index and takes a value from {1, 2, . . . , n}, wherein the beam is based on a spatial quasi-co-location (QCL) property used to receive or transmit a source reference signal (RS) indicated via the TCI state update.

In one embodiment, the TCI state update corresponds to an identifier (ID) of a TCI state that includes a single source RS that determines the beam for all CCs in the first subset of CCs.

In one embodiment, the TCI state including the single source RS is received via the medium that is associated with a CC from the set of CCs, where the CC is configured via higher layer signaling.

In one embodiment, the set of TCI states are common for all CCs and are received in a reference CC, and an information about the set of TCI states being in the reference CC is configured via higher signaling.

In one embodiment, the medium is a downlink control information (DCI).

In one embodiment, the medium is a medium access control-control element (MAC-CE).

In one embodiment, in response to the TCI state update indicating a joint TCI state for both DL and uplink (UL), the BS receives an UL control channel or an UL data channel associated with the CC(i) transmitted via the beam.

In one embodiment, in response to the TCI state update indicating two separate TCI states for DL and uplink (UL), a DL TCI state and an UL TCI state, respectively, for each CC(i), the BS transmits a DL control channel or a DL data channel for reception via the beam determined based on the DL TCI state, and receives an UL control channel or an UL data channel transmitted via an UL transmit beam that is determined based on the UL TCI state.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information including a list of component carriers (CCs) and a set of transmission configuration indicator (TCI) states, and
receive, based on the configuration information, a TCI state update via a medium, wherein:
the TCI state update is common for a first subset of CCs,
the first subset of CCs includes n≤N CCs, and
N=a number of CCs in the list of CCs; and
a processor operably coupled to the transceiver, the processor configured to:
for each CC(i) in the first subset of CCs,
determine a beam based on the TCI state update, and
apply the beam for a reception of a downlink (DL) control channel or a DL data channel associated with the CC(i), wherein i is an index and takes a value from $\{1, 2, \ldots, n\}$,
wherein the beam is determined based on a spatial quasi-co-location (QCL) property used to receive or transmit a source reference signal (RS) indicated via the TCI state update.

2. The UE of claim 1, wherein the TCI state update corresponds to an identifier (ID) of a TCI state that includes a single source RS that determines the beam for all CCs in the first subset of CCs.

3. The UE of claim 2, wherein the TCI state including the single source RS is received via the medium that is associated with a CC from the set of CCs, where the CC is configured via higher layer signaling.

4. The UE of claim 1, wherein the set of TCI states are common for all CCs and are received in a reference CC, and an information about the set of TCI states being in the reference CC is configured via higher signaling.

5. The UE of claim 1, wherein the medium is a downlink control information (DCI).

6. The UE of claim 1, wherein the medium is a medium access control-control element (MAC-CE).

7. The UE of claim 1, wherein, in response to the TCI state update indicating a joint TCI state for both DL and uplink (UL), the processor is configured to apply the beam for the CC(i) for a transmission of an UL control channel or an UL data channel associated with the CC(i).

8. The UE of claim 1, wherein, in response to the TCI state update indicating two separate TCI states for DL and uplink (UL), a DL TCI state and an UL TCI state, respectively, the processor is configured to:
for each CC(i):
determine the beam based on the DL TCI state,
determine an UL transmit beam based on the UL TCI state, and
apply the UL transmit beam for a transmission of an UL control channel or an UL data channel associated with the CC(i).

9. A base station (BS) comprising:
a processor configured to:
generate configuration information including a list of component carriers (CCs) and a set of transmission configuration indicator (TCI) states, and
generate, based on the configuration information, a TCI state update via a medium, wherein:
the TCI state update is common for a first subset of CCs,
the first subset of CCs includes n≤N CCs, and
N=a number of CCs in the list of CCs; and
a transceiver operably coupled to the processor, the transceiver configured to:
transmit the configuration information,
transmit the TCI state update via the medium,
for each CC(i) in the first subset of CCs,
transmit a downlink (DL) control channel or a DL data channel associated with the CC(i) for reception via a beam, wherein i is an index and takes a value from $\{1, 2, \ldots, n\}$,
wherein the beam is based on a spatial quasi-co-location (QCL) property used to receive or transmit a source reference signal (RS) indicated via the TCI state update.

10. The BS of claim 9, wherein the TCI state update corresponds to an identifier (ID) of a TCI state that includes a single source RS that determines the beam for all CCs in the first subset of CCs.

11. The BS of claim 10, wherein the TCI state including the single source RS is transmitted via the medium that is associated with a CC from the set of CCs, where the CC is configured via higher layer signaling.

12. The BS of claim 9, wherein the set of TCI states are common for all CCs and are transmitted in a reference CC, and an information about the set of TCI states being in the reference CC is configured via higher signaling.

13. The BS of claim 9, wherein the medium is a downlink control information (DCI).

14. The BS of claim 9, wherein the medium is a medium access control-control element (MAC-CE).

15. The BS of claim 9, wherein, in response to the TCI state update indicating a joint TCI state for both DL and uplink (UL), the transceiver is configured to receive an UL control channel or an UL data channel associated with the CC(i) transmitted via the beam.

16. The BS of claim 9, wherein, in response to the TCI state update indicating two separate TCI states for DL and uplink (UL), a DL TCI state and an UL TCI state, respectively, the transceiver is configured to:
for each CC(i):
transmit a DL control channel or a DL data channel for reception via the beam determined based on the DL TCI state, and
receive an UL control channel or an UL data channel transmitted via an UL transmit beam that is determined based on the UL TCI state.

17. A method for operating a user equipment (UE), the method comprising:

receiving configuration information including a list of component carriers (CCs) and a set of transmission configuration indicator (TCI) states;

receiving, based on the configuration information, a TCI state update via a medium, wherein:

the TCI state update is common for a first subset of CCs, the first subset of CCs includes n≤N CCs, and N=a number of CCs in the list of CCs; and for each CC(i) in the first subset of CCs, determining a beam based on the TCI state update, and applying the beam for a reception of a downlink (DL) control channel or a DL data channel associated with the CC(i), wherein i is an index and takes a value from {1, 2, . . . , n}, wherein the beam is determined based on a spatial quasi-co-location (QCL) property used to receive or transmit a source reference signal (RS) indicated via the TCI state update.

18. The method of claim 17, wherein the TCI state update corresponds to an identifier (ID) of a TCI state that includes a single source RS that determines the beam for all CCs in the first subset of CCs.

19. The method of claim 18, further comprising receiving the TCI state including the single source RS via the medium that is associated with a CC from the set of CCs, where the CC is configured via higher layer signaling.

20. The method of claim 17, further comprising receiving the set of TCI states in a reference CC, wherein the TCI states are common for all CCs, and an information about the set of TCI states being in the reference CC is configured via higher signaling.

* * * * *